United States Patent
Amit

(10) Patent No.: US 12,450,135 B2
(45) Date of Patent: Oct. 21, 2025

(54) CONSISTENCY GROUP DISTRIBUTED SNAPSHOT METHOD AND SYSTEM

(71) Applicant: VOLUMEZ TECHNOLOGIES LTD., Tel Aviv (IL)

(72) Inventor: Jonathan Amit, Omer (IL)

(73) Assignee: VOLUMEZ TECHNOLOGIES LTD., Tel Aviv (IL)

( * ) Notice: Subject to any disclaimer, the term of this patent is extended or adjusted under 35 U.S.C. 154(b) by 0 days.

(21) Appl. No.: 18/273,240

(22) PCT Filed: Jan. 25, 2022

(86) PCT No.: PCT/IL2022/050107
§ 371 (c)(1),
(2) Date: Jul. 19, 2023

(87) PCT Pub. No.: WO2022/157787
PCT Pub. Date: Jul. 28, 2022

(65) Prior Publication Data
US 2024/0111418 A1    Apr. 4, 2024

Related U.S. Application Data

(60) Provisional application No. 63/141,155, filed on Jan. 25, 2021, provisional application No. 63/141,139, (Continued)

(51) Int. Cl.
*G06F 3/06* (2006.01)
*G06F 11/10* (2006.01)
(Continued)

(52) U.S. Cl.
CPC ............ *G06F 3/0614* (2013.01); *G06F 3/061* (2013.01); *G06F 3/0619* (2013.01);
(Continued)

(58) Field of Classification Search
CPC ...... G06F 3/0605; G06F 3/061; G06F 3/0613; G06F 3/0614; G06F 3/0619;
(Continued)

(56) References Cited

U.S. PATENT DOCUMENTS 5,721,840 A    2/1998 Soga
6,714,980 B1   3/2004 Markson et al.
(Continued)

FOREIGN PATENT DOCUMENTS

EP    1577736 A2    9/2005
EP    3404527 A1    11/2018
(Continued)

OTHER PUBLICATIONS

Communication Pursuant to Article 94(3) EPC issued in European Application No. 22742390.2 dated Jun. 12, 2024, 8 pages.
(Continued)

*Primary Examiner* — Larry T Mackall
(74) *Attorney, Agent, or Firm* — Cozen O'Connor

(57) ABSTRACT

A data storage method and system comprising: at least two servers that comprise a storage volume and configured to run an operating system designated to host data accessible and exposable over a data plane (DP) network, at least one orchestrator configured to interact with each of said servers and designated to control a control plane (CP) of said DP network, wherein each server is configured to manage its own DP components, wherein the orchestrator is configured to utilize the CP in order to take at least one consistency group snapshot, and further configured to manage an suspension and resumption in order to provide a consistent snapshotting of the volumes in a particular point in time.

20 Claims, 31 Drawing Sheets

Related U.S. Application Data filed on Jan. 25, 2021, provisional application No. 63/141,194, filed on Jan. 25, 2021, provisional application No. 63/141,263, filed on Jan. 25, 2021, provisional application No. 63/141,179, filed on Jan. 25, 2021, provisional application No. 63/141,133, filed on Jan. 25, 2021, provisional application No. 63/141,213, filed on Jan. 25, 2021, provisional application No. 63/141,236, filed on Jan. 25, 2021, provisional application No. 63/141,227, filed on Jan. 25, 2021, provisional application No. 63/141,245, filed on Jan. 25, 2021, provisional application No. 63/141,257, filed on Jan. 25, 2021, provisional application No. 63/141,267, filed on Jan. 25, 2021, provisional application No. 63/141,151, filed on Jan. 25, 2021, provisional application No. 63/141,162, filed on Jan. 25, 2021, provisional application No. 63/141,205, filed on Jan. 25, 2021.

(51) Int. Cl.

| | |
|---|---|
| *G06F 11/14* | (2006.01) |
| *G06F 11/16* | (2006.01) |
| *G06F 11/20* | (2006.01) |
| *G06F 16/11* | (2019.01) |
| *G06F 16/178* | (2019.01) |
| *H04L 41/0659* | (2022.01) |
| *H04L 67/1095* | (2022.01) |
| *H04L 67/1097* | (2022.01) |

(52) U.S. Cl.
CPC .......... *G06F 3/0622* (2013.01); *G06F 3/0631* (2013.01); *G06F 3/064* (2013.01); *G06F 3/0665* (2013.01); *G06F 3/067* (2013.01); *G06F 11/1092* (2013.01); *G06F 11/1464* (2013.01); *G06F 11/1469* (2013.01); *G06F 11/1662* (2013.01); *G06F 11/2082* (2013.01); *G06F 11/2087* (2013.01); *G06F 11/2092* (2013.01); *G06F 11/2094* (2013.01); *G06F 16/128* (2019.01); *G06F 16/178* (2019.01); *H04L 41/0659* (2013.01); *H04L 67/1095* (2013.01); *H04L 67/1097* (2013.01); *G06F 2201/85* (2013.01)

(58) Field of Classification Search
CPC ...... G06F 3/0622; G06F 3/0631; G06F 3/064; G06F 3/065; G06F 3/0655; G06F 3/0658; G06F 3/0659; G06F 3/0665; G06F 3/067; G06F 3/0689; G06F 9/505; G06F 11/00; G06F 11/1076; G06F 11/1092; G06F 11/1464; G06F 11/1469; G06F 11/1662; G06F 11/2069; G06F 11/2089; G06F 11/2092; G06F 11/2094; G06F 16/128; G06F 16/178; G06F 16/182; G06F 16/1873; G06F 2201/82; G06F 2201/84; G06F 2201/85; H04L 9/0822; H04L 9/089; H04L 41/0659; H04L 67/1095; H04L 67/1097
See application file for complete search history.

(56) References Cited

U.S. PATENT DOCUMENTS

| | | | |
|---|---|---|---|
| 7,111,084 B2 | 9/2006 | Tan et al. | |
| 7,313,724 B1 | 12/2007 | Kekre et al. | |
| 7,334,095 B1 | 2/2008 | Fair et al. | |
| 8,046,548 B1 | 10/2011 | Chatterjee et al. | |
| 8,423,733 B1 | 4/2013 | Ozdemir | |
| 8,743,872 B2 | 6/2014 | Chidambaram et al. | |
| 8,751,533 B1 | 6/2014 | Dhavale et al. | |
| 8,848,727 B2 | 9/2014 | Saraiya et al. | |
| 9,112,890 B1 | 8/2015 | Ori | |
| 9,405,483 B1* | 8/2016 | Wei | G06F 3/0619 |
| 9,436,716 B2 | 9/2016 | Starovoitov et al. | |
| 9,489,150 B2 | 11/2016 | Aszmann et al. | |
| 9,613,046 B1 | 4/2017 | Xu et al. | |
| 9,881,014 B1 | 1/2018 | Bono et al. | |
| 10,210,048 B2 | 2/2019 | Sancheti | |
| 10,365,978 B1* | 7/2019 | Whitney | G06F 11/1464 |
| 10,460,110 B1 | 10/2019 | Allo et al. | |
| 10,628,058 B1 | 4/2020 | Riley et al. | |
| 10,642,779 B2 | 5/2020 | Zhu et al. | |
| 10,782,997 B1 | 9/2020 | Krishna Murthy et al. | |
| 11,461,109 B1 | 10/2022 | Krasilnikov et al. | |
| 2004/0024962 A1 | 2/2004 | Chatterjee et al. | |
| 2005/0050271 A1 | 3/2005 | Honda et al. | |
| 2005/0074003 A1 | 4/2005 | Ball et al. | |
| 2005/0240792 A1 | 10/2005 | Sicola et al. | |
| 2005/0256961 A1* | 11/2005 | Alon | H04L 41/0873 709/229 |
| 2006/0085607 A1 | 4/2006 | Haruma | |
| 2007/0239944 A1 | 10/2007 | Rupanagunta et al. | |
| 2008/0049276 A1 | 2/2008 | Abe | |
| 2008/0162817 A1 | 7/2008 | Batterywala | |
| 2009/0132617 A1 | 5/2009 | Soran et al. | |
| 2009/0265510 A1* | 10/2009 | Walther | G06F 11/1092 711/E12.001 |
| 2010/0115008 A1 | 5/2010 | Nakatani et al. | |
| 2010/0199042 A1 | 8/2010 | Bates et al. | |
| 2010/0250748 A1 | 9/2010 | Sivasubramanian et al. | |
| 2011/0246423 A1 | 10/2011 | Jess | |
| 2011/0296102 A1 | 12/2011 | Nishihara et al. | |
| 2012/0079318 A1 | 3/2012 | Colgrove et al. | |
| 2012/0110252 A1 | 5/2012 | McKean | |
| 2012/0117241 A1 | 5/2012 | Witt et al. | |
| 2012/0147888 A1 | 6/2012 | Lu et al. | |
| 2014/0047040 A1 | 2/2014 | Patiejunas et al. | |
| 2014/0115162 A1 | 4/2014 | Kalyanaraman et al. | |
| 2014/0215147 A1 | 7/2014 | Pan | |
| 2014/0229675 A1 | 8/2014 | Aizman et al. | |
| 2015/0006665 A1 | 1/2015 | Krishnamurthy et al. | |
| 2015/0012701 A1 | 1/2015 | Cudak et al. | |
| 2015/0120936 A1 | 4/2015 | Palan et al. | |
| 2016/0004616 A1 | 1/2016 | Narita et al. | |
| 2016/0077917 A1 | 3/2016 | Battepati et al. | |
| 2016/0085588 A1 | 3/2016 | Rakitzis et al. | |
| 2016/0179411 A1 | 6/2016 | Connor et al. | |
| 2016/0210066 A1 | 7/2016 | Yamaura et al. | |
| 2016/0246864 A1 | 8/2016 | Boldt et al. | |
| 2016/0283126 A1 | 9/2016 | Bhagwat et al. | |
| 2016/0342470 A1 | 11/2016 | Cudak et al. | |
| 2017/0147437 A1 | 5/2017 | Borlick et al. | |
| 2017/0192682 A1 | 7/2017 | Atia et al. | |
| 2017/0286179 A1 | 10/2017 | Dimnaku et al. | |
| 2018/0107409 A1 | 4/2018 | Condict et al. | |
| 2018/0165169 A1 | 6/2018 | Camp et al. | |
| 2018/0173554 A1* | 6/2018 | CaraDonna | G06F 11/2069 |
| 2018/0181348 A1 | 6/2018 | Kusters et al. | |
| 2018/0260125 A1 | 9/2018 | Botes et al. | |
| 2018/0314445 A1 | 11/2018 | Karale et al. | |
| 2019/0004899 A1 | 1/2019 | Gao et al. | |
| 2019/0028691 A1 | 1/2019 | Hinds et al. | |
| 2019/0034104 A1 | 1/2019 | Agarwal et al. | |
| 2019/0042090 A1 | 2/2019 | Raghunath et al. | |
| 2019/0089537 A1 | 3/2019 | Gray | |
| 2019/0163374 A1 | 5/2019 | Venkatesh et al. | |
| 2019/0266103 A1 | 8/2019 | Pearson et al. | |
| 2019/0354406 A1 | 11/2019 | Ganguli et al. | |
| 2019/0357281 A1 | 11/2019 | Elbaz et al. | |
| 2019/0386957 A1 | 12/2019 | Leon | |
| 2020/0034077 A1 | 1/2020 | Haravu et al. | |
| 2020/0065317 A1 | 2/2020 | Sarkar et al. | |
| 2020/0081806 A1 | 3/2020 | Brown et al. | |
| 2020/0117750 A1 | 4/2020 | Chen et al. | |
| 2020/0136943 A1 | 4/2020 | Banyal et al. | |
| 2020/0218617 A1 | 7/2020 | Knestele et al. | |
| 2020/0233881 A1 | 7/2020 | Harduf et al. | |

(56) References Cited

U.S. PATENT DOCUMENTS

| | | | |
|---|---|---|---|
| 2020/0252290 | A1 | 8/2020 | Puttagunta et al. |
| 2020/0265050 | A1 | 8/2020 | Shimizu et al. |
| 2020/0285543 | A1 | 9/2020 | Sancheti |
| 2020/0293499 | A1 | 9/2020 | Kohli et al. |
| 2020/0310662 | A1 | 10/2020 | Staab et al. |
| 2020/0310915 | A1 | 10/2020 | Alluboyina et al. |
| 2020/0329101 | A1 | 10/2020 | Kumar et al. |
| 2020/0348872 | A1 | 11/2020 | Tylik et al. |
| 2020/0409797 | A1 | 12/2020 | Mathew et al. |
| 2021/0109683 | A1 | 4/2021 | Cain |
| 2021/0194825 | A1 | 6/2021 | Goodman et al. |
| 2021/0314400 | A1 | 10/2021 | Longinov et al. |
| 2022/0027051 | A1* | 1/2022 | Kant ............... G06F 3/0617 |
| 2022/0075539 | A1 | 3/2022 | Juch et al. |
| 2022/0191131 | A1 | 6/2022 | Gupta et al. |
| 2022/0301157 | A1 | 9/2022 | Soares et al. |
| 2022/0417004 | A1 | 12/2022 | Sapuntzakis |
| 2023/0112764 | A1 | 4/2023 | Nazari et al. |

FOREIGN PATENT DOCUMENTS

| | | | |
|---|---|---|---|
| EP | 3493046 | A1 | 6/2019 |
| EP | 3663902 | A1 | 6/2020 |
| WO | WO 2005/055043 | A1 | 6/2005 |
| WO | 2016083837 | A1 | 6/2016 |
| WO | 2018164782 | A1 | 9/2018 |

OTHER PUBLICATIONS

Extended European Search Report for European Patent Application No. 22742392.8 dated Jun. 6, 2024, 10 pages.
Non Final Office Action for U.S. Appl. No. 18/273,194 mailed Jun. 18, 2024, 24 pages.
Supplementary European Search Report for EP Patent Application No. 22742390.2 dated May 31, 2024, 4 pages.
Partial Supplementary European Search Report for EP Patent Application No. 22742391.0 dated Nov. 28, 2024, 16 pages.
Extended European Search Report for EP Patent Application No. 22742386.0 dated Nov. 28, 2024, 11 pages.
Extended European Search Report for EP Patent Application No. 22742388.6 dated Dec. 11, 2024, 59 pages.
Extended European Search Report for EP Patent Application No. 22742389.4 dated Dec. 3, 2024, 12 pages.
Non Final Office Action for U.S. Appl. No. 18/273,148, mailed Jan. 30, 2025, 11 pages.
Partial Supplementary European Search Report for EP Patent Application No. 22742393.6 dated Dec. 11, 2024, 16 pages.
Partial Supplementary European Search Report for EP Patent Application No. 22742394.4 dated Dec. 11, 2024, 17 pages.
Partial Supplementary European Search Report for EP Patent Application No. 22742395.1 dated Dec. 16, 2024, 15 pages.
Partial Supplementary European Search Report for EP Patent Application No. 22742396.9 dated Dec. 4, 2024, 16 pages.
Partial Supplementary European Search Report for EP Patent Application No. 22742397.7 dated Dec. 18, 2024, 17 pages.
Final Office Action for U.S. Appl. No. 18/273,194 mailed Oct. 29, 2024, 34 pages.
Non Final Office Action for U.S. Appl. No. 18/273,137 mailed Nov. 21, 2024, 34 pages.
Non Final Office Action for U.S. Appl. No. 18/273,141 mailed Nov. 7, 2024, 24 pages.
Non Final Office Action for U.S. Appl. No. 18/273,174, mailed Nov. 22, 2024, 25 pages.
Non Final Office Action for U.S. Appl. No. 18/273,188 mailed Oct. 18, 2024, 8 pages.
Non Final Office Action for U.S. Appl. No. 18/273,215 mailed Dec. 4, 2024, 12 pages.
Non Final Office Action for U.S. Appl. No. 18/273,230 mailed Sep. 18, 2024, 27 pages.
"What is a Block Device," PhoenixNAP Global IT Services, Apr. 18, 2024, https://phoenixnap.com/glossary/block-device, 3 pages.
Final Office Action for U.S. Appl. No. 18/273,215, mailed Jun. 11, 2025, 13 pages.
Non Final Office Action for U.S. Appl. No. 18/273,162, mailed May 21, 2025, 13 pages.

* cited by examiner

CONSISTENCY GROUP DISTRIBUTED SNAPSHOT METHOD AND SYSTEM

FIELD OF THE INVENTION

The present invention is directed to computer data storage methods and systems, and, more particularly, to the use and implementation of logical architecture concepts for increasing computer data storage management efficiency and hardware redundancy.

BACKGROUND OF THE INVENTION

Providing data storage and data backup capabilities represent a significant concern as current computing systems, whether local, remote or cloud based (such as containers packages, private/public/multi-cloud systems, etc.), require ever more extensive data storage solutions for their proper operation. Usually, such data provision and management are made and offered by designated data centers and traditionally the provision of used or expected to be used data storage is provided by stacking physical data storing components, i.e. hybrid hard disk drive (HHD), solid-state drive (SSD), etc.

Said stacking data storing components creates what is termed 'Storage Arrays', (or a disk array) and is used for block-based storage, file-based storage, object storage, etc. Rather than store data on a server, storage arrays use multiple drives in a collection capable of storing a huge amount of data, controlled by a local/central controlling system.

Traditionally, a storage array controlling system provides multiple storage services so as to keep track of capacity, space allocation, volume management, snapshotting, error identification and tracking, encryption, compression, etc. Services of such type require significant computing capacity, metadata, data storage, accelerators, etc.—thus, such services require the designation of extensive infrastructure and budget capacities and resources.

Commonly, a storage array is separated from a system server's operability and is configured to implement system and application operations on dedicated hardware. For example, common storage array hardware architecture may include a server stack, a storage array stack and media I/O devices. The I/O devices are configured to communicate with the servers via the storage stack.

One of the services provided by traditional storage arrays is the provision of redundant arrays of independent disks (RAID) as a way of storing the same data in different places on multiple HDDs or SSDs to protect data in the case of a system failure. There are different RAID levels, not all have the goal of providing redundancy though they may be directed at improving overall performance and increasing storage capacity.

RAID configurations commonly employ the techniques of striping, mirroring, or parity to create large reliable data stores from multiple general-purpose computer HDDs. For instance, RAID 5 consists of block-level striping with distributed parity. Upon failure of a single drive, subsequent reads can be calculated from the distributed parity such that no data is lost. RAID 6 extends RAID 5 by adding another parity block; thus, it uses block-level striping with two parity blocks distributed across all member disks. Typically, RAID 5/6 have a performance penalty on write operations because of the overhead associated with parity calculations. Current RAID 5/6 run only on a single core per RAID array. All the parity calculations are done by a single core. Using RAID on multi-core will require locking per I/O to prevent parallel write on the same strip, and thereby reducing the performance dramatically. New SSD drives with high bandwidth get limited write performance when used with current RAID 5/6 due to having the one core in the system which runs the parity calculations and being fully utilized. It being noted that a multi-core processor is a computer processor integrated circuit with two or more separate processing units, called cores, each of which reads and executes program instructions, as if the computer had several processors. Modern servers may include more than 100 cores per server. Whereas RAID is commonly referred to as a data storage virtualization technology that combines multiple physical disk drive components into one or more logical units for the purposes of data redundancy, performance improvement, or both.

RAID 1 consists of data mirroring, without parity or striping. In RAID 1 architecture Data is written identically to two drives, thereby producing a "mirrored set" of drives. The array continues to operate as long as at least one drive is functioning.

Logical Volume Manager (LVM) enables the provision of a snapshot of volumes, i.e., the making of copy of the data at a certain point in time.

Remote replication is the process of copying production data to a device at a remote location for data protection or disaster recovery purposes.

Remote replication may be either synchronous or asynchronous. Synchronous replication writes data to the primary and secondary sites at the same time. Characteristically, Asynchronous replication involves a delay while the writing of the data to the secondary site is lagged. Because asynchronous replication is designed to work over longer distances and requires less bandwidth, it is often a better option for disaster recovery. However, asynchronous replication risks a loss of data during a system outage because data at the target device isn't synchronized with the source data. Most nowadays enterprise data storage vendors include replication software on their high-end and mid-range storage arrays. To enable communality of operation of common hardware, the practice of software-defined storage (SDS) was established as an approach to data management, in which data storage resources are abstracted from the underlying physical storage hardware and thereby are able to provide flexible exploitation of available hardware and data storage resources.

SDS is also referred to in the art as hyper-converged infrastructure (HCI) which typically runs on commercial off-the-shelf servers. The primary difference between conventional infrastructure and HCI is that in HCI both the storage area network and the underlying storage abstractions are implemented virtually in software rather than physically, in hardware. Storage arrays and SDS solutions usually include integrated storage software stack for the management and control of data storage and its traffic.

Said integrated software stack provides storage maintenance services, such as data protection (e.g. backup, redundancy, recovery, etc.), high availability, space allocation, data reduction, data backup, data recovery, etc. In effect, the integrated software stack requires dedication of storage array resources for its control, management, administration and maintenance. Such resources would need to address issues such as storage stack code, control protocol, nodes interconnect protocols, failure domain, performance, stack model and number of nodes in a cluster. These services and requirements are traditionally provided locally per storage array and require update, management and overall administration.

Building and maintaining the integrated software disclosed above may be very costly, inter alia, due to the multitude of services it is to provide and the large number of clients it should service (both on the media side as well as on the server side). The integrated software should also have a high rate of reliability and the code needs to be efficient. Nevertheless, current storage arrays tend to experience challenges to their reliability, quality and performance.

A typical central storage array is configured to serve a large number of clients, thus, even if large computing power is attributed to it, such power would be divided among said many clients. Due to its centrality, errors or malfunctions occurring at the storage array or stack cluster immediately affect overall system/s performance In nowadays computing system, the numbers of storage arrays or stack clusters dedicated to data storage are considerably smaller and less available compared to resources dedicated to server systems, as a result, the industry has gained much more 'track record' with servicing servers rather than with servicing data storages (e.g., leading to server related code to be debugged more frequently, be more efficient, and thereby be prone to less errors).

Furthermore, the maintenance of such integrated software requires constant upkeep and update to technological advancement/s. Thus, the current quality and performance of the integrated software stack operation may not always be optimal.

Modern operating systems, such as Linux and Windows Server, include a robust collection of internal storage components [(direct attached storage—(DAS)] which enable direct local services (such as encryption, compression, RAID, etc.) when central storage systems are not needed or not desired due to design requirements or due to the drawbacks attributed to storage arrays or data stack clusters.

The storage components are implemented in the kernel layer, assuring immediate access and thereby assuring high OS and/or application performance. DAS is mostly limited to non-critical applications due to its inherent drawback due to the direct adverse effect of server communication failure which will directly hamper the accessibility to the data stored in the DAS. Thus, as a rule, enterprises do not use DAS for critical applications. Nevertheless, current modern server and operating systems are designed to include the services needed to support DAS capabilities.

Operating systems maturity provides stable components intended to be used in the enterprise, although, due to the DAS reliability limitations, reliance on storage arrays is still a high priority consideration.

The raw components included in the OS server system to facilitate said direct local services (such as encryption, compression, RAID, etc.) are used today only for basic operating system DAS usage. Nevertheless, although many such components enabling the services are present in OS servers, nowadays they do not enable a full suite of data management and control services available from traditional storage array systems.

Storage arrays and SDS solutions are commonly built with integrated storage software stacks. They also commonly use proprietary protocols to connect remote resources between controllers.

Modern operating systems, such as Linux and Windows Server, include a robust collection of storage components. The storage components are usually implemented in the kernel layer, thus, providing high performance.

It is commonly achievable to stack local operating system components within the same server. However, stacking remote resources located in other servers, is currently not possible.

RAID is a data storage virtualization technology that combines multiple physical disk drive components into one or more logical units for the purposes of data redundancy, performance improvement, or both.

Traditionally, hot spares act as standby drives in RAID 1, RAID 5, or RAID 6 volume groups, which are fully functional drives that contain no data. In current storage systems, if a drive fails in the volume group, the controller automatically reconstructs data from the failed drive to a hot spare.

If a drive fails in the storage array, the hot spare drive is automatically substituted for the failed drive without requiring a physical swap. If the hot spare drive is available when a drive fails, the controller uses redundancy data to reconstruct the data from the failed drive to the hot spare drive.

A volume snapshot is used to represents the content of a volume at a particular point in time. Snapshots are generally created for the sake of data protection, but they can also be used for testing application software and data mining. A storage snapshot can also be used for disaster recovery when information is lost due to human error or data corruption.

A consistency group is a collection of base volumes in a certain storage array. These base volumes, which are the source of a snapshot image, are usually referred to as member volumes of a consistency group. The purpose of a consistency group is to take simultaneous snapshot images of multiple volumes, thus obtaining copies of a collection of volumes at a particular point in time.

Most mid-range and high-end storage arrays create snapshot consistency groups within volumes inside the storage array.

Obtaining a local snapshot is enabled by a server operating system that includes a logical volume manger (LVM) that enables obtaining a local snapshot on a single volume. In distributed storage system, since the volumes are distributed across multiple servers and multiple LVMs, obtaining or creating a consistency group is not usually possible or supported.

Quality of service (QoS) is a critical enabling technology for enterprises and service providers that want to deliver consistent primary storage performance to business-critical applications in a multitenant or enterprise infrastructure.

When multiple workloads share a limited resource, QoS helps provide control over how that resource is shared and prevents the noisiest neighbor (application) from disrupting the performance of all the other applications on the same system.

On storage arrays, QoS can be set per volume with limits on bandwidth and input output operations per second (IOPS). Usually, in shared drive storage stack, with distributed servers, there is not a single point that can enforce QoS like in a storage array.

Disk cloning is the process of making an image of a partition or of an entire hard drive. This can be useful for copying the drive to other computers and for backup and recovery purposes.

Typically, copying is taken at a particular point in time as hosts continue to access the data. Most mid-range and high-end storage arrays include the ability to clone volumes inside the storage array. Volumes managed on servers and not on storage arrays do not have the ability to clone, since source and target may reside on different entities.

Logical volume management (LVM) is a form of storage virtualization that offers system administrators a more flexible approach to managing disk storage space than traditional partitioning. This type of virtualization tool is located within the device-driver stack on the operating system. It works by chunking the physical volumes (PVs) into physical extents (PEs). The PEs are mapped onto logical extents (LEs) which are then pooled into volume groups (VGs). These groups are linked together into logical volumes (LVs) that act as virtual disk partitions and that can be managed as such by using LVM.

Thick provisioning is a commonly practiced type of storage pre-allocation. With thick provisioning, the complete amount of virtual disk storage capacity is pre-allocated on the physical storage when the virtual disk is created. A thick-provisioned virtual disk consumes all the space allocated to it in the datastore right from the start, so the space is unavailable for use by other volume.

Thin provisioning is another commonly practiced type of storage pre-allocation. A thin-provisioned virtual disk consumes only the space that it needs initially and grows with time according to increase in demand Thin provisioning consumes much more RAM to hold metadata of the thin allocation that is allocated in relatively small chunks. Thin provisioning consumes much more CPU on I/O needed to facilitate random access to translate logical addresses to physical since it has to walk through b-tree data structure. Shared storage is a type of storage resource that is shared or accessed by multiple servers.

The Linux Clustered Logical Volume Manager (CLVM) is a set of clustering extensions to LVM. These extensions allow a cluster of computers to manage shared storage (for example, on a SAN) using LVM. CLVM allows a user to configure logical volumes on shared storage by locking access to physical storage while a logical volume is being configured and uses clustered locking services to manage the shared storage.

Typically, configuring and maintaining a cluster is a complex task. Furthermore, a single node misbehaving can impact the entire cluster health. Also, commonly OS distributions requires a separate license fee for clustering.

Small Computer System Interface (SCSI) is a set of standards for physically connecting and transferring data between computers and peripheral devices. iSCSI stands for Internet Small Computer Systems Interface. iSCSI is a transport layer protocol that works on top of the Transport Control Protocol (TCP). It enables block-level SCSI data transport between the iSCSI initiator and the storage target over TCP/IP networks.

Logical unit number (LUN) is a number used to identify a logical unit, which is a device addressed by the SCSI protocol or Storage Area Network protocols which encapsulate SCSI, such as Fibre Channel (FC) or iSCSI.

When adding a new device, a rescan process is required, to find the new device on the bus. The rescan process needs to go over all the Host Bus Adapters (HBA). In each HBA it needs to go over all the SCSI targets. On each target it needs to go over all the LUN numbers and try to check if a new device exists. Each LUN check needs to wait until timeout before continuing.

A rescan process is performed also upon removal of a device. Typically the rescan process can take up to 10 minutes, depending on number of HBA, targets and LUN.

NVMe (non-volatile memory express) is a host controller interface and storage protocol created to accelerate the transfer of data between enterprise and client systems and solid-state drives (SSDs).

NVMe over Fabrics (NVMe-oF) is a technology specification designed to enable nonvolatile memory express message-based commands to transfer data between a host computer and a target solid-state storage device or system over a network, such as Ethernet, Fibre Channel (FC) or InfiniBand. NVMe bus requires a rescan process similar to that performed in relation to the SCSI bus and suffers from same long scan time.

Servers usually use NVMe and SCSI standard protocols to connect remote devices over the network using different HBA and protocol technologies while the resource exposing server is commonly referred to as Target and the resource consuming server is referred to as Initiator.

The term "self-encrypting drive" (SED) is commonly used when referring to storage media's technologies such as HDDs, SSDs, etc. with built-in full-disk encryption. The term "OPAL" is commonly used to describe a set of specifications for self-encrypting drives developed by the Trusted Computing Group.

Many of the self-encrypting SSDs/HDDs available today implement the "OPAL 2.0" encryption and Enterprise standards developed by the Trusted Computing Group (TCG). Enterprise SAS versions of the TCG standard are called "TCG Enterprise" drives. The hardware manufactured according to the standards is labelled accordingly.

Unlocking of a drive may be done during operating system runtime using software utilities, in a pre-boot authentication environment, or with a BIOS based ATA-password on power up. Key management takes place within the disk controller and encryption keys are usually 128 or 256 bit Advanced Encryption Standard (AES).

Self-encrypting drives adhering to the TCG "OPAL 2.0" standard specification (almost all modern self-encrypting drives) implement key management via an authentication key, and a 2nd-level data encryption key. The data encryption key is the key against which the data is actually encrypted/decrypted. The authentication key is the user-facing 1st-level password/passphrase which decrypts the data encryption key (which in turn decrypts the data). This approach has specific advantages:

It allows the user to change the passphrase without losing the existing encrypted data on the disk.

It improves security, as is fast and easy to respond to security threats and revoke a compromised passphrase. It also facilitates near-instant and cryptographically secure full disk erasure.

A hardware security module (HSM) is a physical computing device that safeguards and manages digital keys for strong authentication and provides crypto-processing. These modules traditionally come in the form of a plug-in card or an external device that attaches directly to a computer or network server.

Key-in-memory exploits on the server can be performed, since at one time the key must be in the server main memory, even when using special storage for keys on the server.

Tunneling protocol is a communications protocol that allows for the movement of data from one network to another. It involves allowing private network communications to be sent across a public network through a process called encapsulation.

Because tunneling involves repackaging the traffic data into a different form, perhaps with encryption as standard, it can hide the nature of the traffic that is run through a tunnel.

Typically, a storage controller is the compute part of a storage array that runs the storage software. If the storage controller fails, the storage software can't run and the array goes offline. As a result, redundant storage controllers are critical to maintaining data accessibility. In a common active-active approach, both controllers are available to support LUNs and volumes. Both storage controllers can have LUNs assigned to them. If a controller fails, the surviving controller can support it and the failed controller's LUNs.

Asymmetric Logical Unit Access (ALUA), also known as Target Port Groups Support (TPGS), is a set of SCSI concepts and commands that define path prioritization for SCSI devices. Asymmetric Namespace Access (ANA) is an NVMe protocol feature for monitoring and communicating path states to the host operating system's multipath I/O (MPIO) or multipath stack, which uses information communicated through ANA to select and manage multiple paths between the initiator and target.

Typically, enterprise high-end and mid-range storage arrays are built with groups of dual controllers. One controller can perform storage stack operations for specific volume, while the other just forward the IO. IO forwarding is done using an interconnect. Either by dedicated link between the controllers or via the network. Hosts are connected to both controllers. Controllers use ALUA or ANA to update the host about the preferred path of the serving controller for that volume. Storage arrays are built with integrated storage stacks that include support for dual controllers, interconnect and failover. Operating systems include a robust, complex and expensive set of storage stack components, designed and used for such host services.

Thus, the presented drawbacks and function restrictions/requirements of the currently available storage systems leave room for the provision of better, more efficient data storage systems and methods that would provide a reliable, fast, cost-effective and comprehensive solutions capable of providing reliable data storages capabilities as well as flexibility adapted for various conditions and concerns, and hence, providing real-time operation tailored to the various needs of the user and to the available infrastructure.

SUMMARY OF THE INVENTION

The present invention provides an efficient data storage system and method that enables to utilize unexploited and available hardware resources in order to provide a reliable, fast, cost-effective and comprehensive solution capable of providing reliable data storages capabilities as well as flexibility adapted for various conditions and concerns.

According to one aspect of the invention such a system and method is obtainable by utilizing unexploited and available DAS in order to to provide a reliable, fast, cost-effective and comprehensive solution capable of providing reliable data storages capabilities as well as flexibility adapted for various conditions and concerns.

The following embodiments and aspects thereof are described and illustrated in conjunction with systems, devices and methods which are meant to be exemplary and illustrative, not limiting in scope. In various embodiments, one or more of the above-described problems have been reduced or eliminated, while other embodiments are directed to other advantages or improvements.

According to one aspect of the invention, a data storage is provided, comprising: at least one target server that comprises a storage media and configured to run an operating system designated to host data accessible over a data plane (DP) network, at least one initiator server configured to run an operating system designated to access and expose a remote resource/s over the data plane (DP) network, and at least one orchestrator configured to interact with each of said servers and designated to control a control plane (CP) of said DP network, wherein a designated portion of the storage media of the target server is exposed to the DP network, and wherein the orchestrator is designated to utilize the designated portion of the storage media by orchestrating the storage stack components (SS) and the standard storage stack (SSS) of the operating system embedded within said servers, such that the initiator server is configured to interact with the target server via the DP network.

According to another aspect of the invention, a data storage is provided, comprising: at least one target server that comprises a storage media and configured to run an operating system designated to host data accessible over a data plane (DP) network, at least one initiator server configured to run an operating system designated to access and expose a remote resource/s over the data plane (DP) network, and at least one orchestrator configured to interact with each of said servers and designated to control a control plane (CP) of said DP network, wherein the orchestrator is configured to utilize the CP in order to map and recognize a block device stored within the storage media, wherein the block device is configured to be exposed to the DP network by the orchestrator, and wherein the orchestrator is configured to transfer the block device to the initiator server via the DP network.

According to yet another aspect of the invention, a data storage is provided, comprising: at least one target server that comprises a storage media and configured to run an operating system designated to host data accessible over a data plane (DP) network, at least one initiator server comprises a storage media and configured to run an operating system designated to access and expose a remote resource/s over the data plane (DP) network, and at least one orchestrator configured to interact with each of said servers and designated to control a control plane (CP) of said DP network, wherein the combined storage medias form a shared drive storge stack, wherein the orchestrator is configured to utilize the CP in order to monitor and inspect the operability and condition of the shared drive storge stack, and further configured to monitor, record and inspect the proper operation of block device/s stored within said shared drive storge stack, wherein the orchestrator is configured to identify a malfunction affecting the shared drive storge stack, and wherein the orchestrator is configured to conduct a non-centralized rebuild procedure by managing a simultaneous and coordinated utilization of at least one operatable remote storage media that form the shared drive storge stack.

According to yet another aspect of the invention, a data storage is provided, comprising: at least two servers that comprise a storage volume and configured to run an operating system designated to host data accessible and exposable over a data plane (DP) network, at least one orchestrator configured to interact with each of said servers and designated to control a control plane (CP) of said DP network, wherein each server is configured to manage its own DP components, wherein the orchestrator is configured to utilize the CP in order to take at least one consistency group snapshot, and further configured to manage an IO suspension and resumption in order to provide a consistent snapshotting of the volumes in a particular point in time.

According to yet another aspect of the invention, a data storage is provided, comprising: at least two servers that comprise a storage volume and configured to run an operating system designated to host data accessible and exposable over a data plane (DP) network, at least one orchestrator configured to interact with each of said servers and designated to control a control plane (CP) of said DP network, wherein the at least two storage volumes create a distributed storage stack, wherein each server is configured to manage and enforce local QoS DP originated from its own volume, and wherein the orchestrator is configured to centrally orchestrate and enforce QoS CP limitations within the distributed storage stack.

According to yet another aspect of the invention, a data storage is provided, comprising: at least one target server that comprises a storage media volume and configured to run an operating system designated to host data accessible over a data plane (DP) network using at least one target component, at least one initiator server comprises a storage media volume and configured to run an operating system designated to access and expose stored data over the data plane (DP) network using at least one initiator component, and at least one orchestrator configured to interact with each of said servers and designated to control a control plane (CP) of said DP network, wherein the orchestrator is configured to create a data snapshot of the volume stored in the target server, wherein the data snapshot is configured to be exposed to the target server through the initiator component, and wherein a clone of the volume of the target server is configured to be created on the volume of the initiator server.

According to yet another aspect of the invention, a data storage is provided, comprising: at least two servers that comprise a LVM storage volume and configured to run an operating system designated to host data accessible and exposable over a data plane (DP) network, at least one orchestrator configured to interact with each of said servers and designated to control a control plane (CP) of said DP network, wherein the synchronization between the servers is conducted using the orchestrator and without the need for clustering, and wherein the orchestrator is configured to queue parallel operations and ensure that only a storage volume which belongs to one server will conduct an operation in a given time.

According to yet another aspect of the invention, a data storage is provided, comprising: at least one target server that comprises a storage media volume and configured to run an operating system designated to host data accessible over a data plane (DP) network using at least one target component, at least one initiator server comprises a storage media volume and configured to run an operating system designated to access and expose stored data over the data plane (DP) network using at least one initiator component, and at least one orchestrator configured to interact with each of said servers and designated to control a control plane (CP) of said DP network, wherein the orchestrator is configured to coordinate the target server side and the initiator server side and conduct a remote device attachment without the need for rescan/bus scan.

According to yet another aspect of the invention, a data storage is provided, comprising: at least one encrypted server that comprise a storage volume and configured to run an operating system designated to host data accessible and exposable over a data plane (DP) network, at least one orchestrator configured to interact with each of said server and designated to control a control plane (CP) of said DP network, wherein the orchestrator is configured to manage the encryption by storing at least one key in its database such that the key is stored separately from the server, and wherein the orchestrator is configured to deliver the key to the server using a tunnel without exposing the key to the server.

According to yet another aspect of the invention, a data storage is provided, comprising: at least two servers that comprise a RAID 1 storage volume and configured to run an operating system designated to host data accessible and exposable over a data plane (DP) network, wherein the servers are located remotely from each other, and wherein the RAID 1 is configured to be utilized for a remote replication procedure while connecting the two volumes of the at least two servers.

According to some embodiments, at least one initiator server is configured to interact with at least two target servers using a multipath connection; the coordination between the initiator server and the target server may be conducted using a CP orchestrator installed on each server; the communication between either a target or initiator server accessible via the DP network and the orchestrator is carried out using a designated software component installed on each of said servers; the initiator server is configured to utilize a redundant array of independent disks (RAID) storage stack component (SSC) configured to provide data redundancy originated from multiple designated portions of the storage media at multiple target servers; the RAID SSC may be configured to provide data redundancy originated from combined multiple initiator paths originated from the designated portion of the storage media of at least two target servers; the target servers may be located at different locations and wherein the orchestration is allocated across different resiliency domains; the orchestration allocated while considering different resiliency domains also considers maintaining system balance; the orchestrator may be configured to interact with the server using an administration protocol; the designated portion of the storage media is allocated using a logical volume manager (LVM) SSC; the storage media may be solid-state drive (SSD) based, storage class memory (SCM) based, random access memory (RAM) based, hard disk drive (HHD) based, a physical controller or a cloud-based service (SaaS); while the operations on each server may be implemented, wholly or partially, by a data processing unit (DPU).

BRIEF DESCRIPTION OF THE FIGURES

Some embodiments of the invention are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the invention.

In the Figures.

DETAILED DESCRIPTION OF SOME EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", "setting", "receiving", or the like, may refer to operation(s) and/or process(es) of a controller, a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Unless explicitly stated, the method embodiments described herein are not constrained to a particular order or sequence. Additionally, some of the described method embodiments or elements thereof can occur or be performed simultaneously, at the same point in time, or concurrently.

The term "Controller", as used herein, refers to any type of computing platform or component that may be provisioned with a Central Processing Unit (CPU) or microprocessors, and may be provisioned with several input/output (I/O) ports.

Figure 1:
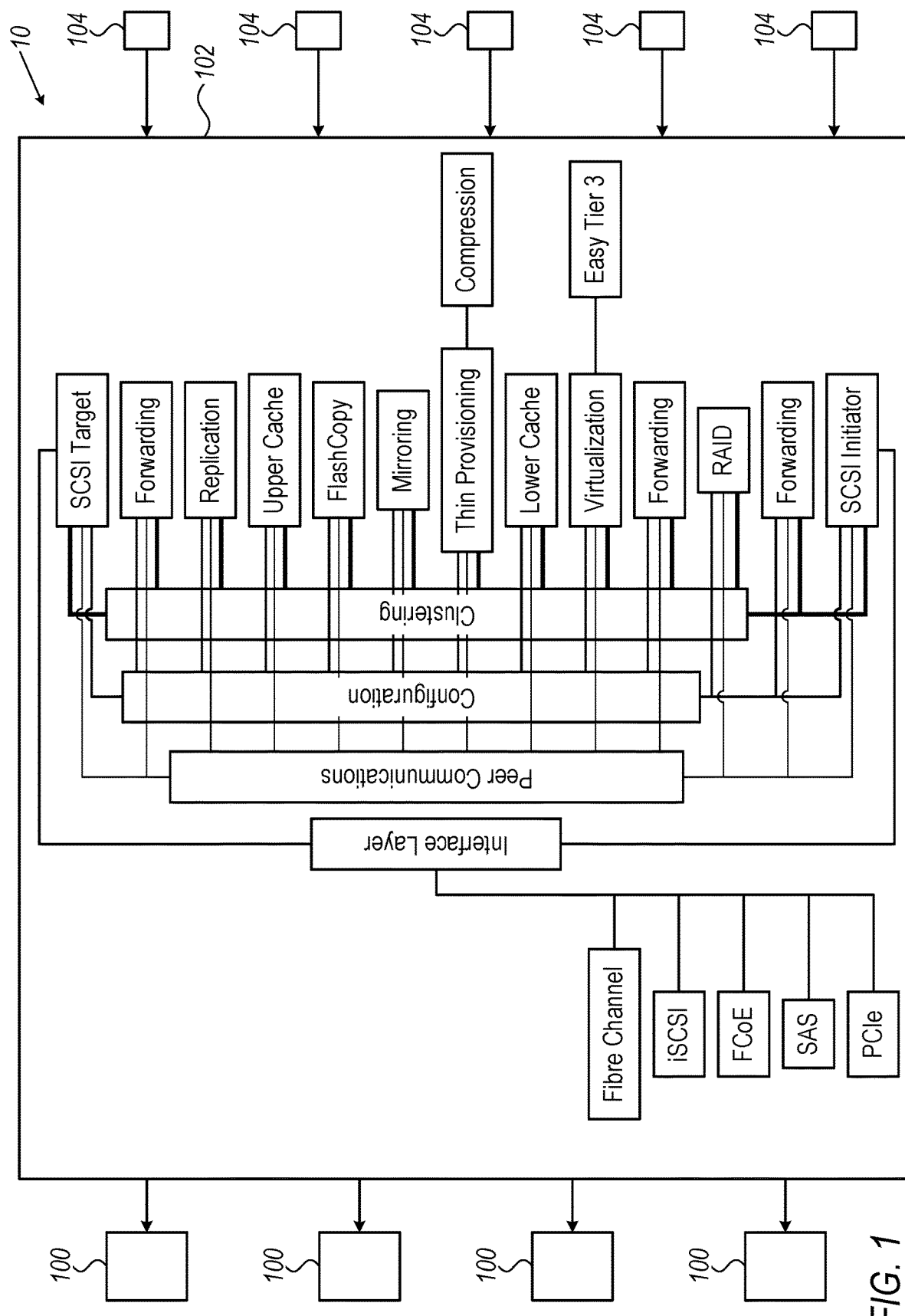
FIG. 1 constitutes a schematical illustration of a conventional storage array system.

Reference is now made to FIG. 1, which schematically illustrates a conventional storage array system 10. As shown, storage array 102 (that may be, for example, Dell EMC data storage and backup array or any other commercially available data storage system), contains multiple storage medias 104 configured to store and provide data accessibility to multiple servers 100. According to some embodiments, storage array 102 may be operatable by an operating system that includes various storage/control components designated to control and manage the operation of storage array 102 and the storage media 104 embedded within.

According to some embodiments, said conventional storage array system 10 may be configured to use a storage array 102 standard control plane (CP) and avoid installing any additional CP software on the servers 100. According to some embodiments, an operating system installed on the storage array 102 and includes storage and control components may be, by way of example, Linux based distributions, such as RedHat, SuSE, or Microsoft Windows server, etc.

Figure 2:
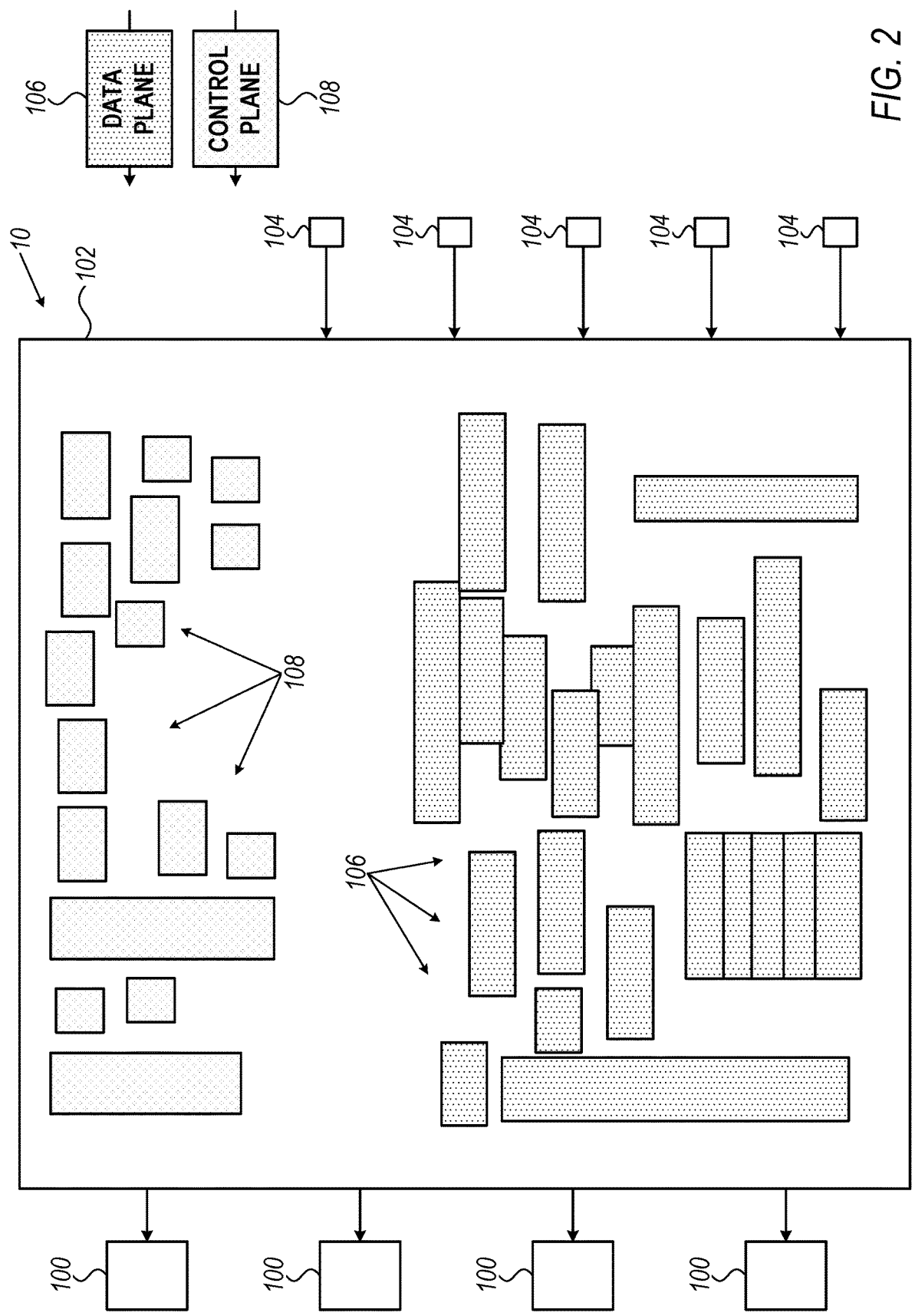
FIG. 2 constitutes a schematical illustration of a conventional storage array system.

Reference is now made to FIG. 2, which schematically illustrates a conventional storage array system 10. As shown, storage array 102 contains multiple storage media stacks 104 configured to store and provide data accessibility to multiple servers 100. According to some embodiments, storage array 102 contains data plane DP 106 and control plane CP 108 components and protocols, wherein the CP 108 components and protocols are configured to control various operations of the DP 106 components and protocols. Typically, the DP and the CP of storage solutions are coupled together, whereas such coupling presents inefficiencies and drawbacks wherein the integrated storage software oversees data services, such as data protection, high availability, space allocation, and/or data reduction as well as overseeing control services like volume creation, drive failure handling, snapshot rollback, etc.

Figure 3:
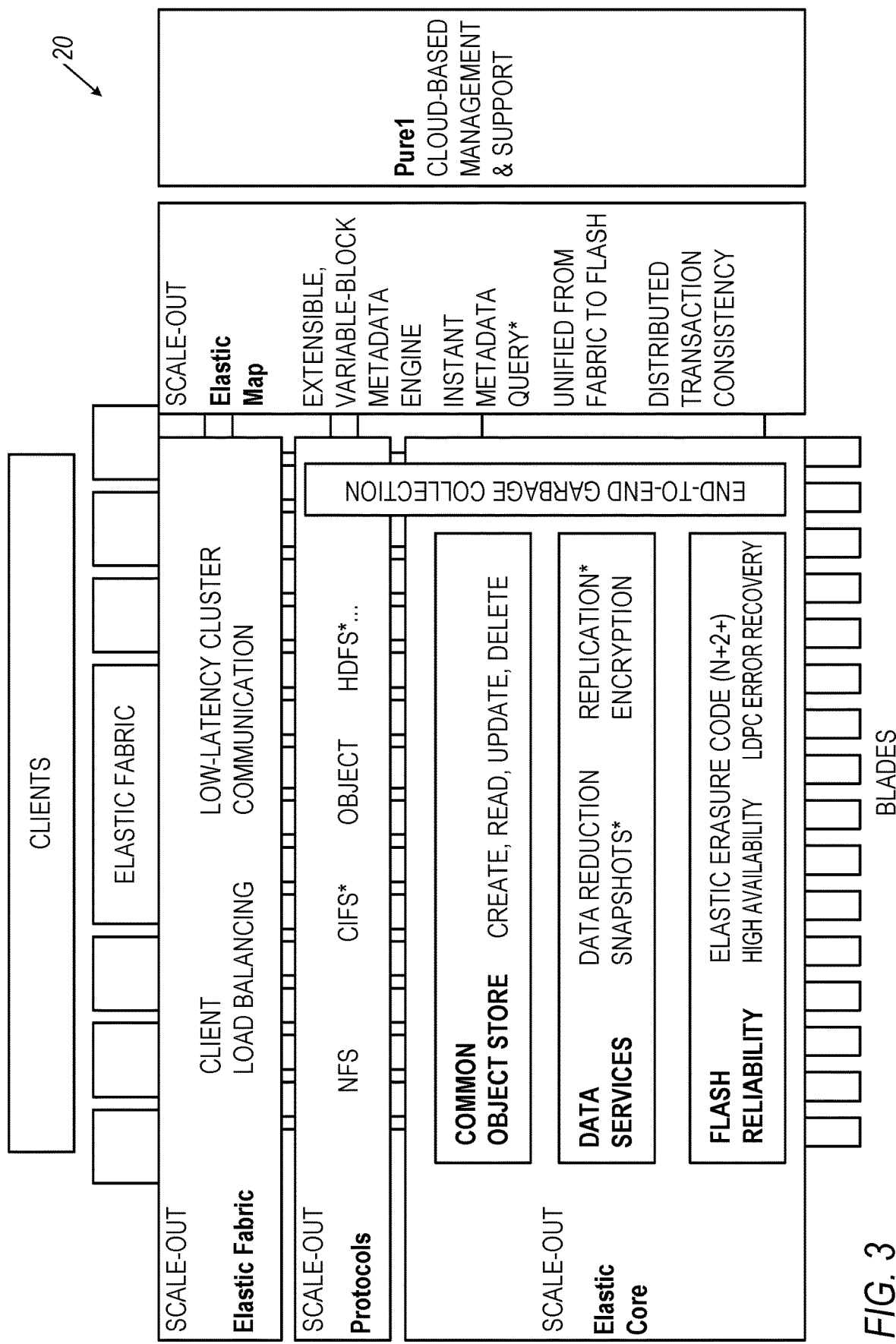
FIG. 3 constitutes a conventional cloud-based data management system.

Reference is now made to FIG. 3, which schematically illustrates a conventional cloud-based data management system 20. As shown, various components and protocols are designated to perform various tasks and ensure a reliable data allocation and storing. Said components and protocols require constant debugging and maintenance as well as update to technological advancement/s. Thus, the current quality and performance of the integrated cloud-based data management system 20 comes at a cost of considerable resources. According to some embodiments, cloud-based data management system 20 may be a solid state drive (SSD) data center solution, meaning, its media storages are SSD stacking that form a part of a cloud-based storage array.

Figure 4:
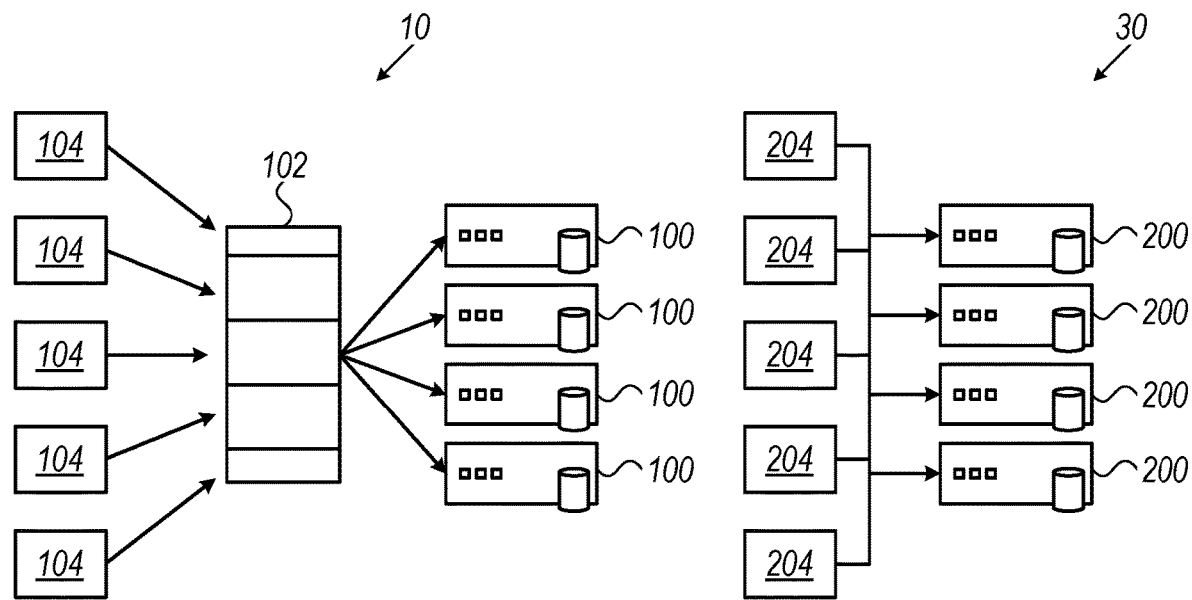
FIG. 4 constitutes a schematical illustration of a general comparison between a conventional storage array system and a data storage system, which is the subject matter of the current invention, according to some embodiments.

Reference is now made to FIG. 4, which schematically illustrates a general comparison between the conventional storage array system 10 and a data storage system 30 which is one aspect of the current invention, according to some embodiments. As shown, and as previously disclosed, a traditional storage array system 10 comprises a storage array 102 that contains multiple storage media stack 104 configured to store and provide data accessibility to multiple servers 100.

According to some embodiments, the data storage system 30, may be configured to designate a collection of servers 200, and utilize their storage media stacks 204 to operate as enterprise storage arrays (without or substantially without adversely affecting their OS functionality), thus, the data storage system 30 is able to provide directly on said servers 200 the services traditionally provided by a common storage array system 10 using a storage array 102.

According to some embodiment, data storage system 30 also configured to add further capabilities not available until now on common storage arrays. For example, storage stack 204 may be divided to designated partitions, enabling each storage media 204 to provide multiple designated areas dedicated to store and provide access to data originated from various servers 200 wherein the storage media stacks 204 are embedded within the servers 200 and hence, dismissing the need for storage array 102, and wherein a combined DP network is created, implemented and utilized by the data storage system 30.

Figure 5A:
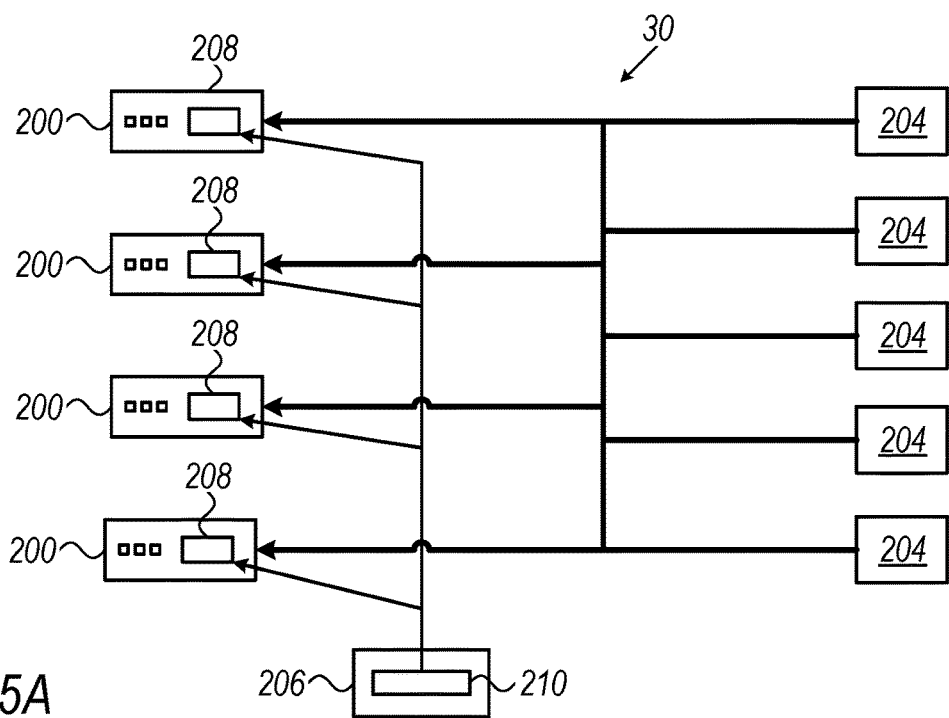
FIGS. 5A & 5B constitute a schematical illustration of a data storage system, according to some embodiments of the invention.
Figure 5B:
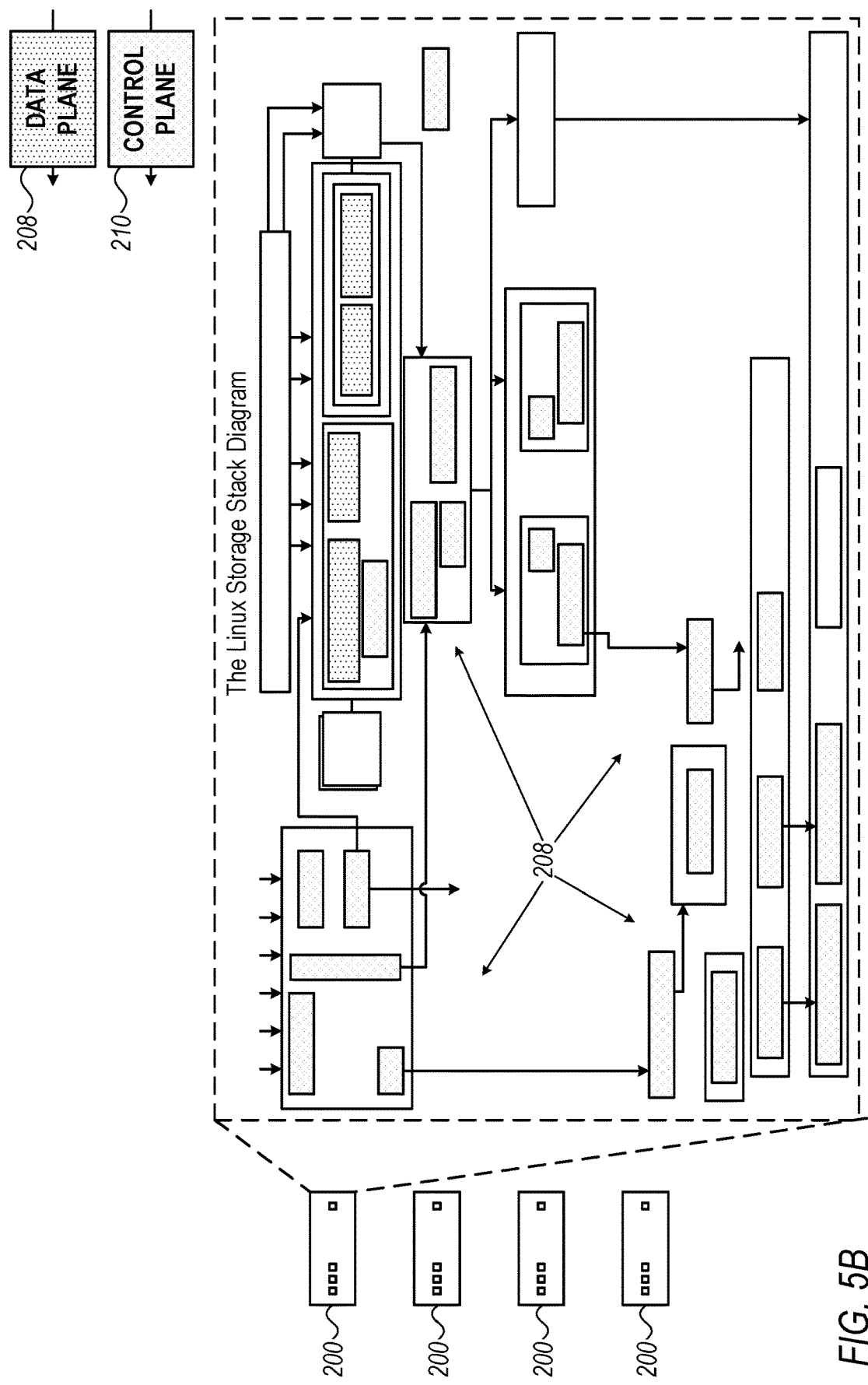

Reference is now made to FIGS. 5A & 5B, which schematically illustrate a data storage system 30, according to some embodiments. As shown, and as previously disclosed, the data storage system 30, comprises a collection of servers 200, and configured to utilize their storage media stacks 204 to operate as enterprise storage arrays.

According to some embodiments, the data storage system 30 may be configured to obtain such end without installing any 3rd party software components or scripts. Said endeavor may be obtained by using the server/s 200 storage stack 204 instead of a dedicated storage array unit.

According to some embodiments, at least one orchestrator 206 is configured to interact with each of said servers 200 and designated to control a CP 210 of the DP 208 network. According to some embodiments, the DP 208 is stored upon storage media 204 embedded within each server 200.

According to some embodiments, various operating systems may be installed on server/s 200, such as, Linux based operating system, etc., and include various components and protocols related to the DP 208 or the CP 210. The orchestrator 206 may be configured to orchestrate these already installed components in order to provide a data storage and data backup capabilities using the components and protocols already embedded within server/s 200 and without a designated external storage array unit.

According to some embodiments, the control interface/s of the server's storage stack 204 may be operatable via standard interface/s, for example, secure shell protocol (SSH) for Linux, PowerShell Remoting Protocol (PSRP) for Windows Server, etc.

According to some embodiments, the communication between server/s 200, for storage data transfer may be performed using standard protocols, such as, but not limited to, iSCSI, Fibre-Channel, NVMeOF, FC-NVMe, utilizing the operating systems' standard components while the orchestrator 206 is configured to provide enhanced operability using such protocols and other standard available components and capabilities.

According to some embodiments, a centralized or several orchestrator(s) 206 may be configured to connect to the various different servers 200 over a standard administration interface. According to some embodiments, either one centralized or several orchestrator(s) 206 may be especially oriented to perform various storage orchestration tasks.

According to some embodiments, the number of orchestrators 206 may be determined in accordance with the overall potential of the servers 200 forming a part of data storage system 30 (that may be, for example, a large data center), and in accordance with the rate of required availability of said servers 200.

According to some embodiments, orchestrator 206 may be implemented by various means, for example, it may be implemented as a server installed software (on one or more servers 200), as a virtual machine, as a container, etc.

According to some embodiments, orchestrator 206 may have an exposed application programing interface (API) for external initiation of storage orchestration tasks and may be configured to regularly monitor the health of each storage media 204, identify hardware problems, etc. According to some embodiments, orchestrator 206 may also be configured to collect performance data (such as load, latency, variations, relations, etc.) by way of a counter representing data from each storage media 204 over a standard control interface.

According to some embodiments, the collected performance counters from each component of server/s 200, are aggregated to provide a performance snapshot's to be feedback to a future operation improvement. The combination of orchestrator 206's operation with the aggregated performance counter enables unique task management, health monitoring and system maintenance.

Figure 6:
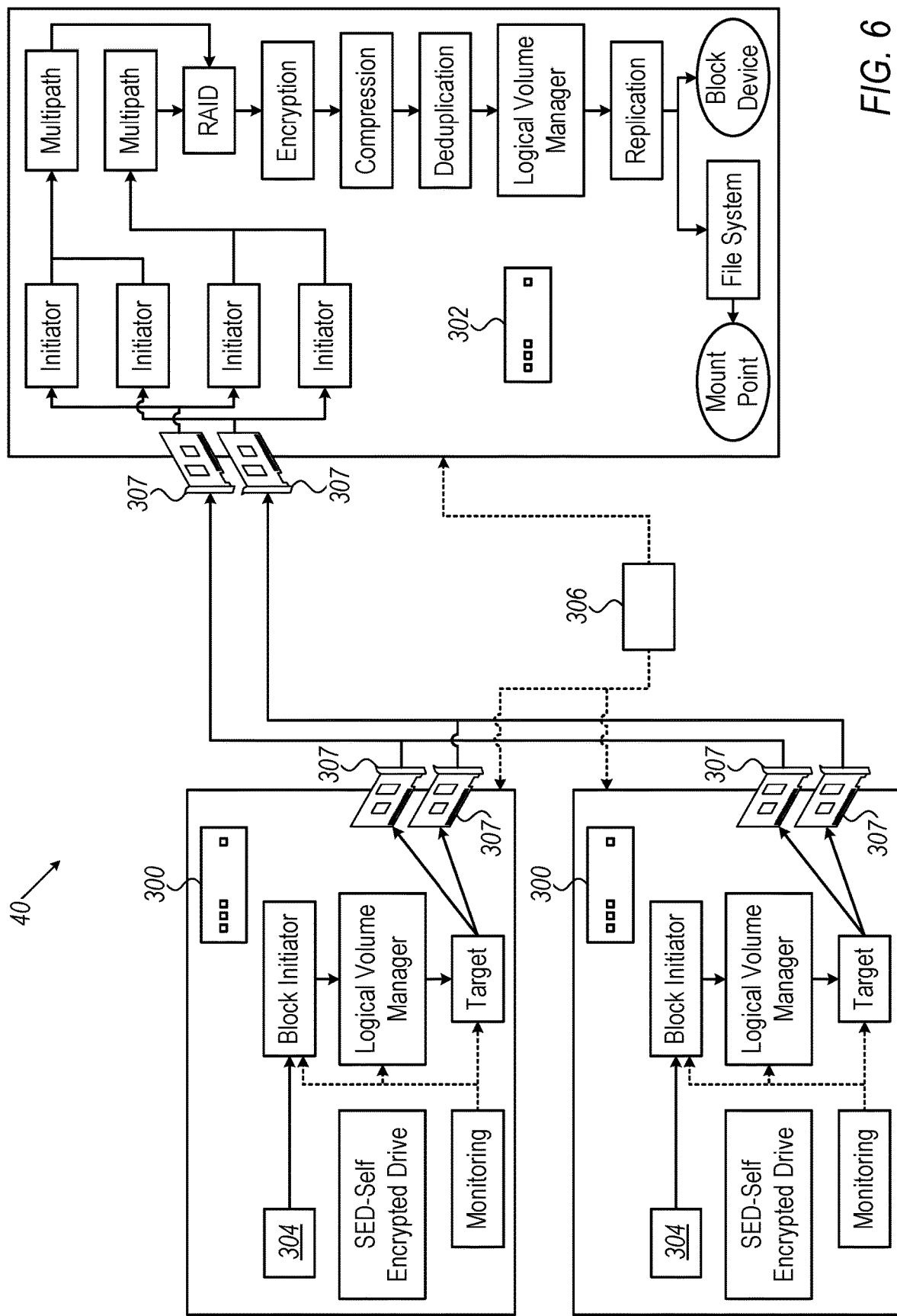
FIG. 6 constitutes a schematical illustration of a data storage system, according to some embodiments of the invention.

Reference is now made to FIG. 6, which schematically illustrates a data storage system 40, according to some embodiments. As shown, a data storage system 40 may comprise at least one target server 300 that may further comprise a storage media 304 and be configured to run an operating system (for example, a Linux based operating systems such as Red Hat, Suse, etc.), wherein said operating system is designated to host data accessible over a DP network.

According to some embodiments, at least one initiator server 302 may be configured to run an operating system (for example, a Linux based operating systems such as Red Hat, Suse, etc.), wherein said operating system is designated to access and be exposed to remote resource/s over the DP network.

According to some embodiments, at least one orchestrator 306 may be configured to interact with each of said target server/s 300 and/or initiator server/s 302 in order to control the CP of said DP network. According to some embodiments, a designated portion of the storage media 304 forming a part of the target server 300 may be exposed to the DP network, in other words, a designated physical space is reserved and specified in order to contribute a storage space used by the DP network.

According to some embodiments, orchestrator 306 is configured to utilize the designated portion of the storage media by orchestrating storage stack (SS) components and standard storage stack (SSS) of the operating system embedded within said target/initiator server/s 300/302, such that the initiator server 302 is configured to interact with the target server 300 via the DP network.

According to some embodiments, data storage system 40 may be designated to perform the following steps:

Using the operating system installed on target the storage media 304 forming a part of the target server 300 and designated to host data accessible over the DP network, wherein said storage media 304 is used to utilize a persistent storage medium, Using the operating system's logical volume manager (LVM) in order to split the storage media 304 to multiple partitions, Using the operating system installed on at least one initiator server 302 in order to access and consume the storage media 304' partition/s over the DP network in order to utilize a remote media's capacity and performance, Using the orchestrator 306 which is configured to interact with each of said target server/s 300 and initiator server/s 302, wherein said orchestrator 306 is designated to control the CP of said DP network, Using the operating system to merge at least two network paths in order to utilize a single storage media partition as a single network device by creating a multipath component, and thus, enabling enhanced redundancy and efficiency.

According to some embodiments, the steps disclosed above may further include using a resource management component/s in order to provide dynamic allocation and de-allocation capabilities configured to be conducted by the operating system and affect, for example, on processor cores and/or memory pages, as well as on various types of bandwidths, computations that compete for those resources. According to some embodiments, the objective of the steps disclosed above is to allocate resources so as to optimize responsiveness subject to the finite resources available.

According to some embodiments and as disclosed above, at least one initiator server 302 is configured to interact with at least two target servers 300 using a multipath connection. According to some embodiments, a multipath connection may be used to improve and enhance the connection reliability and provide a wider bandwidth.

According to some embodiments, the coordination between the initiator server/s 302 and the target server/s 300 or vice versa, may be conducted using a local orchestrator 307 component configured to manage the CP and further configured to be physically installed on each server. According to some embodiments, installing a local orchestrator 307 on each server may provide a flexible way of utilizing the data storage system 40 as well as eliminate the need to provide data storage system 40 with access to internal software and processes of a client's servers. According to some embodiments, the operations and capabilities disclosed in the current specification with regards to orchestrator 306, may also apply to local orchestrator 307 and vice versa.

According to some embodiments, the communication between the orchestrator 306 and between either a target server 300 or the initiator server 302, may be conducted via the DP network by utilizing a designated software component installed on each of said servers.

According to some embodiments, the initiator server 302 is configured to utilize a redundant array of independent disks (RAID) storage stack component (SSC) configured to provide data redundancy originated from multiple designated portions of the storage media 304 embedded within multiple target servers 300.

According to some embodiments, the RAID SSC is further configured to provide data redundancy originated from combined multiple initiator paths originated from the designated portion of the storage media 304 of at least two target servers 300.

According to some embodiments, the target servers 300 may be located at different locations, such as, in different rooms, buildings or even countries. In this case, the orchestration procedure conducted by the orchestrator 306 is allocated across different resiliency domains. For example, the orchestrator 306 may consider various parameters regarding cyber security, natural disasters, financial forecasts, etc. and divert data flow accordingly. According to some embodiments, said orchestration procedure conducted by the orchestrator 306 and configured to utilize servers' allocation, is conducted with a consideration of maintaining acceptable system balance parameters.

According to some embodiments, the orchestrator 306 may be configured to interact with server/s 300/302 using an administration protocol. According to some embodiments, the designated portion of the storage media 304 may be allocated using a logical volume manager (LVM) SSC. According to some embodiments, the storage media 304 may be solid-state drive (SSD) based, storage class memory (SCM) based, random access memory (RAM) based, hard disk drive (HHD) based, etc.

According to some embodiments, the orchestrator 306 may be a physical controller device or may be a cloud-based service (SaaS) and may be configured to command and arrange data storage and traffic in interconnected servers, regardless whether orchestrator 306 is a physical device or not.

According to some embodiments, the operations on each server/s 300/302 may be implemented, wholly or partially, by a data processing unit (DPU), wherein said DPU may be an acceleration hardware such as an acceleration card, wherein hardware acceleration may be use in order to perform specific functions more efficiently when compared to software running on a general-purpose central processing unit (CPU), and hence, any transformation of data that can be calculated in software running on a generic CPU can also be calculated in custom-made hardware, or in some mix of both.

According to some embodiments, the data storage system 30 may be operatable in both physical and virtual servers, as well be used in traditional IT systems (such as servers and data centers), private cloud, public cloud, multi cloud environments, containers, virtual machines, bare-metal systems and any combination thereof.

According to some embodiments, under a traditional SDS, the storage stack code would rely on proprietary software, requiring separate, independent installation and maintenance, whereas data storage system 30/40 is configured to rely on an already installed operating system' capabilities combined with using the orchestrator 206/306 discussed above.

According to some embodiments, under a traditional SDS, the control protocol would rely on proprietary software requiring separate, independent installation and maintenance, whereas the data storage system 30/40 is configured to rely on the operating system capabilities using the orchestrator 206/306 discussed above.

Under a traditional SDS, the nodes interconnect would rely on proprietary software, whereas according to some embodiments, data storage system 30/40 is configured to rely on standard storage protocols using the orchestrator 206/306 discussed above.

Under a traditional SDS, the stack model that controls the storage array system 10 uses a single proprietary code and has components interleave both DP and CP, whereas according to some embodiments, data storage system 30/40 is configured to utilize the operating system to execute a dummy data plane while using the orchestrator 206/306 disclosed above in order to emulate a CP and execute its actual operations upon (among others), the DP.

Some advantages of the various embodiments disclosed above may facilitate ultra-high performance when compared to a traditional SDS operations, for example, with regards to the number of nodes in a cluster which under data storage system 30/40 are expected to be unlimited.

As noted there are certain drawback and inefficiencies in coupling the together of DP and the CP with the storage when implemented in traditional networks, including SDNs. According to some embodiments, an SDN may be configured to decouple the DP from the storage, and the CP from the storage. According to some embodiments, a storage system may be built with dummy devices to forward and store data, from the CP of the network, which controls how the traffic will flow through the network while SDN is considered to enable much cheaper equipment, agility and limitless performance than other decoupling means. since more data plane resources can be flexibly added-on, such decoupling using an SDN enables scalability with no limitation and higher survivability rate due to a limited impact on the processed cluster. According to some embodiments, a single orchestrator may be provided to provide storage services to huge cluster since. data capacity, bandwidth and IOPS do not impact the CP services utilization. Such decoupled DP may be utilized for various data Services, such as: Protocols; RAID; Encryption; QoS Limits; Space Allocation; Data Reduction and others. Whereas such a decoupled CP may be utilized for various storage services and coordination, such as: Volume Lifecycle (Create, Delete, Resize, etc.); Storage Pool Management; Snapshot Coordination—Consistency Groups; Failure Monitoring; Performance Monitoring; Failure Handling.

According to some embodiments, data storage system 40 may be designated to perform the following steps to obtain an SDN based CP and CD and storage decoupling:

Using the storage CP 304 on one of servers 300, to create storage DP; Using the storage CP on server 302, to create storage DP, to connect to said server 300 and consume the exposed drive chunk;

Using the storage CP on another server 300, to create storage DP;

Using the storage CP on server 302, to create storage DPe, to connect to said another server 300 and consume the exposed drive chunk; Using the storage cCP on server 302, to create storage DP, that includes multipath, RAID, encryption, compression, deduplication, LVM and replication services.

Figure 7:
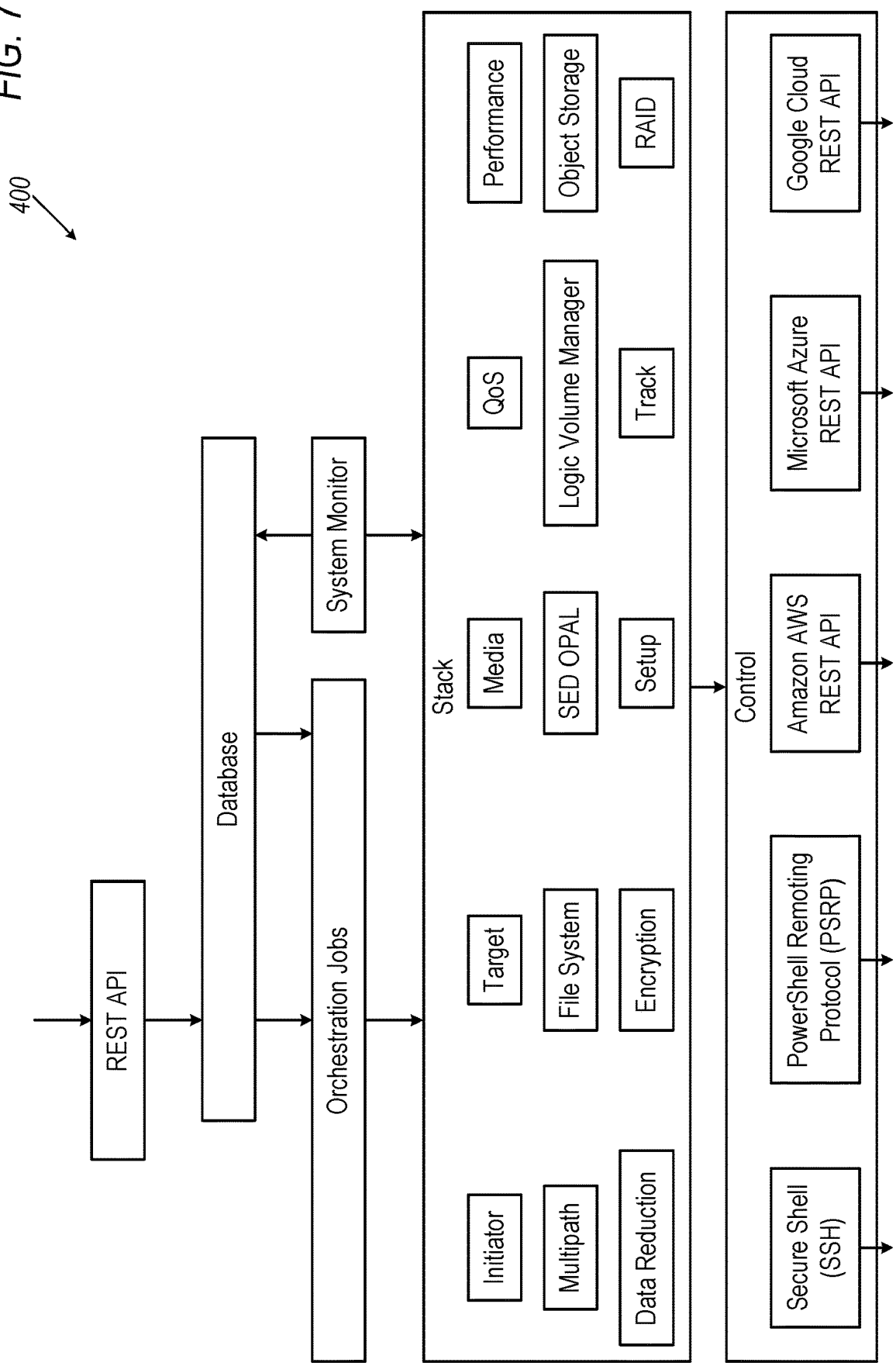
FIG. 7 constitute a schematical illustration of a storage system's general architecture, according to some embodiments of the invention.

Reference is now made to FIG. 7, which schematically illustrates the storage system 30/40 general architecture, according to some embodiments of the invention. As shown, various components are configured to interact and provide distributed storage and backup capabilities over the DP network. For example, orchestration jobs may affect various stack components, which, in turn are translated and utilized through various cloud computing platforms/cryptographic network protocols/application programing interfaces such as SSH, PSRP, Amazon AWS, Microsoft Azure or Google cloud.

Figure 8:
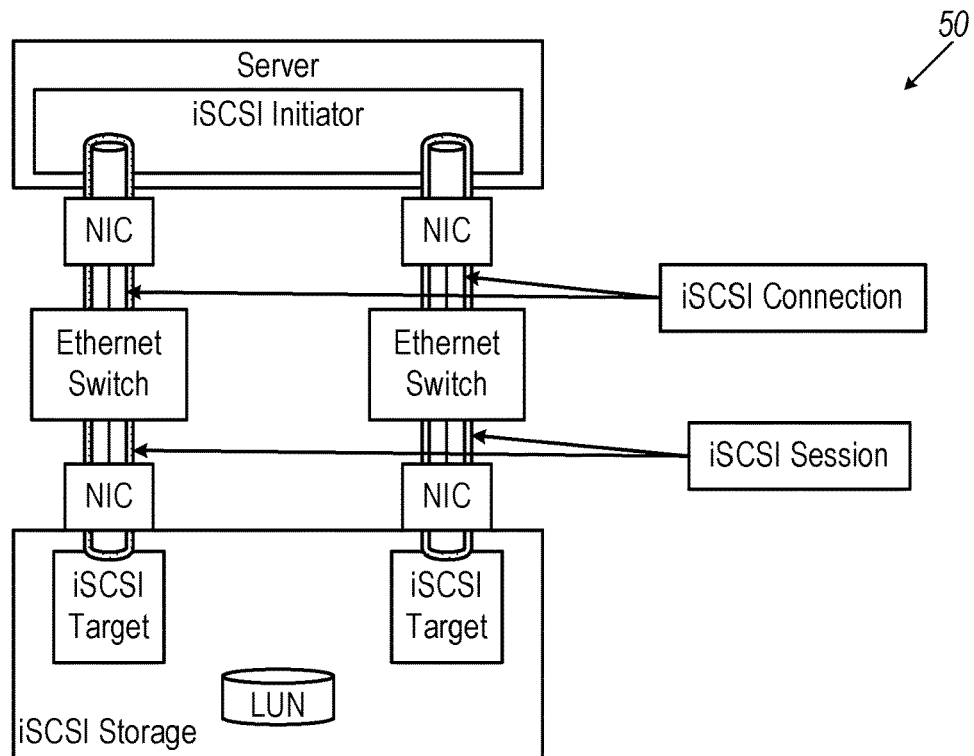
FIG. 8 constitutes a schematical illustration of a traditional storage array target and initiator servers that further comprises a multipath connection, according to some embodiments of the invention.

Reference is now made to FIG. 8, which schematically illustrates a storage array 50, as shown, a target and initiator servers (shown in FIG. 10), are configured to communicate through a single-path or a multipath connection. According to some embodiments, logical connections (depicted as a vertical tube-like line) allow the target and initiator servers to communicate and consume logical unit numbers (LUN) from a data storage. According to some embodiments, the initiator server is configured to consume LUN from the target server using a network interface card (NIC) or any suitable component/protocol. According to some embodiments, the protocols used to consume/transfer LUN are standard communication protocols such as iSCSI, NVMe, etc. According to some embodiments, storage array 50 enables to control this data transfer by using an automated orchestration procedure while controlling both data transfer directions. According to some embodiments, the procedure exposing and consuming the block device/s/LUN is designated to be conducted by an orchestrator 702 (shown in FIG. 10).

Figure 9:
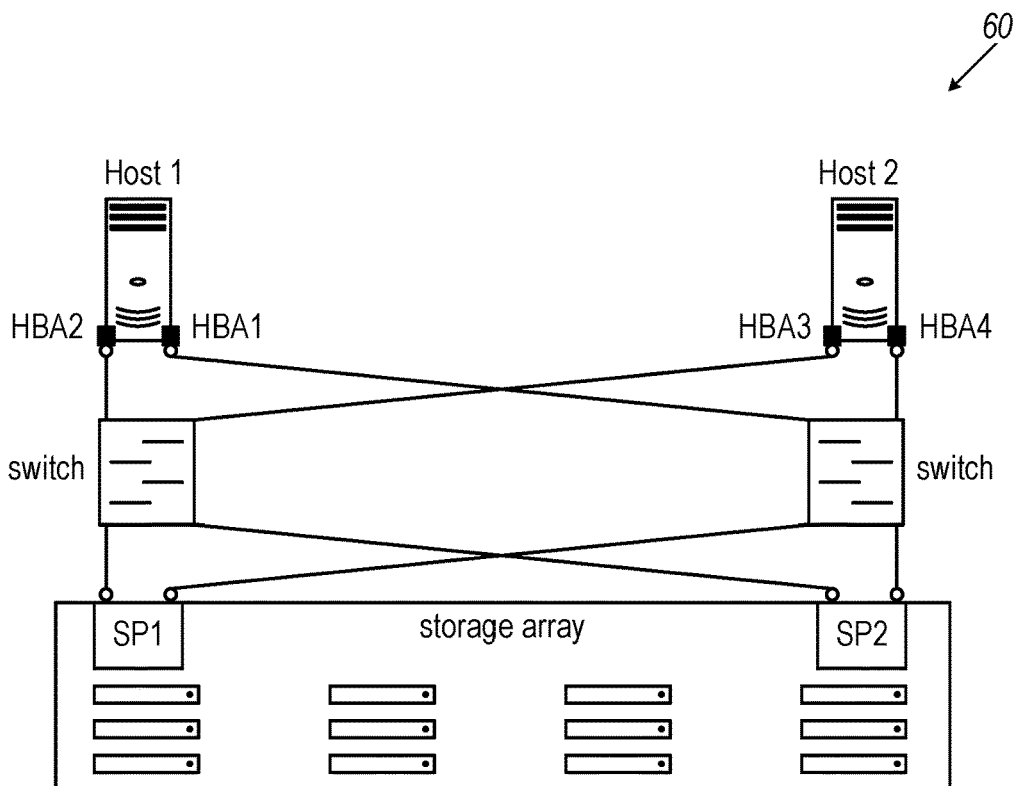
FIG. 9 constitutes a schematical illustration of a storage array connections, according to some embodiments of the invention.

Reference is now made to FIG. 9, which constitutes a schematic illustration of the various connections of multipath storage array 60, that may form a part of storage array 50. As shown, multipath storage array 60 comprises various switches and adaptors configured transfer block devices using a host bus adaptor (HBA) (or an equivalent NIC). According to some embodiments, this may be conducted by forming two paths that provide more than one network connection. According to some embodiments, both switches may also be connected to each other (not shown).

Figure 10:
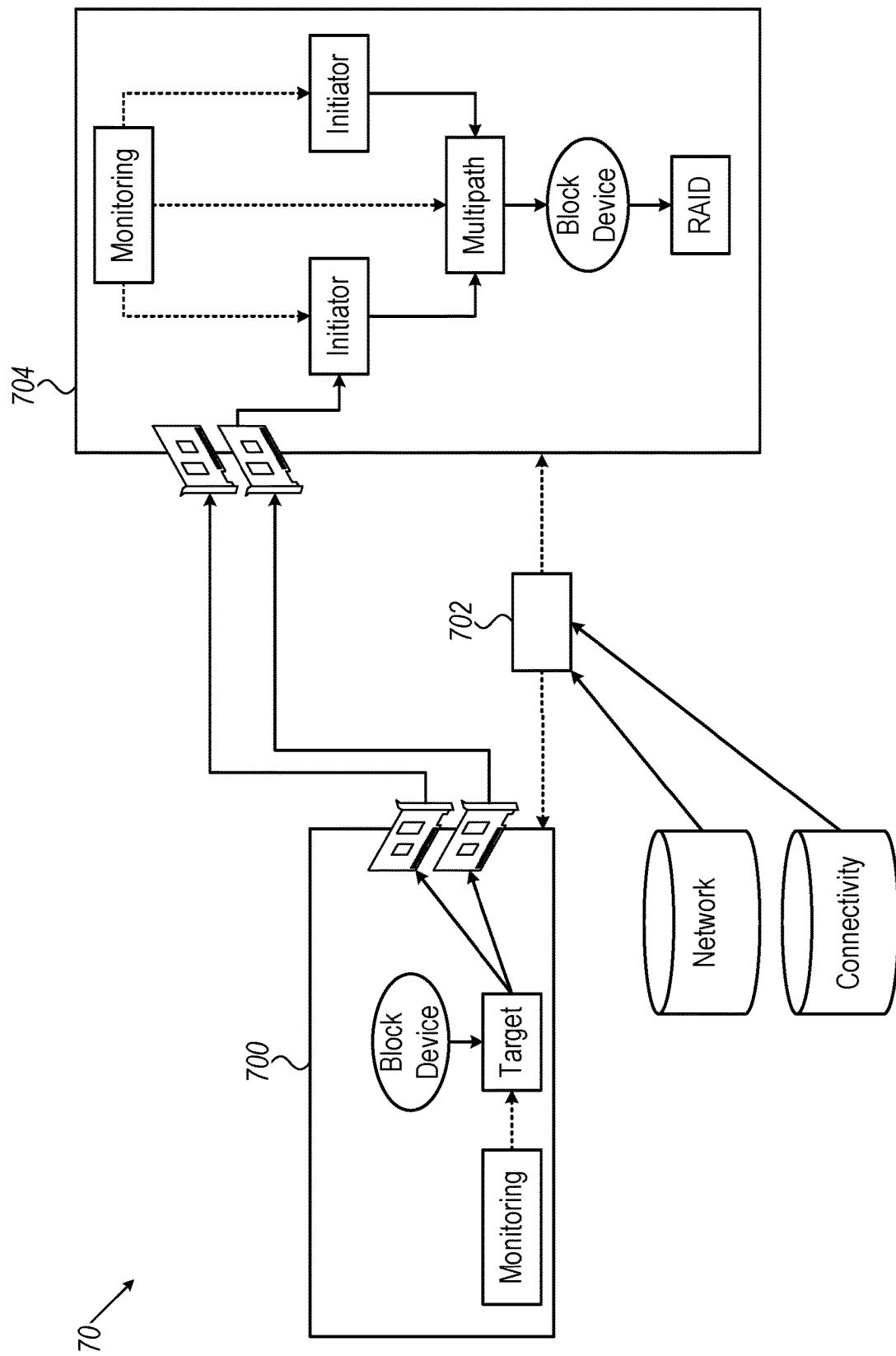
FIG. 10 constitutes a schematical illustration of an Orchestration procedure of remote block device connection between servers conducted by the storage system depicted in FIGS. 8 & 9, according to some embodiments of the invention.

Reference is now made to FIG. 10 which constitutes an orchestration procedure 70 of remote block device via a connection between servers conducted by the storage system 50. As shown, a remote block device/s from one source server 700 may be connected to another destination server 704 and be designated, for example, for stacking purposes, while a centralized orchestrator 702 is configured to orchestrate the remote block device's connection.

According to some embodiments, the remote block device is configured to be exposed and transferred to server 704, using a multipath connection. According to some embodiments, orchestrator 702 is also configured to provides alerts and handle various failures. According to some embodiments, a controller 702 is configured to identify the particular block device name of a remote block device in either servers 700 or 704, in order to enable stacking, such as RAID), etc.

According to some embodiments, server 700 is configured to have network rules and connectivity rules databases, which are communication protocols that enable server 700 to connect to other servers using various protocols. According to some embodiments, orchestration procedure 70 enables sending a certain block device to server 704, by mapping the components forming the orchestration procedure 70 using to orchestrator 702. According to some embodiments, orchestrator 702 is configured to consider said network rules and connectivity rules in order to determine wich communication protocol is most efficient in conducting the communication between servers 700 and 704, for example, NVMe, Iscsi, etc.

According to some embodiments, the set of network rules is designated to identify the IP networks used for data traffic. According to some embodiments, the set of connectivity rules is designated to identify the preferred protocol between servers 700 and 704. According to some embodiments, orchestrator 702 is configured to enumerate the different networks' rules of each server and their addresses. According to some embodiments, orchestrator 702 is configured to use the enumeration information, the network rules and connectivity rules to decide which network cards to use on each server, which address to use on each server and which storage protocol to use.

According to some embodiments, the block device stored on source server 700 is designated to first being exposed while having a storage target to the DP network on source server 700. According to some embodiments, multiple initiators are configured to be created per network path on destination server 704. According to some embodiments, a multipath connection is configured to be utilized over the initiators on the destination server 704.

According to some embodiments, the orchestrator 702 is configured to regularly check the destination server 704 initiators and multipath components for errors, if an error is identified, alert is triggered, and handled by user or application.

According to some embodiments, the block device name on the destination server 704 is designated to be identified using information from the source target address, for example, HBA address, LUN, etc.

According to some embodiments, storage array 50/60/70 is configured to provide a remote communication and identification between remote servers and further configured to identify a network error while using a multipath and conduct this procedure while utilizing orchestrator 702. According to some embodiments, storage array 50 may be operatable by using a single pass connection.

According to some embodiments, the monitoring of orchestration procedure 70 is conducted by a central process of monitoring. For example, orchestrator 702, may recognize a malfunction regarding the storage array 50 as a whole, which may, for example provide available secondary data paths, redundancy decision, backups discissions, etc.

According to some embodiments, orchestration procedure 70 is configured to enable identification process of the of the various block devices that comprise the system. This procedure is configured to be utilized by both the target server 700 and initiator server 704. Traditional methods require a long recognition process in order to identify a new hardware connected to the system by conducting a rescan procedure, whereas according to some embodiments, orchestration procedure 70 enables a quick rescan procedure that enables recognizing a device by, for example, the various IP addresses that are exposed to orchestrator 702, etc. According to some embodiments, orchestration procedure 70 is configured to provide various ranges or "white lists" or "black lists" in order to control and manage the storage system 50. According to some embodiments, remote drives such as RAID folders are configured to provide data redundancy and backup services. According to some embodiments, several backup and redundancy schemes may be applied since the RAID is distributed/decentralized. According to some embodiments, the orchestration procedure is in-charge of rebuilding a failed storage.

According to some embodiments, the distributed usage of the drives requires special coordination, in detecting the failure, in allocation of a Hot Spare, in the rebuilding process of each RAID, and in failing the bad drive from each RAID.

Figure 11:
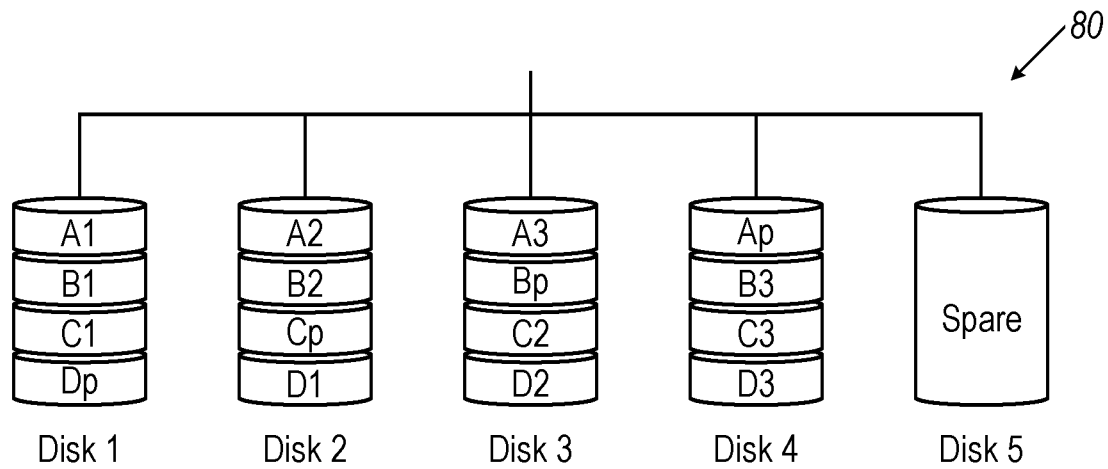
FIG. 11 constitutes a schematical illustration of a traditional RAID 5 having a Hot Spare.

Reference is now made to FIG. 11 which constitutes a traditional RAID 5 having a Hot Spare, 80. As shown, RAID 5 has a parity (a common way of detecting errors in a storage system) and enables the reconstruction of a certain storage disk by combining the remaining disks that haven't been affected. The parity is a combination between several disks that is able to reconstruct a missing data that has been lost due to various reasons and thus, provide data reconstruction ability. Said systems may also contain a spare disk configured to provide spare empty data.

Figure 12:
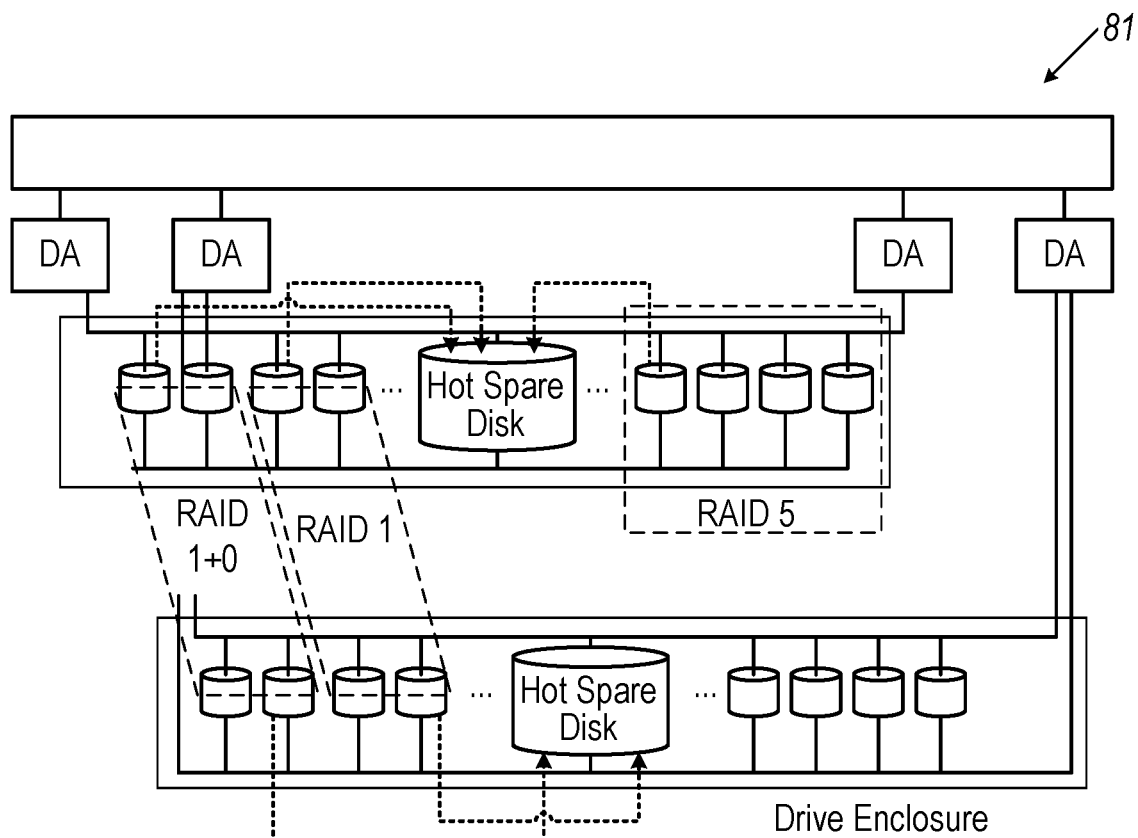
FIG. 12 constitutes a schematical illustration of a RAID Hot Spare Rebuild.

Reference is now made to FIG. 12 which constitutes a traditional RAID 5/RAID 1+0 Hot Spare rebuild 81. As shown, the rebuild process may be reconducted using a mutual reading executed by utilizing parity from all the folders in the RAID, in RAID 1+0 the data is stored in a double manner, and hence, no parity is needed and the reading is conducted by utilizing the drives that stores the relevant data.

Figure 13:
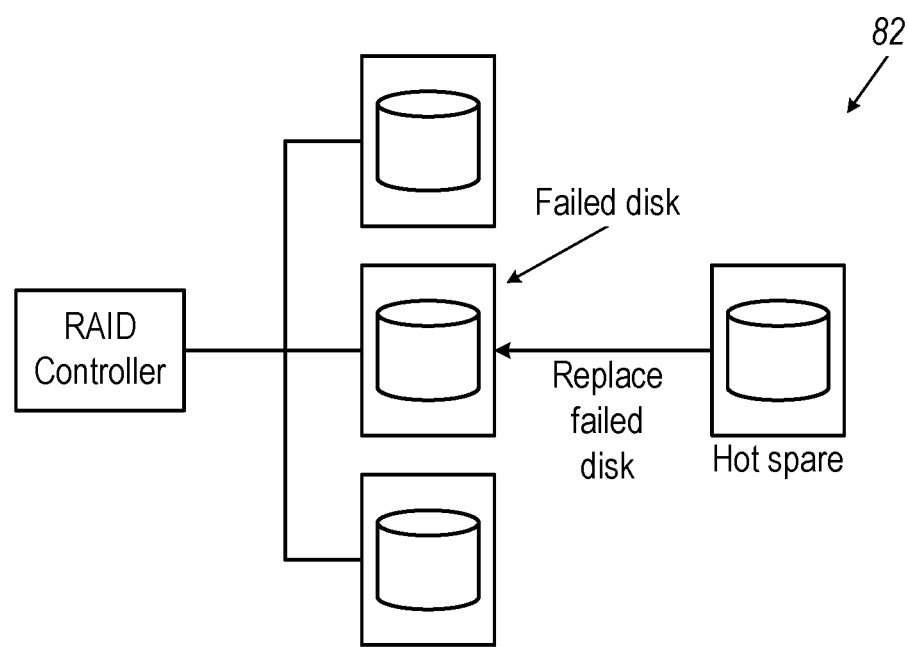
FIG. 13 constitutes a schematical illustration of a traditional Hot Spare Logic array replacement procedure.

Reference is now made to FIG. 13 which constitutes a traditional replacement process in RAID system 82, as shown, a hot spare disk is configured to replace a spare disk. This process requires a free spare disk available for replacement.

Figure 14:
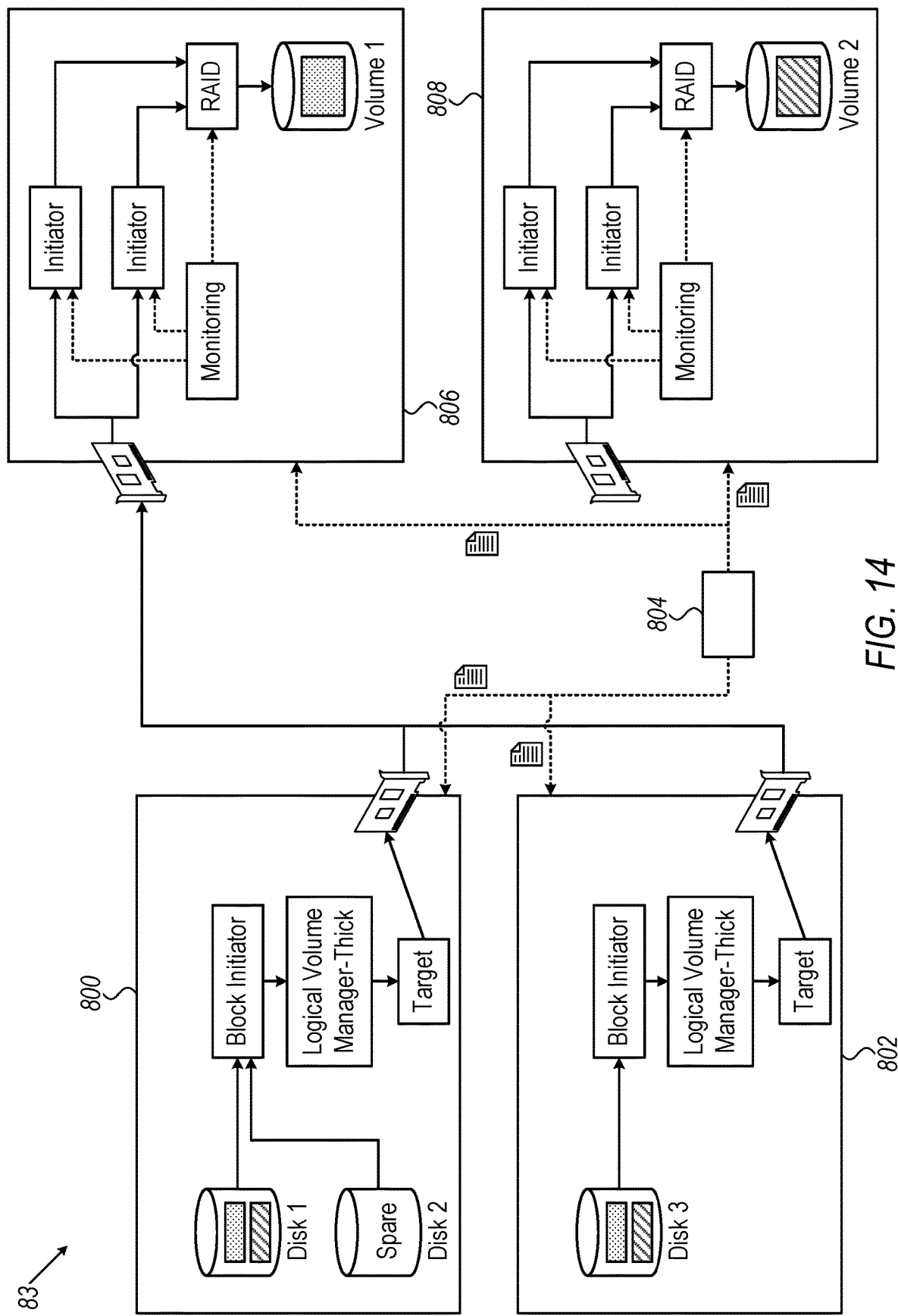
FIG. 14 constitutes a schematical illustration an overview of a shared drive monitoring and recovery operation or a non-centralized rebuild system and process, according to some embodiments of the invention.

Reference is now made to FIG. 14 which constitutes an overview of a Shared Drive Monitoring and Recovery operation or a non-centralized rebuild system and process 83, as shown, server 800 comprises disk 1 and spare disk 2, server 802 comprises disk 3, server 806 comprises RAID (volume) 1 and server 808 comprises RAID (volume) 2, and all combined form a shared drives' storage stack. According to some embodiments, orchestrator 804 is designated to rebuild disk 1 and disk 3 in case of a malfunction. For example, if disk 1 has malfunctioned, disk 2 should be rebuilt using data stored in the RAID, in this case servers 806 and 808 are configured to rebuild the malfunctioned disk 2 together and simultaneously, by applying a combined coordinated operation.

According to some embodiments, server 806 will build the 'spotted' data part and server 808 will build the 'striped' data part, and so on. According to some embodiments, this process is complex and includes, among other steps, removing the malfunctioned disks and connecting the spare disk.

According to some embodiments, system and process 83 are configured to enables a distributed storage, using shared drives, to handle a failed drive in combined and orchestrated manner.

According to some embodiments, and unlike a storage array with a single RAID controller over a drive, system and process 83 represent a distributed storage stack having multiple RAID components, in different servers, sharing the same drive.

According to some embodiments, the distributed usage of said shared drives' storage stack may require a special coordination, in detecting the failure, in allocation of a hot spare disk, in the rebuilding process of each RAID, in failing the bad drive from each RAID, etc.

According to some embodiments, the shared drives' storage stack is provided by the system and operation 83, and monitored by a centralized orchestrator 804 designated to maintain the disks normal operation.

According to some embodiments, the shared drives' storage stack is provided wherein a centralize orchestrator 804 is configured to allocate a hot spare disk to be used by all servers 800-808 that are designated to use the failed disk.

According to some embodiments, the shared drives' storage stack is configured to perform a recovery action, by utilizing centralized orchestrator 804, when a failed disk is detected.

According to some embodiments, a drive failure may be a complete failure, or may be failure in specific logical blocks' ranges. In a distributed storage stack configured to share a drive across multiple servers as in system and operation 83, only some of the servers may experience errors, while other will see the drive as fully functional.

According to some embodiments, system and operation 83 enables monitoring by the centralize orchestrator 804 of each of server's initiator and of RAID levels, provide for an ability to make a single centralized decision if a drive experiences a failure.

According to some embodiments, allocation of a hot spare disk from the storage pool is operated in or by the centralize orchestrator 804, so all the different servers (800-808) using the failed drive will use the same new spare disk.

According to some embodiments, and by way of example, the rebuilding process configured to be utilized by the system and operation 83 may be carried out using the following steps:

An initiator layer in each server (800-808) is monitored for block device health—for example i/o errors and response time.

Orchestrator 804 is configured to accumulate all the servers' drive health information.

Orchestrator 804 is configured to recognize a drive failure.

Orchestrator 804 is configured to allocate new hot spare disk from the storage pool.

Orchestrator 804 is configured to instruct each server (800-808) to add the selected spare disk to each RAID component.

Orchestrator 804 is configured to instruct each server (800-808) to fail the failed disk in each RAID component.

The RAID in each server (800-808) is configured to perform drive fail process and rebuild the new spare drive chunk with valid data. Valid data is configured to be used from a failed drive, if possible, or from RAID mirror/parity.

Orchestrator 804 is configured to monitor the rebuild process of each server RAID component.

When all RAID in each server (800-808) finished the rebuild of its failed drive chunk/s, the failed drive is taken offline, and the user instructed to replace it.

A consistency group is group of volumes representing an application. In an instance of a failure, as such may be instigated by a virus, the consistency group snapshot is configured to capture an exact moment in time before the failure that is consistent with all the volumes in the consistency group.

Figure 15:
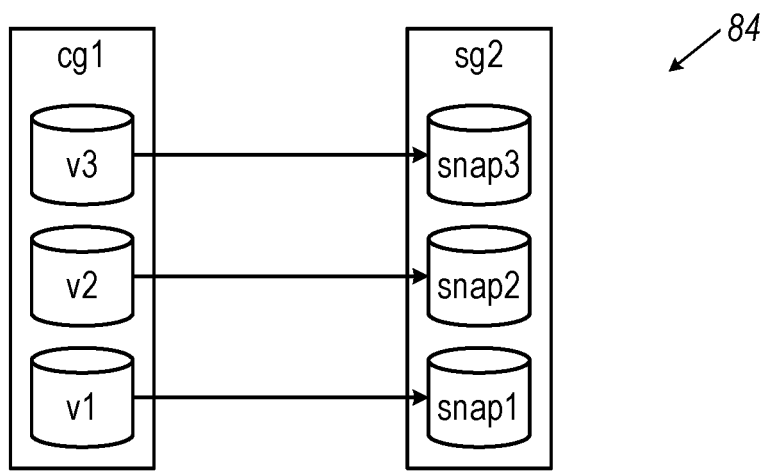
FIG. 15 constitutes a schematical illustration of a traditional consistency group snapshot system.

Reference is now made to FIG. 15 which constitutes an overview of, a traditional consistency group snapshot system 84. As shown, three volumes v1, v2, and v3 create group 'cg1' and belong to one consistency group, that may represent one or more application. A snapshot is taken in a certain point in time, creating 'sg2', which is a snapshot of all volume groups. The snapshot is taken using a centralized controller since all the volumes are located at the same place.

Figure 16:
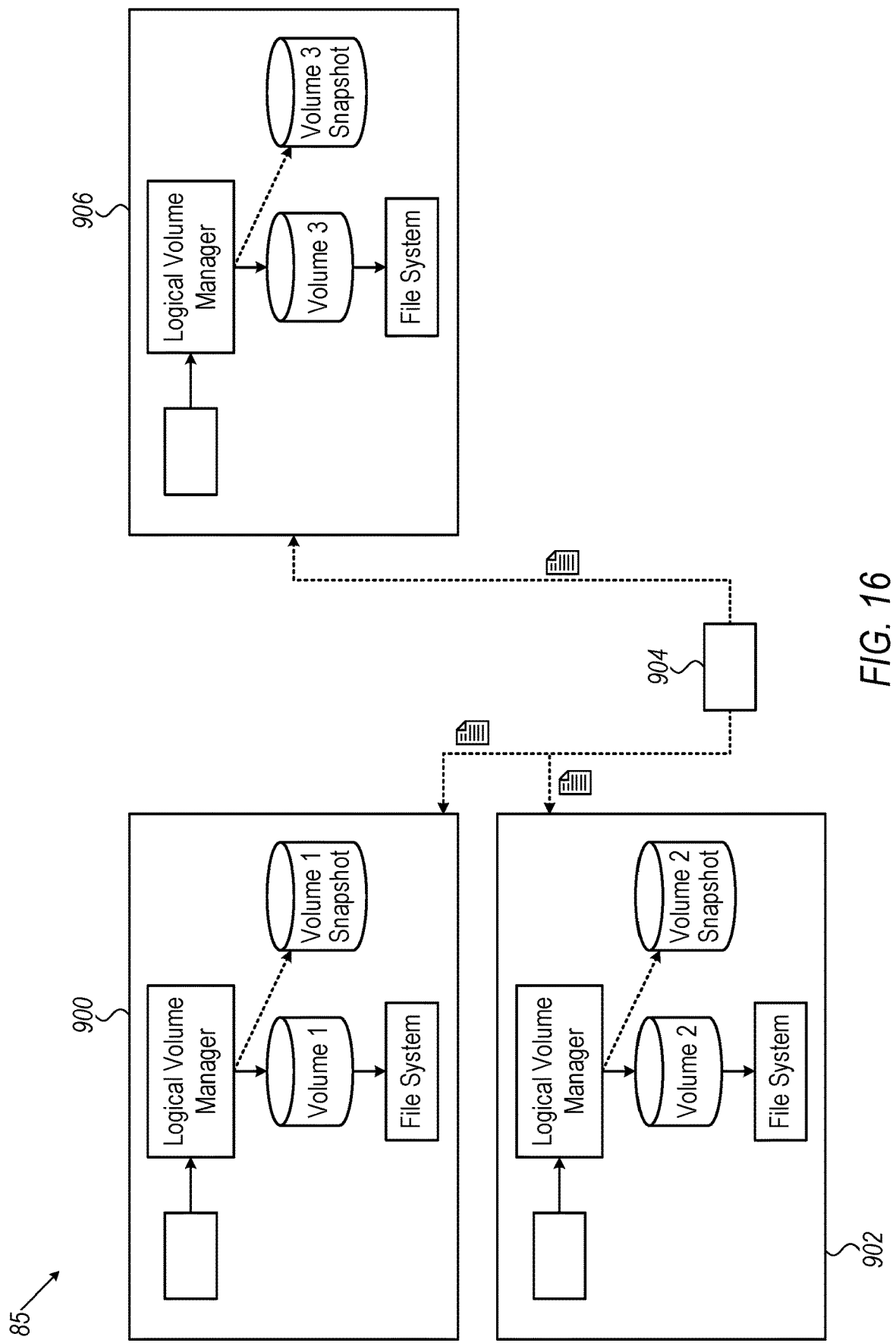
FIG. 16 constitutes a schematical illustration of a distributed snapshot consistency group system, according to some embodiments of the invention.

Reference is now made to FIG. 16 which constitutes an overview of a distributed snapshot consistency group system 85, according to some embodiments of the invention. As shown, each server 900, 902 and 906 is configured to manage its own DP and comprises its own LVN and media storages. In other words, the CP is centralized but the DP is non-centralized.

As previously disclosed, system 85 enables the distribution of volumes in multiple servers to form a snapshot with a consistency group, ensuring copies of a collection of volumes at a particular point in time.

According to some embodiments, orchestrator 904 is configured to coordinate the snapshot taking and may use the CP to coordinate the consistency group snapshot taking. According to some embodiments, I/O suspension and resumption of functionality may be used for forcing a consistent snapshotting.

According to some embodiments, in the consistency group 85 depicted in FIG. 16, server 900 comprises volume 1, 902 comprises volume 2 and 906 comprises volume 3, and. for example, orchestrator 904 may be configured to stop the I/O operations between volume 1 and file system.

According to some embodiments, taking a snapshot of the consistency group in such an exemplified constellation would include the following steps:

Orchestrator 904 may instruct server 900 to suspend I/O to volume 1,

Orchestrator 904 may instruct server 902 to suspend I/O to volume 2,

Orchestrator 904 may instruct server 906 to suspend I/O to volume 3,

Orchestrator 904 is configured to wait for all servers to acknowledge the suspension, if after a short timeout a server did not response, the snapshot is canceled, and I/O is resumed, Orchestrator 904 may instruct LVM in server 900 to snapshot volume 1, Orchestrator 904 may instruct LVM in server 902 to snapshot volume 2, Orchestrator 904 may instruct LVM in server 906 to snapshot volume 3, Orchestrator 904 may wait for all servers to acknowledge the snapshot, if after a short timeout a server did not response, the snapshot is canceled, snapshots are deleted, and I/O is resumed, Orchestrator 904 instruct volume in server 900 to resume I/O to volume 1, Orchestrator 904 instruct volume in server 902 to resume I/O to volume 2, Orchestrator 904 instruct volume in server 906 to resume I/O to volume 3, According to some embodiments, some said operations may be carried out in parallel for reducing snapshot time.

According to some embodiments, Since the I/O is suspended in all of the volumes (volumes 1,2, and 3 in FIG. 16), and only thereafter the snapshot is taken, snapshots having a consistent point in time are generated. This is obtained by creating functionality for distributed volumes which in traditional systems was reserved only for centralized arrays.

According to some embodiments, orchestrator 904 may back-off from the consistency group snapshot if one of the servers misbehaves or timeouts.

According to some embodiments, orchestrator 904 is configured to delete consistency group snapshot in distributed volumes, rolling back consistency group snapshot in distributed volumes, schedule snapshots in distributed volumes with consistency group, etc.

Figure 17:
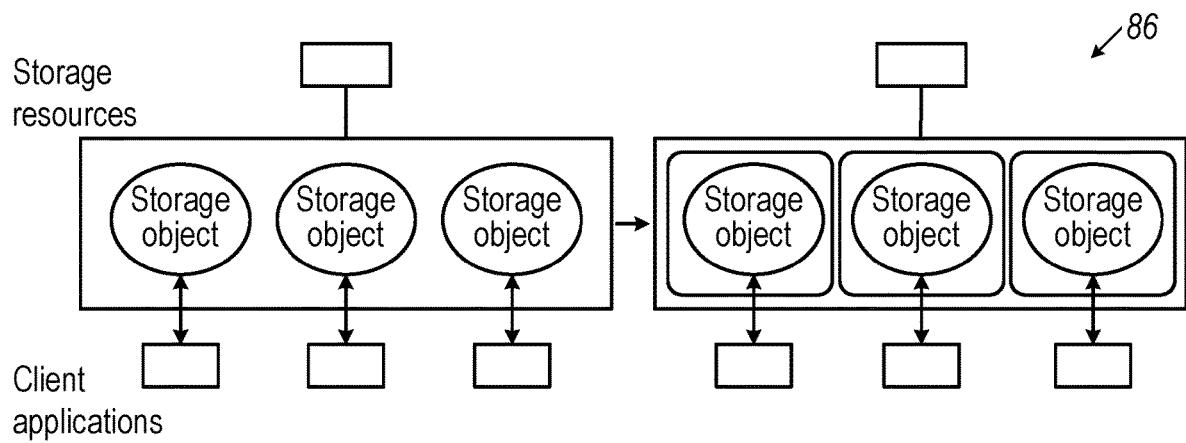
FIG. 17 constitutes a schematical illustration of a traditional storage QoS in storage arrays.

Reference is now made to FIG. 17 which constitutes an overview of a traditional storage QoS in storage arrays system 86. As shown, three volumes are presented at the right side of the drawing, each one has a different IOPS rates management that provides QoS that control the storage object/volume, and, as a consequence, every application/volume receives a managed portion of the system resources which may lead to better system performance. At the left side of the drawing, we see a system without QoS wherein every application/volume consume the common resources without general management thereby possibly adversely affecting the performance of the system as a whole.

Figure 18:
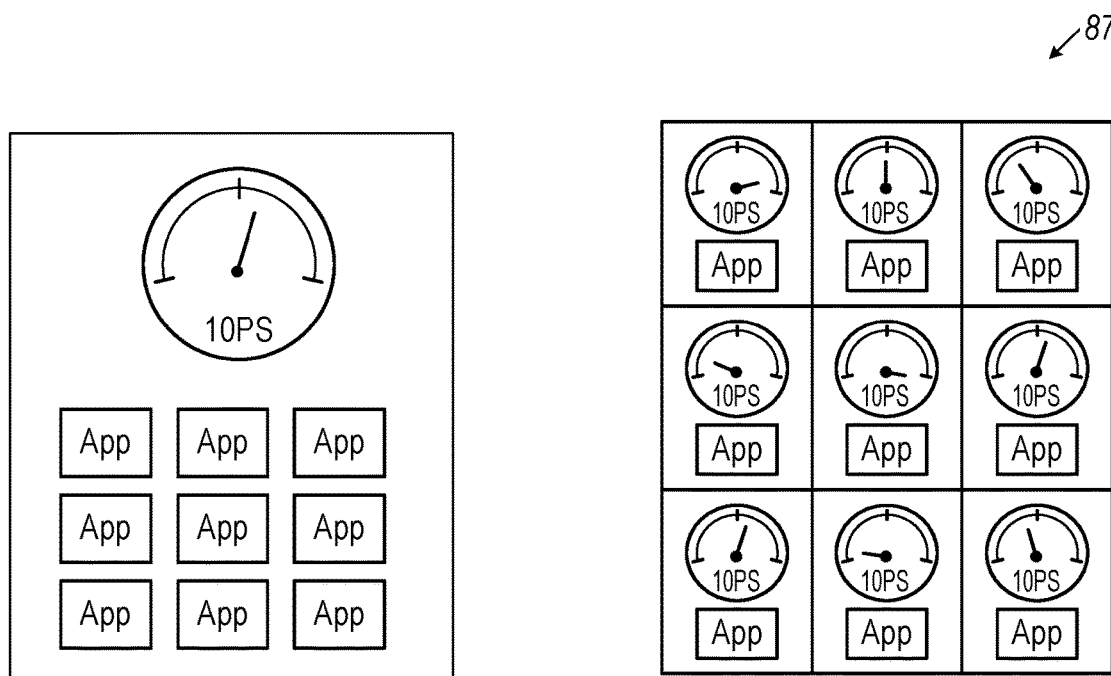
FIG. 18 constitutes a schematical illustration of a traditional storage QoS between volumes.

Reference is now made to FIG. 18 which constitutes an overview of a traditional Storage QoS between volumes system 87. As shown, without QoS every application/volume consumes the common resources without general management, thereby possibly adversely affecting the performance of the system as a whole. With QoS, every application/volume receives a managed portion of the system resources, which may lead to better system performance.

Figure 19:
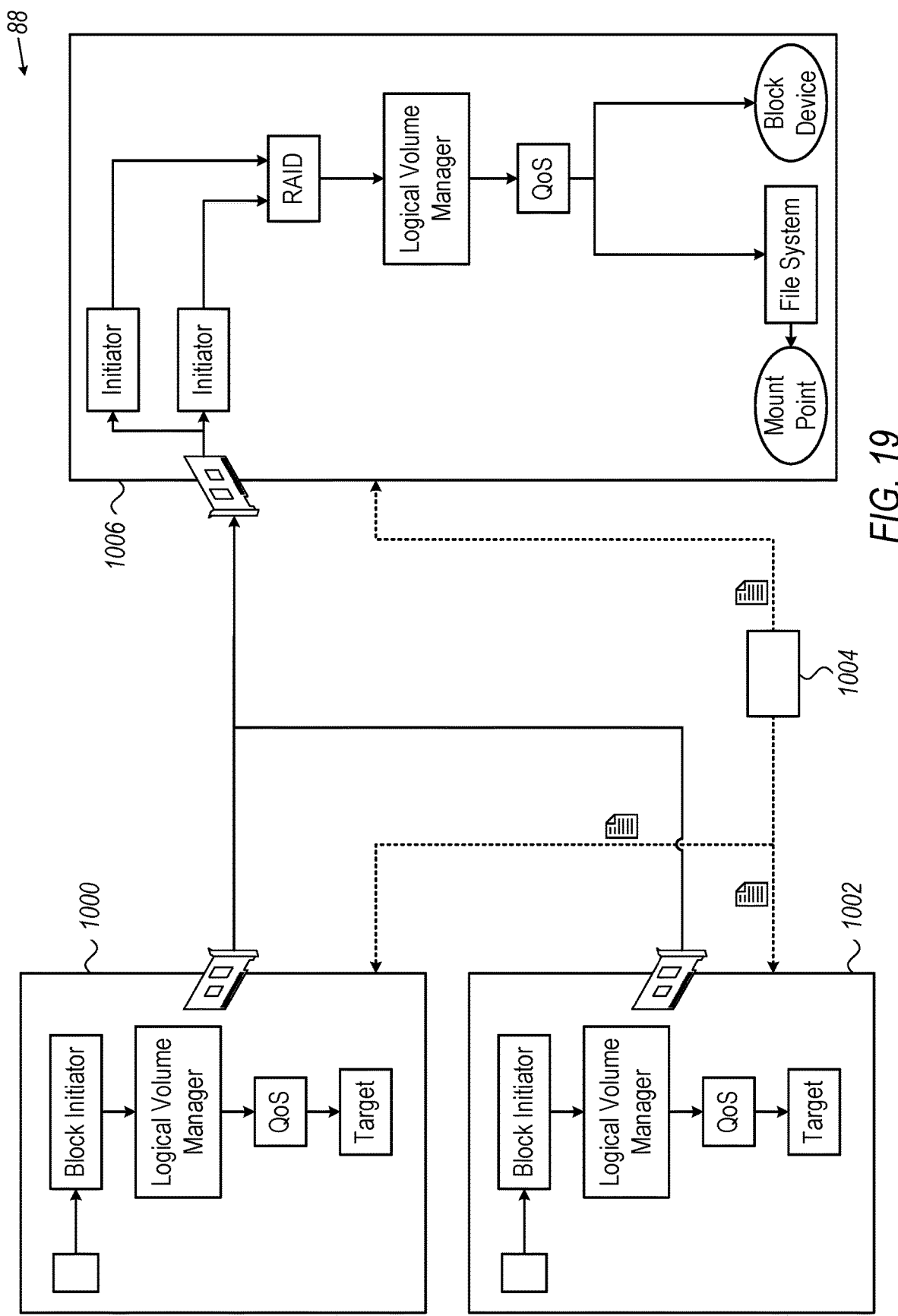
FIG. 19 constitutes a schematical illustration of a shared drive storage stack distributed QoS, according to some embodiments of the invention.

Reference is now made to FIG. 19 which constitutes an overview of a shared drive storage Stack Distributed QoS system 88 which provides a design for encoring QoS in a distributed storage stack with shared drives. As shown, a shared volume is constructed from the various volumes or servers 1000, 1002, and 1006. According to some embodiments, each server comprises a distributed QoS limitation (installed between the target and LVM), and centralized orchestrator 1004 is configured to control the mathematical limitation applied by the QoS for each server.

According to some embodiments, when writing procedure is conducted, the limitation of the QoS requires a complex computation, and orchestrator 1004 is adapted to provide this task, by, for example, conducting said calculation in accordance with a RAID scheme.

According to some embodiments, orchestrator 1004 is configured to orchestrate the QoS CP, while each server enforces local QoS DP. According to some embodiments, a shared drive storage stack is provided and enables QoS functionality equivalent to a traditional centralized storage array.

According to some embodiments, a shared drive storage stack is provided in a design wherein orchestrator 1004 is configured to orchestrate the QoS limitations in each junction.

According to some embodiments, when a QoS is requested to be enforced for specific volumes, orchestrator 1004 is configured to calculate the required QoS of each backend drive, based on the RAID scheme used for that volume, orchestrator 1004 then distributes in the used CP the QoS limit for each drive/volume of each server 1000, 1002 and/or 1006.

According to some embodiments, RAID 0, RAID 1 and RAID 5 require different QoS calculations. The below examples represent calculations based on RAID scheme:

In RAID 0, IOPS and bandwidth are divided by number of drive element in the array, In RAID 1, IOPS and bandwidth are set for each drive as requested, In RAID 10, IOPS and bandwidth are divided by number of drive elements in the array divided by resiliency set, In RAID 5, bandwidth is divided by number of drives, minus 1. IOPS are divided by number of drives and multiplied by 3.

According to some embodiments, when volumes in servers 1000, 1002, and 1006 are parts of a shared volume group, orchestrator 1004 is configured to sum the IOPS and bandwidth limitations of each volume element in the group. According to some embodiments, the combined numbers are configured to be enforced on the backend drives/volumes. According to some embodiments, another layer of QoS may be added on the local server to enforce volume limitations.

According to some embodiments, when volumes are added to the shared volume group, orchestrator 1004 is configured to recalculate the limits and update each QoS element. According to some embodiments, when volumes are deleted from the shared volume group, orchestrator 1004 is configured to recalculate the limits and updates of each QoS element.

According to some embodiments, multiple initiators are configured to be created per network path to each server 1000, 1002 and 1006.

Figure 20:
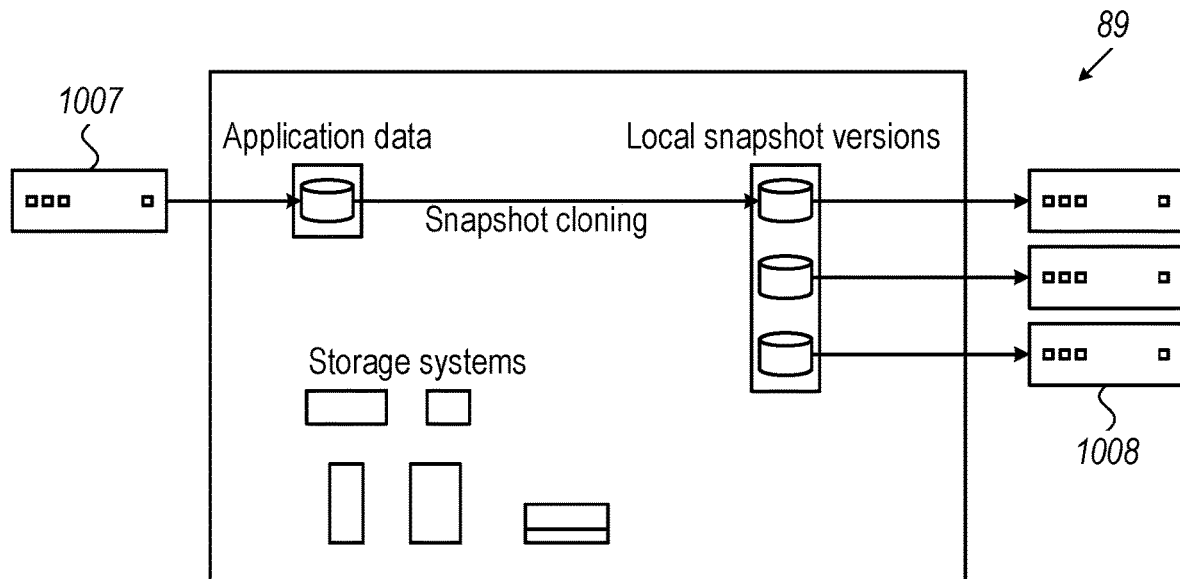
FIG. 20 constitutes a schematical illustration of a traditional Enterprise Storage Arrays with Clone system.

Reference is now made to FIG. 20 which constitutes an overview of a traditional Enterprise Storage Arrays with Clone system 89. As shown, server 1007 is a production server configured to create clones of data using an application data further configured to conduct a snapshot cloning and create snapshot version to be stored on clone servers 1008. Disk cloning is the process of making an image of a partition or of an entire hard drive. This can be useful for copying the drive to other computers and for backup and recovery purposes.

Figure 21:
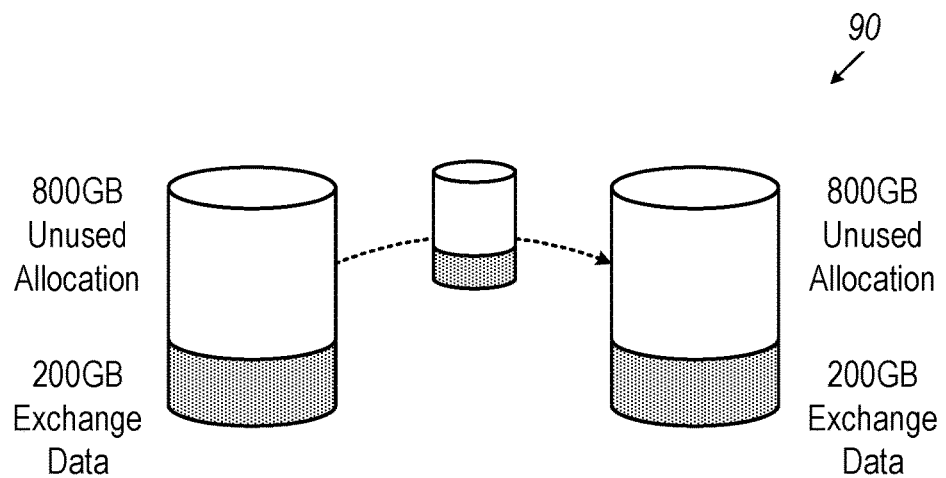
FIG. 21 constitutes a schematical illustration of Cloning Entire Volume with Unallocated Data system.

Reference is now made to FIG. 21 which constitutes an overview of Cloning Entire Volume with Unallocated Data system 90. As shown, the volume being cloned from left to right is to be partly empty and when a clone is created, some of the volume in the clone also stays empty.

Figure 22:
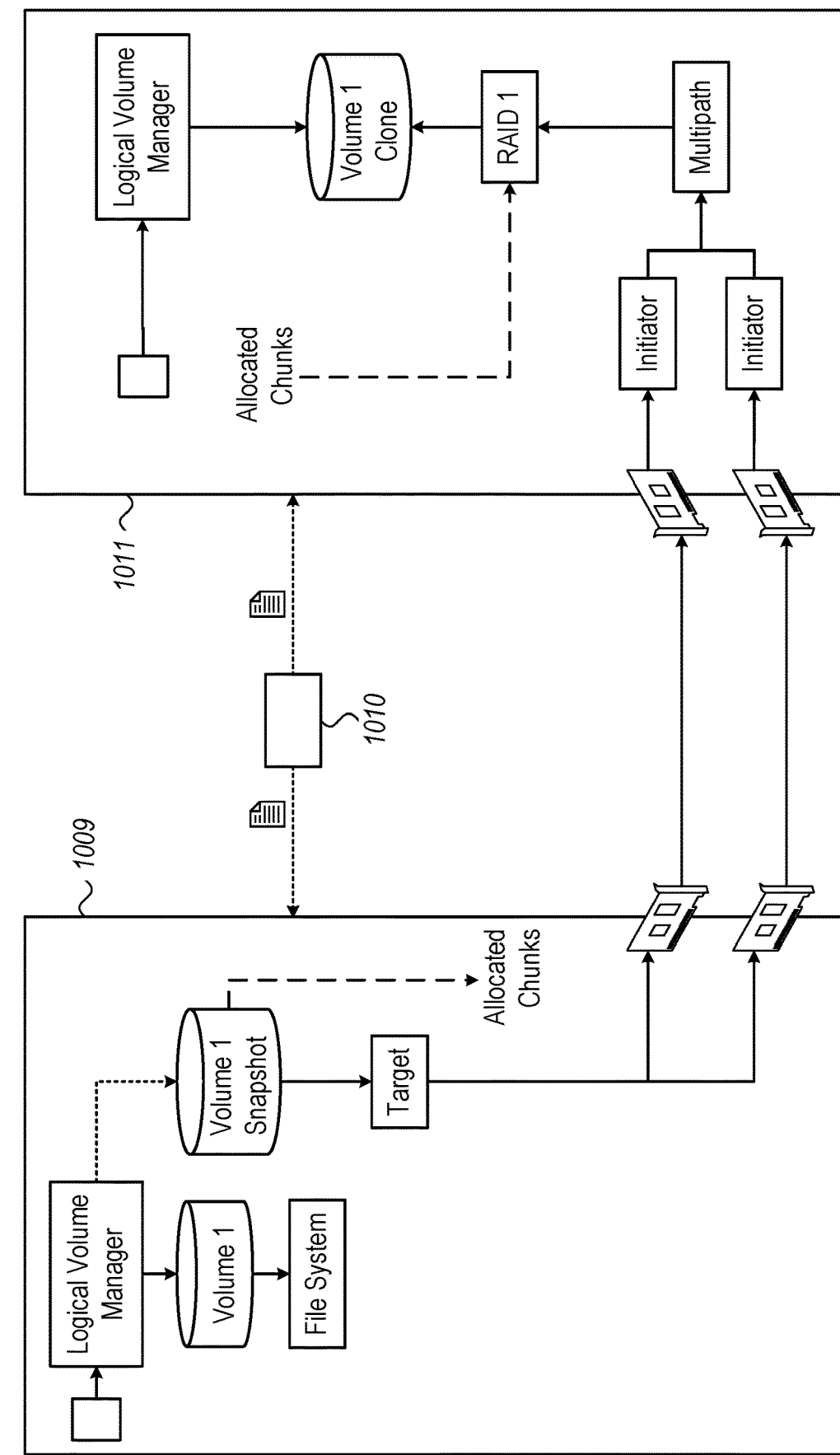
FIG. 22 constitutes a schematical illustration of Clone of Remote Online Volume distributed system, according to some embodiments of the invention.

Reference is now made to FIG. 22 which constitutes an overview of a clone of Remote Online Volume distributed system 91, according to some embodiments of the invention. As shown, system 91 enables cloning a volume from one source server 1009 to another destination server 1011 over the network, while the volume is online and orchestrator 1010 is configured to orchestrate the clone process over a CP to both servers and only the allocated blocks in the source volume (that belongs to server 1009) are copied.

According to some embodiments, the orchestrator 1010 is configured to query the data allocation and passes it to a destination server 1011 as copy bitmap. According to some embodiments, orchestrator 1010 is configured to coordinate volume cloning between servers over CP. According to some embodiments, orchestrator 1010 is configured to query allocated blocks on the source volume of server 1009 and instructs destination server 1011 blocks to copy.

According to some embodiments, only the allocated blocks in the source volume of server 1009 are copied. orchestrator 1010 is configured to query the allocation data and passes it to a destination server 1011 as copy bitmap. According to some embodiments, in order to clone an online volume, the logical volume manager (LVM) on the source server 1009 is used to create a point in time snapshot of the source volume.

According to some embodiments, RAID 1 can be used for in-kernel copy of the volume, using translated change bitmap with zero copy. According to some embodiments, user space command can also be used for copy.

According to some embodiments, by way of example, system 91 depicted in FIG. 22 may be configured to execute and demonstrate a remote clone using the following steps:

Orchestrator 1010 requests server 1009 LVM component to create a point in time snapshot of the source volume,
Orchestrator 1010 requests server 1009 target component to expose the source volume snapshot over the network,
Orchestrator 1010 requests server 1011 initiator component to connect over the network to the exposed volume over the first adapter,
Orchestrator 1010 requests server 1011 initiator component to connect over the network to the exposed volume over the second adapter,
Orchestrator 1010 request Server 1011 multipath component to create reliable connection over the two initiators to the source volume snapshot,
Orchestrator 1010 request Server 1011 to create an empty destination volume,
Orchestrator 1010 request Server 1011 to create a RAID 1 for replicating in kernel, Remote source volume snapshot and local destinations may be added as RAID 1 members,
Orchestrator 1010 query Server 1009 for allocation chunks in source volume snapshot,
Orchestrator 1010 pass to server 1011 the allocation chunks in source volume snapshot, as bitmap to RAID 1 replication,
Orchestrator 1010 monitor RAID 1 component on Server 1011 for progress,
Orchestrator 1010 waits for Server 1011 RAID 1 copy to finish,
Orchestrator 1010 request Server 1011 to delete the RAID 1 component,
Orchestrator 1010 request Server 1011 to delete the multipath component,
Orchestrator 1010 request Server 1011 to delete initiator on adapter 1,
Orchestrator 1010 request Server 1011 to delete initiator on adapter 2,
Orchestrator 1010 request Server 1009 to delete target of exposed source volume snapshot,
Orchestrator 1010 request Server 1009 to delete LVM volume 1 snapshot.

Figure 23:
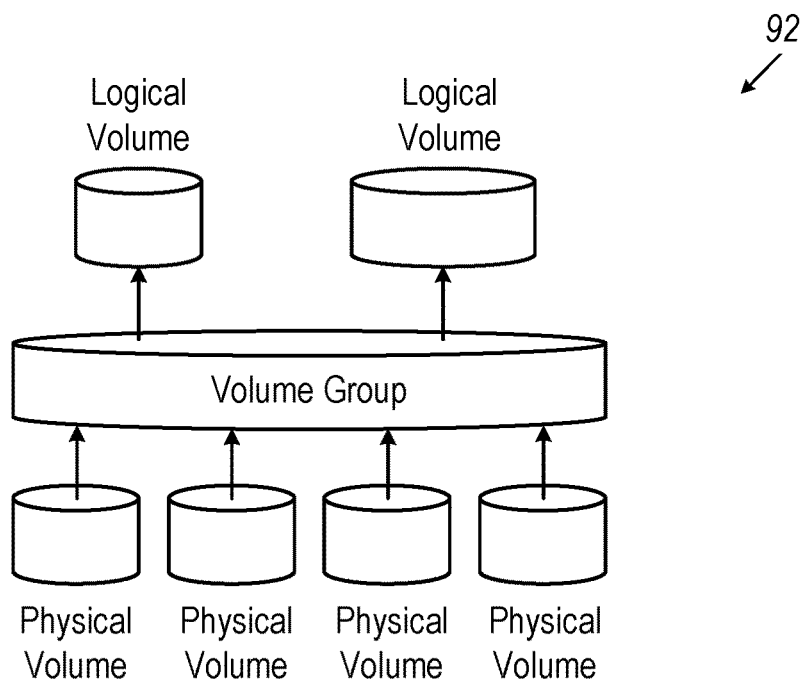
FIG. 23 constitutes a schematical illustration a traditional Logical Volume Manager LVM that configured to allocates volume parts.

Reference is now made to FIG. 23, which schematically illustrates a traditional Logical Volume Manager (LVM) 92 that is configured to allocate volume parts. As shown, the allocation and data transfer are conducted while translating from a logical volume to a physical volume, creating an LVM connected and consumed at the same server.

Figure 24:
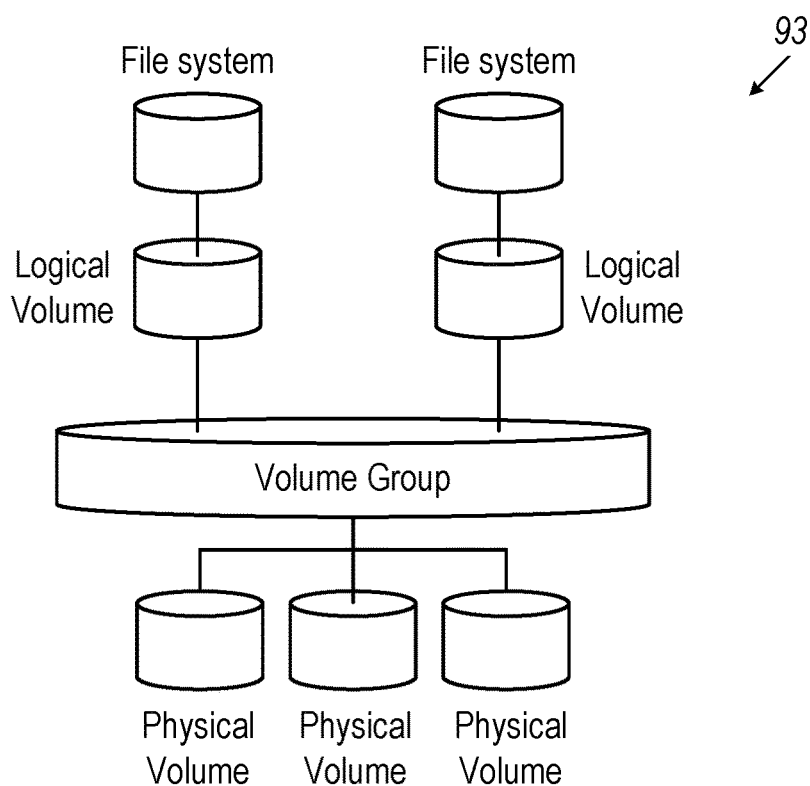
FIG. 24 constitutes a schematical illustration another view of traditional Logical Volume Manager LVM that configured to allocates volume parts.

Reference is now made to FIG. 24, which schematically illustrates Another view (marked as 93) of a traditional LVM 92 that is configured to allocates volume parts. As shown, the allocation and data transfer is conducted while translating from a logical volume to a physical volume, creating an LVM connected and consumed at the same server.

Figure 25:
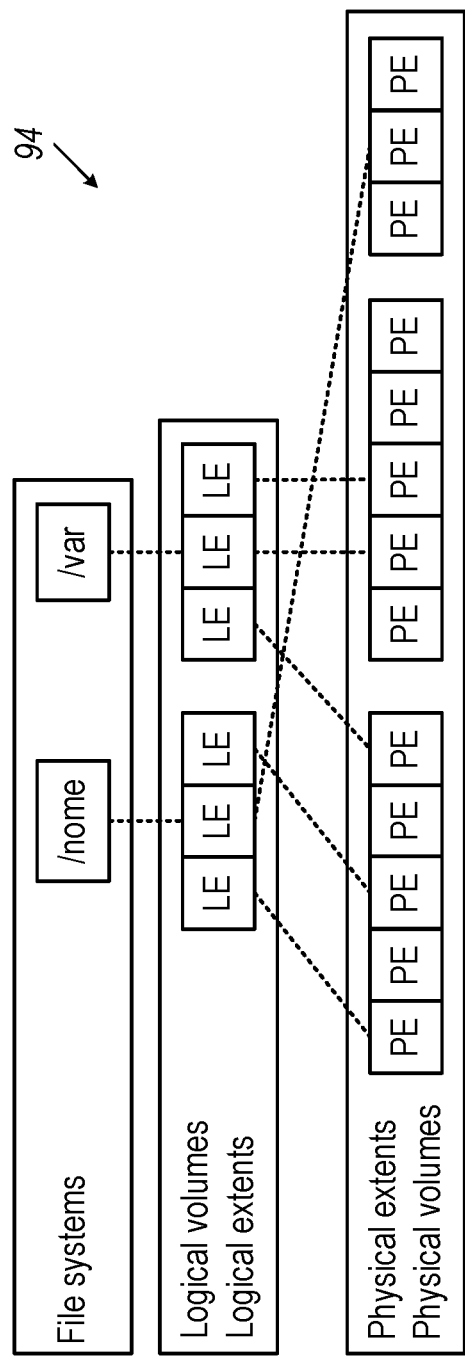
FIG. 25 constitutes a schematical illustration of a a traditional Logical Volume Extents and Metadata system.

Reference is now made to FIG. 25, which schematically illustrates a traditional Logical Volume Extents and Metadata system 94. As shown, I/O is configured to map the physical extent from LE to PE and be in charge of the internal mapping between the logical and physical chunks.

Figure 26:
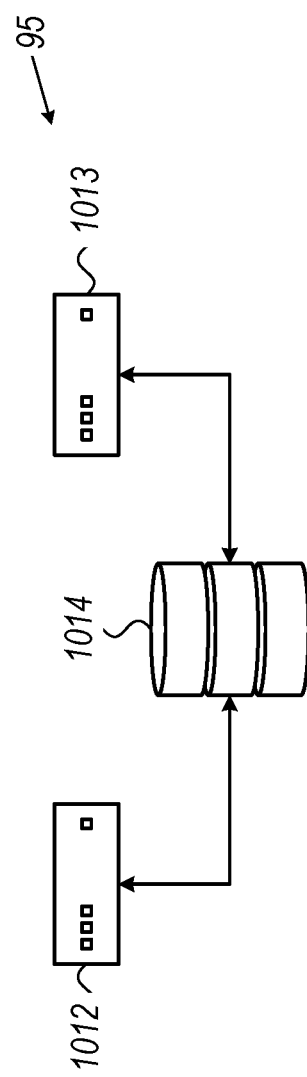
FIG. 26 constitutes a schematical illustration of a traditional a shared storage between servers.

Reference is now made to FIG. 26, which schematically illustrates a traditional shared storage between system servers' 95.

Figure 27:
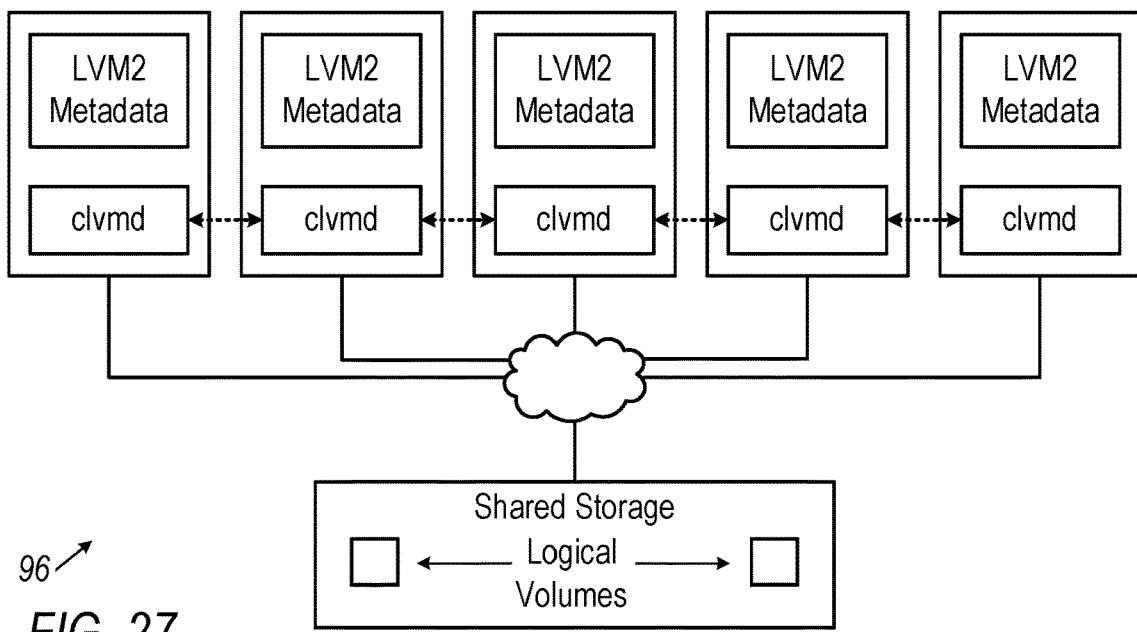
FIG. 27 constitutes a schematical illustration of a traditional clustered logical volume manager.

Reference is now made to FIG. 27, which schematically illustrates a traditional clustered logical volume manager 96. As shown, a batch of servers that share the same shared storage, the synchronization between them is conducted using a system of clusters.

Figure 28:
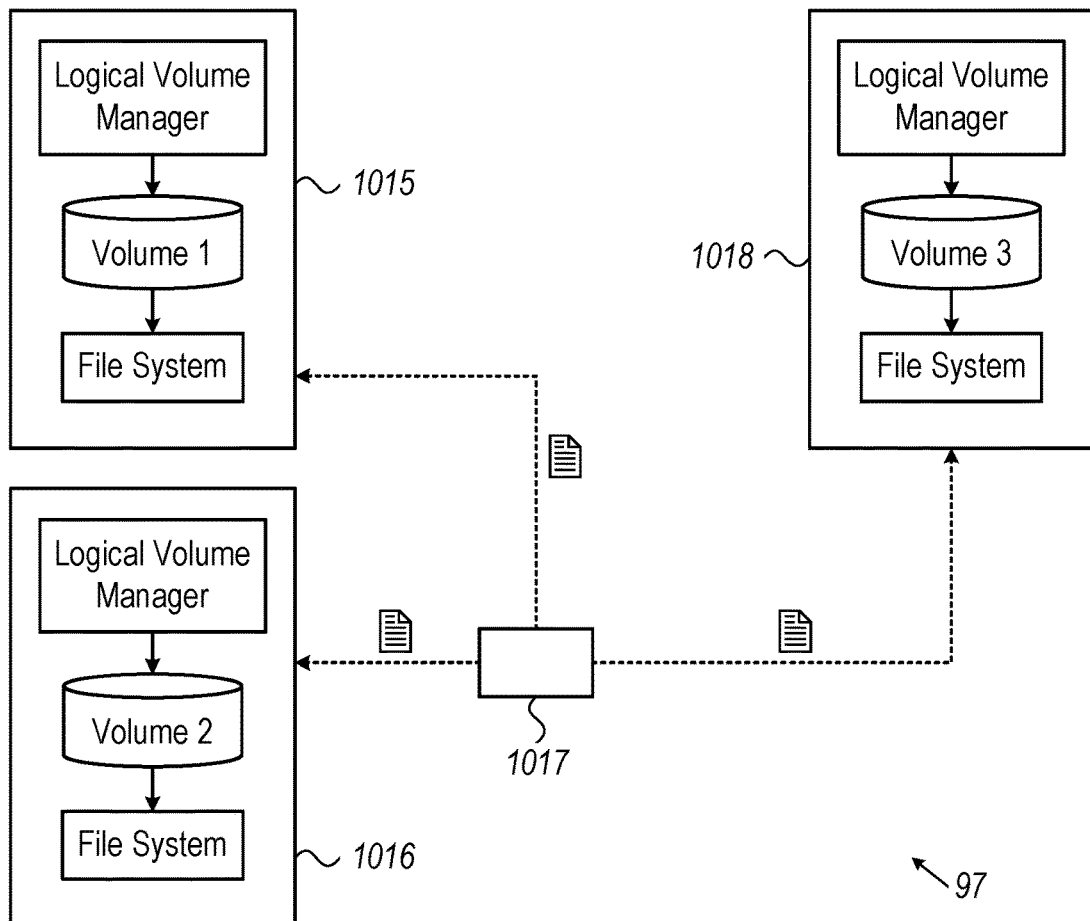
FIG. 28 constitutes a schematical illustration of a Distributed Logical Volume Manager without a Cluster, according to some embodiments of the invention.

Reference is now made to FIG. 28, which schematically illustrates a Distributed Logical Volume Manager system 97 without a Cluster, according to some embodiments. As shown, a distributed LVM is provided on shared storage which does not require a clustering operation.

According to some embodiments, a centralized orchestrator 1017 is configured to control the allocation of the extents across the distributed logical volume manager on shared storage.

According to some embodiments, system 97 is configured to apply and execute LVMs, 1018, etc., with shared backend storage, without clusters, while keeping the metadata consistent across the said servers.

According to some embodiments, centralized orchestrator 1017 is configured to be the only resource managing the distributed LVMs. Orchestrator 1017 is further configured to queue parallel operations on the distributed LVM, making sure only one operation is performed at a time.

According to some embodiments, orchestrator 1017 is configured to send the LVM extent allocation commands to all the servers 1015,1016, 1018, etc. sharing the backend storage and the LVM, to ensure the cached metadata in the RAM will be consistent across all the servers.

According to some embodiments, orchestrator 1017 is configured to coordinate all the operations that require LVM extent allocation/deallocation as follows:
Volume Creation
Volume Delete
Volume Resize System 97 demonstrates a centralized controller controlling the LVM in all the servers. Whereas how volume 2 may be resized may be demonstrated as follows:

Request is sent to server 1016 a request to resize volume 2;
Orchestrator 1017 checks if other LVM extent operations are waiting for response in the orchestrator 1017;
If there are waiting requests running on the LVM, orchestrator 1017 queue the request;
Orchestrator 1017 send the request to resize volume 2 to server 1016;

Orchestrator 1017 send the request to resize volume 2 to server 1015—to ensure the cached metadata will be consistent.

According to some embodiments, orchestrator 1017 is configured to send the request to resize volume 2 to server 1018 to ensure the cached metadata will be consistent.

Figure 29:
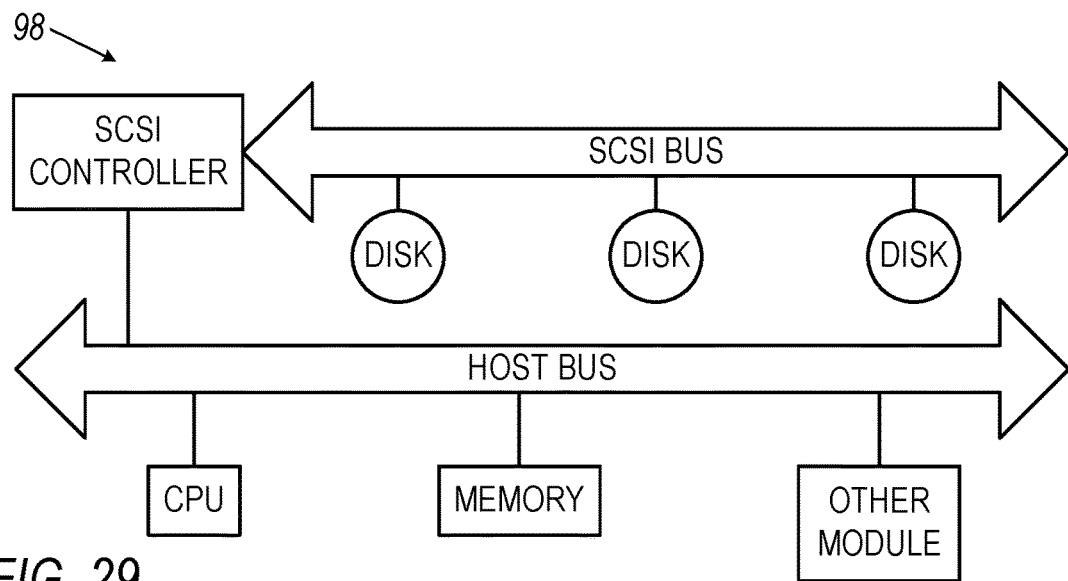
FIG. 29 constitutes a schematical illustration of a traditional layout overview of SCSI Bus system.

Reference is now made to FIG. 29, which schematically illustrates a traditional layout overview of SCSI Bus system 98. As shown, a logical BUS is configured to be scanned Traditionally, this is a time-consuming process.

Figure 30:
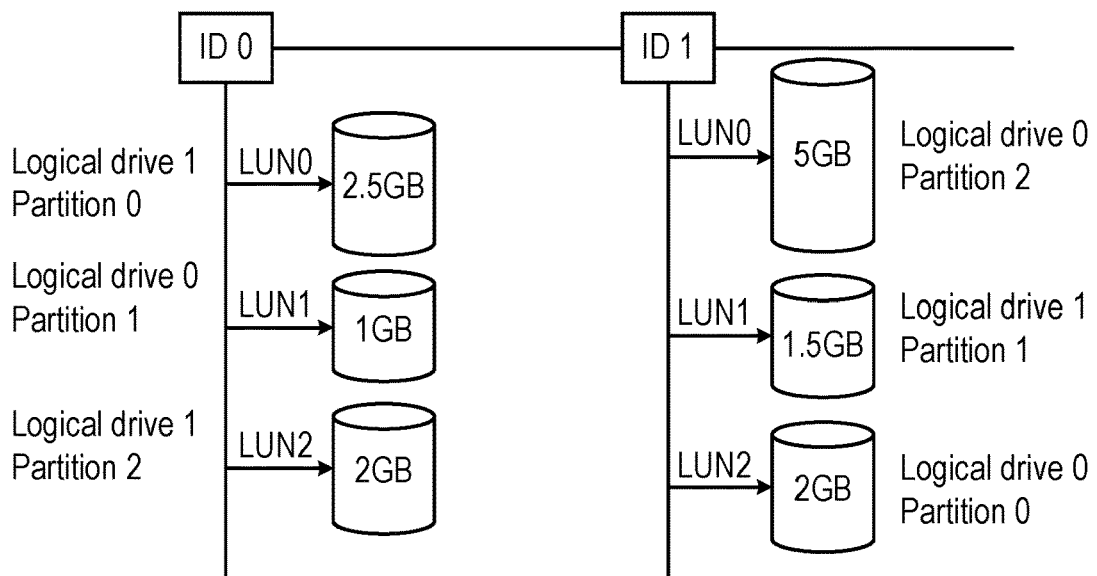
FIG. 30 constitutes a schematical illustration of a traditional Logical Units on Multiple Channels system.

Reference is now made to FIG. 30, which schematically illustrates traditional Logical Units on Multiple Channels system 99. As shown, another BUS system is depicted that emphasizes the need to scan every BUS. This slow process is not fitted to new modern distributed systems.

Figure 31:
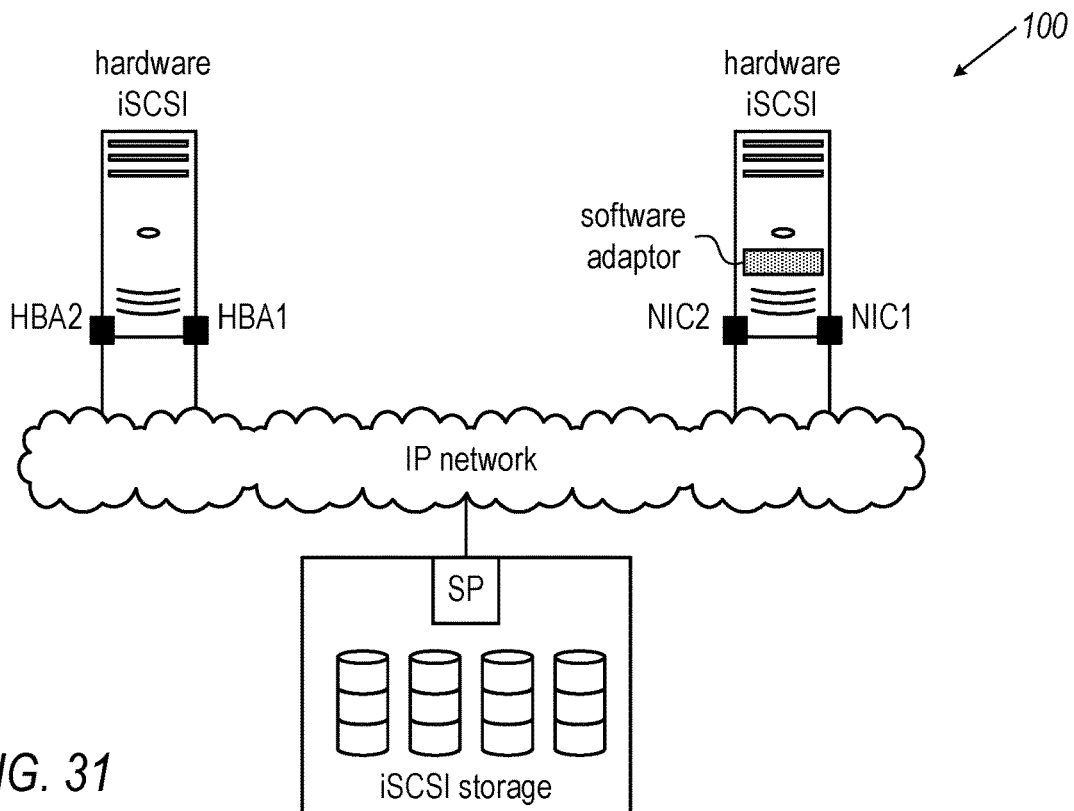
FIG. 31 constitutes a schematical illustration of a traditional iSCSI bus over IP Network.

Reference is now made to FIG. 31, which schematically illustrates a traditional iSCSI bus over IP Network 100. As shown, a network BUS requires many slow processes to be conducted to scan every BUS.

Figure 32:
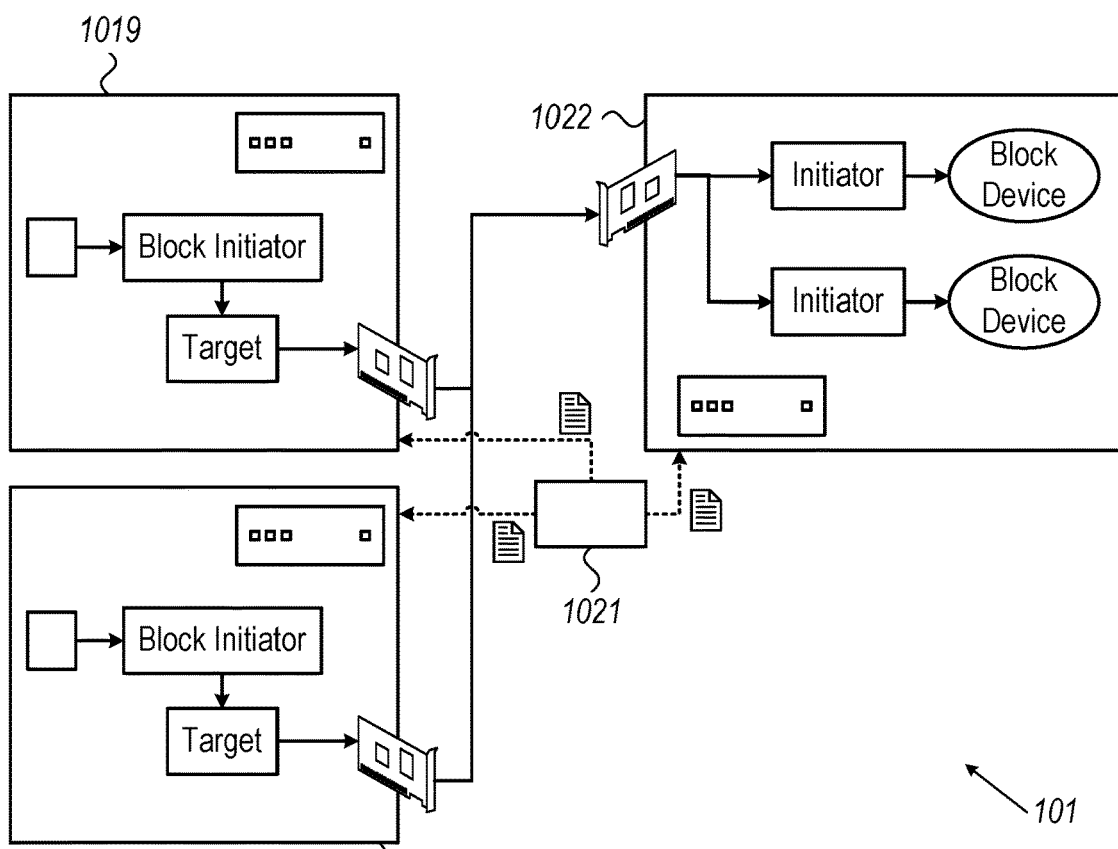
FIG. 32 constitutes a schematical illustration of a Coordinated Remote Device Attachment without Rescan system/process, according to some embodiments of the invention.

Reference is now made to FIG. 32, which schematically illustrates a Coordinated Remote Device Attachment without Rescan system/process 101, according to some embodiments of the invention. As shown, in a distributed system 101, workloads may move from server to server and the volumes should also move with it. Since orchestrator 1021 controls both sides of the system, meaning at the exposing side and at the consuming side, system 101 is able to perform differently. For example, orchestrator 1021, is connected to server 1019 and has its BUS parameters, since it is connected to all the servers, it may locate and pass the BUS location info from all the servers in the system (1019, 1020, 1022, etc.) without the need for a rescan.

According to some embodiments, system 101 enables a connection of remote storage device to another server, quickly and without any bus scan.

According to some embodiments, orchestrator 1021 is designated to coordinate the device attachment, setting up the target with specific bus IDs and providing the initiator the required bus IDs. The initiator uses the bus IDs to connect the device to the operating system. According to some embodiments, scan is not required because all the information retained and provided from or by orchestrator 1021.

According to some embodiments, when device is unexposed, orchestrator 1021 is configured to remove it from the target with specific bus IDs and instructs the initiator to remove the specific bus IDs device from the operating system.

According to some embodiments, a remote volume may be exposed by a target server (1019, 1020) and consumed by initiator server 1022, without initiator bus scan, coordinated by orchestrator 1021.

According to some embodiments, a remote volume may be removed by target and initiator present within a target server (1019, 1020) and an initiator server 1022, respectively, without an initiator bus scan, coordinated by orchestrator 1021.

According to some embodiments, orchestrator 1021 is configured to coordinate the device attachment, setting up the target with specific bus IDs and providing the initiator the required bus IDs. According to some embodiments, the initiator uses the bus IDs to connect the device to the operating system. Scan is not required because all the information is known and passed from the orchestrator 1021.

According to some embodiments, when a device is unexposed, the orchestrator 1021 removes it from the target with specific bus IDs and instructs the initiator to remove the specific bus IDs device from the operating system.

According to some embodiments, a device name in the initiator server 1022 is configured to be detected using the bus IDs as well, to enable, for example, to stack other storage components on top of it.

According to some embodiments, system 101 is configured for connecting a new remote device, for example:
- orchestrator 1021 connect to server 1019 and read its target configuration,
- orchestrator 1021 find a free Logical Unit Number (LUN) for server 1022 in server 1019' configuration,
- orchestrator 1021 set the new target in server 1022 with the LUN id,
- orchestrator 1021 checks the address of the HBA in server 1019,
- orchestrator 1021 finds the server 1019' HBA address target id on server 1022,
- orchestrator 1021 set up the new device on server 1022 using the LUN id and target id, for the operating system use,
- orchestrator 1021 finds the block device name used by the operating system, using the LUN id and target id.

According to some embodiments, the remote volume may be removed by target and initiator with a coordination made by the orchestrator 1021, without the need for initiator bus scan.

According to some embodiments, orchestrator 1021 may be configured to locate the block device name used by the initiator operating system, using the target information.

Figure 33:
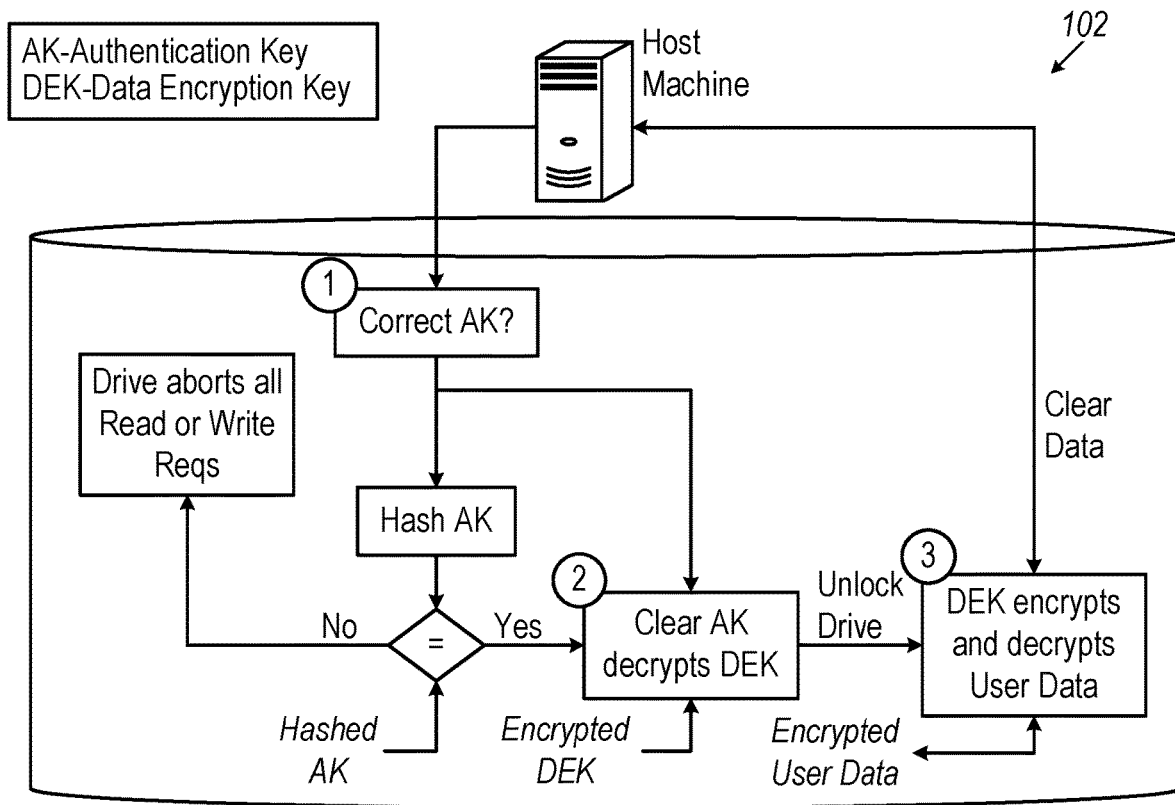
FIG. 33 constitutes a schematical illustration of a traditional Self Encrypted Drive (SED) Logic.

Reference is now made to FIG. 33, which schematically illustrates a traditional Self Encrypted Drive (SED) Logic 102. As shown, traditional SED components, are configured to enable the drive to provide a key when a correct password inserted. As seen, in the traditional architecture the key and passwords are stored with the data inside the drive.

Figure 34:
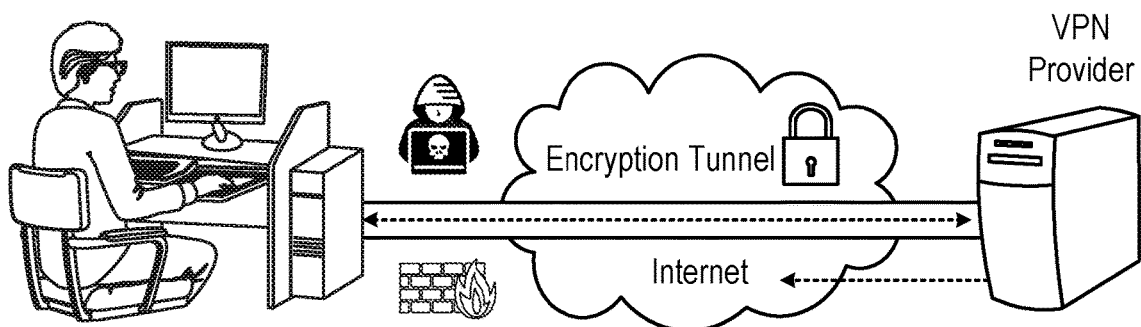
FIG. 34 constitutes a schematical illustration of a traditional Protocol Tunnel.

Reference is now made to FIG. 34, which schematically illustrates a traditional Protocol Tunnel 103. As shown, an encrypted tunnel is configured to be opened from a certain point to another in order to safely deliver data in an unencrypted system.

Figure 35:
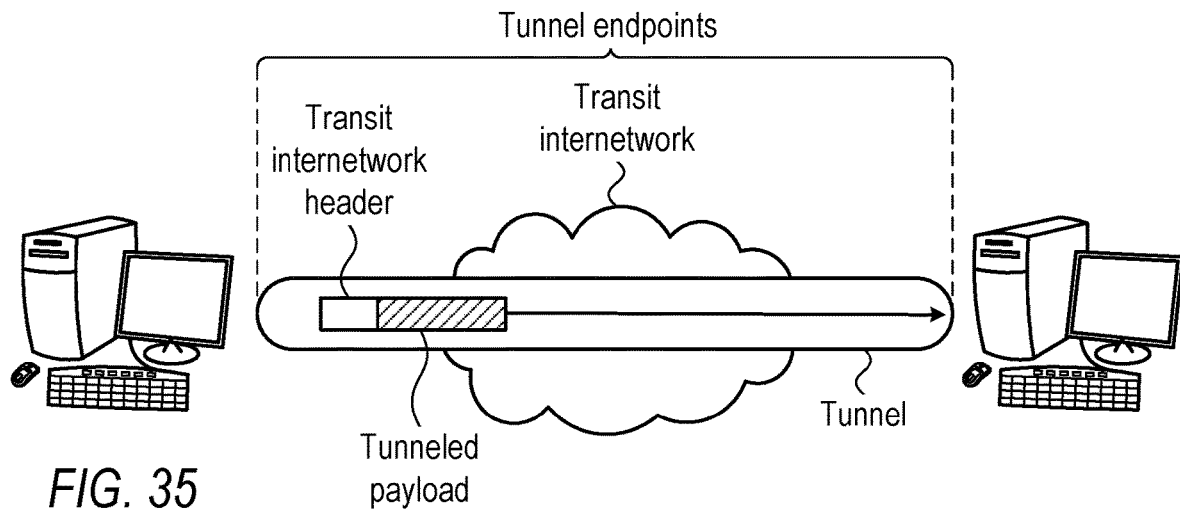
FIG. 35 constitutes a schematical illustration of another representation of traditional Payload Encapsulation using a tunnel between two servers.

Reference is now made to FIG. 35, which schematically illustrates another representation of traditional Payload Encapsulation using a tunnel between two servers, configured to deliver encrypted data from two points within a system.

Figure 36:
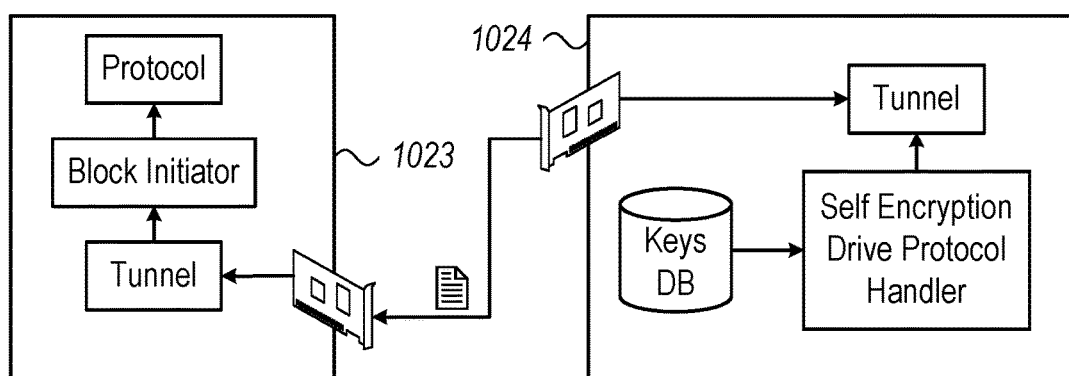
FIG. 36 constitutes a schematical illustration of a Remote Self Encrypted Drive Control with Tunnel, according to some embodiments of the invention.

Reference is now made to FIG. 36, which schematically illustrates a Remote Self Encrypted Drive Control with Tunnel, according to some embodiments of the invention. As shown, the distributed system disclosed is configured to store the key separately from the drive. According to some embodiments, the data may be stored in server 1023 and the key/password may be stored in orchestrator 1024 and the system is unencrypted by opening a tunnel and delivering the key over the tunnel without the need to store in on the drive (for example, on the RAM of the drive, etc.). According to some embodiments, said distributed system may store multiple keys and be configured to over multiple drives. According to some embodiments, the communication may be conducted using a SED protocol.

According to some embodiments, and as previously disclosed, said system and method enables utilizing tunneling Self-Encrypted Drive (SED) protocols over the network from a remote server and this goal may be obtained by having Keys stored in a centralized protected database in the orchestrator 1024 while SED Protocol is encapsulated over the network using encrypted tunneling.

According to some embodiments, the self-encrypted drive (SED) is controlled via a remote server through a tunnel for SED operations without the need for control utilities on the local server. According to some embodiments, the self-encrypted drive' (SED) keys are stored and provided in a centralized keys database.

According to some embodiments, the self-encrypted drive' (SED) keys are configured to pass via a tunnel directly into the drive, without being exposed to key-in-memory exploits on the server.

According to some embodiments, SED Protocol is encapsulated over the network using encrypted tunneling. For example, using Linux Secured Shell (SSH) protocol, Windows PowerShell Remoting Protocol (PSRP).

According to some embodiments, SED communication is done directly with the drive without the need for special tools. For Example, using Linux sg_raw utility for SCSI drives for raw communication with the drive, using Linux NVMe utility with admin-passthru command for NVMe drives, using Windows IOCTL_ATA_PASS_THROUGH_DIRECT.

According to some embodiments, this new approach may have many advantages over the local SED protocol used today by servers, for example:
  No need to install and maintain SED utilities (which does not exist as standard in the operating systems).
  No need for hardware security module (HSM) on the local servers.
  Keys are not exposed at any point in time to the local server and cannot leak or be stolen by attacker.
  Keys are stored in a centralized database that can be much easier protectable, logically and physically.

According to some embodiments, said system is configured to provide Remote Self Encrypted Drive control using the following steps:
  Orchestrator 1024 generate new key in its keys database.
  Tunnel is created between the orchestrator 1024 and the server 1023.
  Certificate is stored in orchestrator 1024.
  Tunnel is created between orchestrator 1024 and the drive.
  Certificate is stored in orchestrator 1024.
  Self-encryption drive protocol handler in orchestrator 1024 communicate remotely with the drive SED protocol component, over the tunnel
  SED protocol handler passes the key over secured encrypted channel to the drive.
  SED protocol handler enables drive lock.

According to some embodiments, said system is configured to provide a Remote Self Encrypted Drive control—after server reboot process using the following steps:
  Orchestrator 1024 detects server reboot
  Orchestrator 1024 fetch the server drive key from the keys database.
  Tunnel is created between orchestrator 1024 and the remote server.
  Stored certificate is verified.
  Tunnel is created between orchestrator 1024 and the drive.
  Stored certificate is verified.
  Self-encryption drive protocol handler in the orchestrator 1024 communicates remotely with the drive SED protocol component, over the tunnel.
  SED protocol handler passes the key over secured encrypted channel to the drive
  SED protocol handler unlocks the drive.

Figure 37:
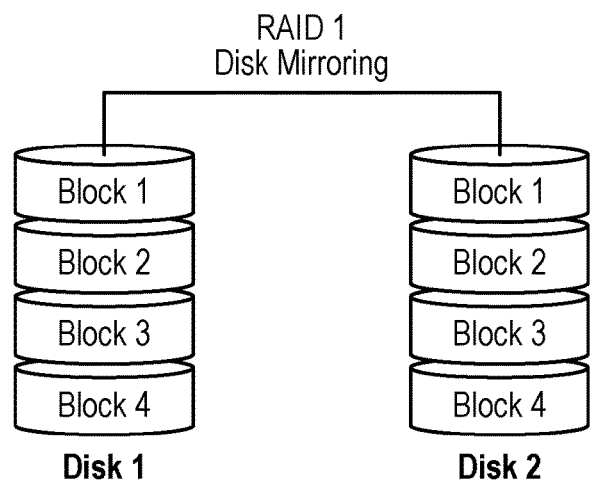
FIG. 37 constitutes a schematical illustration of a traditional RAID 1—Data Mirroring system.

Reference is now made to FIG. 37 which schematically illustrates a traditional RAID 1—Data Mirroring system. As shown, a backup RAID 1 is configured to replicate and store a double backup of the data.

Figure 38:
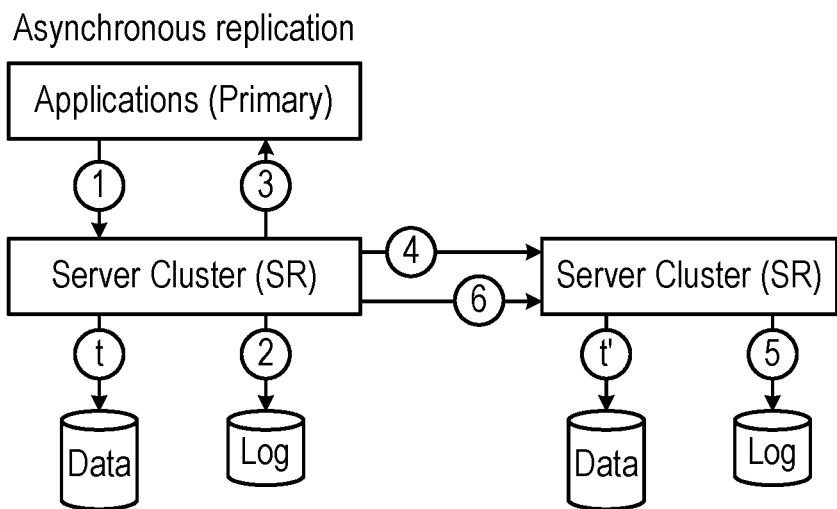
FIG. 38 constitutes a schematical illustration of a traditional Asynchronous Replication system.

Reference is now made to FIG. 38 which schematically illustrates a traditional Asynchronous Replication system. As shown, no data is getting lost during the backup process.

Figure 39:
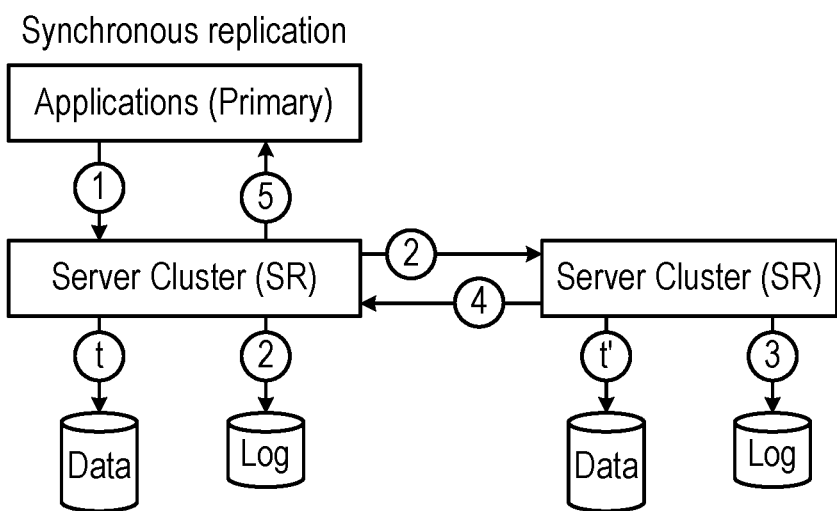
FIG. 39 constitutes a schematical illustration of a traditional Synchronous Replication system.

Reference is now made to FIG. 39 which schematically illustrates a traditional Synchronous Replication system. As shown, the replication is limited to a certain point back in time but a certain period of time may be lost, nevertheless, the replication should be consistent.

According to some embodiments, replicating data to at least one remote site using standard RAID 1 components. While common RAID 1 components are designed, built and used for mirroring data between two drives, the current invention suggests using RAID 1 to replicate data to a remote site, without any substantial changes to its components. According to some embodiments, Both Synchronous Replication and Asynchronous Replication may be used to have the RAID 1 component facilitate the invention.

According to some embodiments, a storage volume that is replicated to a remote site using a standard RAID 1 component, is operated at a synchronous mode.

Figure 40:
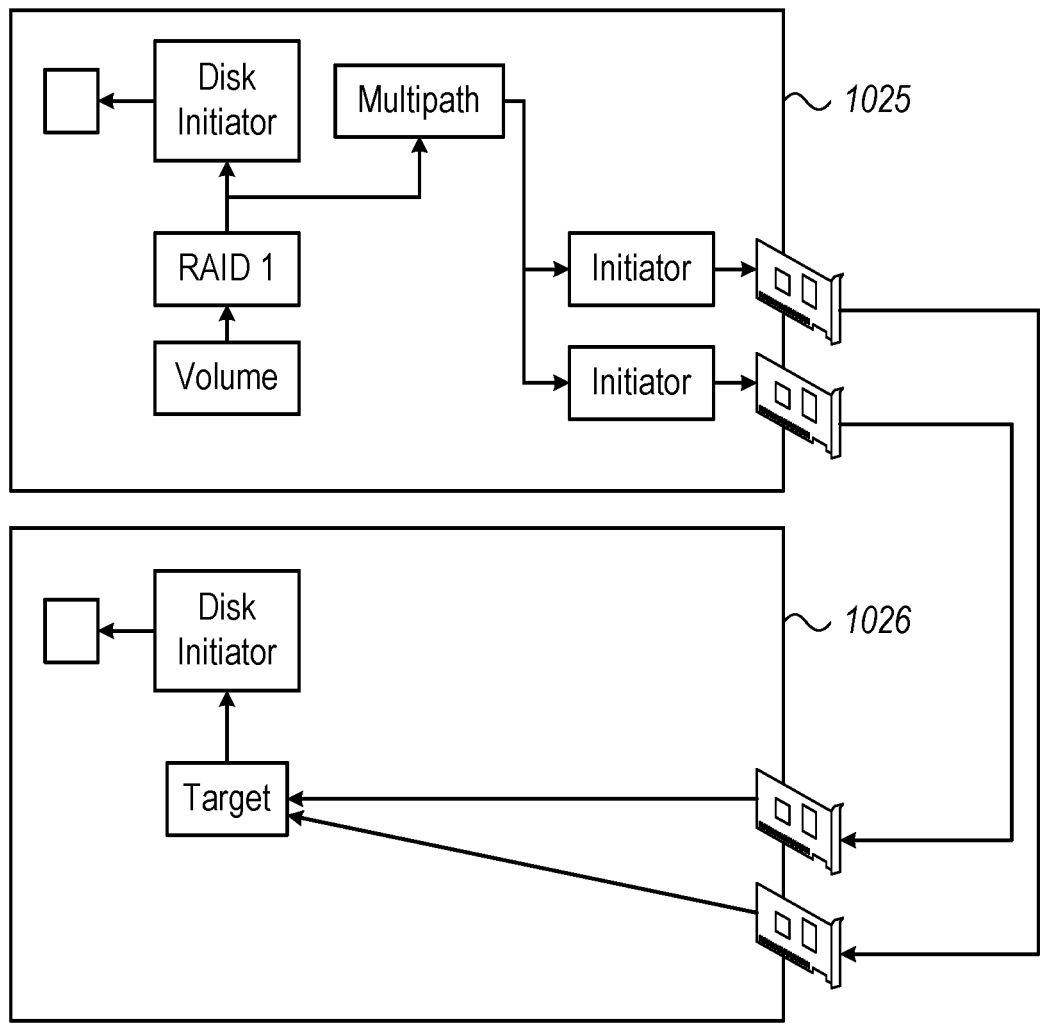
FIG. 40 constitutes a schematical illustration of a Synchronous Replication using RAID 1 system, according to some embodiments of the invention.

Reference is now made to FIG. 40 which schematically illustrates a Synchronous Replication using RAID 1 system, according to some embodiments of the invention. as shown, the components of the operating system utilized to split every writing to two, and may be stored in servers 1025 and 1026. In this way a synchronous replication may be achieved. According to some embodiments, an orchestrator (not shown) may manage this operation. According to some embodiment, said servers may be located substantially remote from each other.

According to some embodiments, the storage stack is used for synchronous replication with a RAID 1 component and, instead of connecting two drive of servers 1026, 1027, for which RAID 1 was originally design, only one physical drive is attached to the RAID1 while at least another drive is connected to a remote disk through storage components as exemplified by the Multipath, Initiator and Target components.

According to some embodiments, each write operation originating from the volumes of the servers is written both to the local disk and to the remote disk via the stack demonstrated in FIG. 39. The RAID 1 logic is well suited for such operation, since it was typically designed to mirror data between disks whereas the modification under the invention is that the second disk is set locally as a remote target.

According to some embodiments, in case of a disconnection in the network, the RAID 1 bitmap will track the changes that were not in-sync and will sync them back when remote server is connected. Such operation will in effect be the same as the RAID 1 operated for a pull-out of a mirror drive.

In another embodiment of the present invention, a storage volume that is replicated to a remote site uses an LVM snapshot coupled with a RAID 1 component, in an asynchronous mode.

Figure 41:
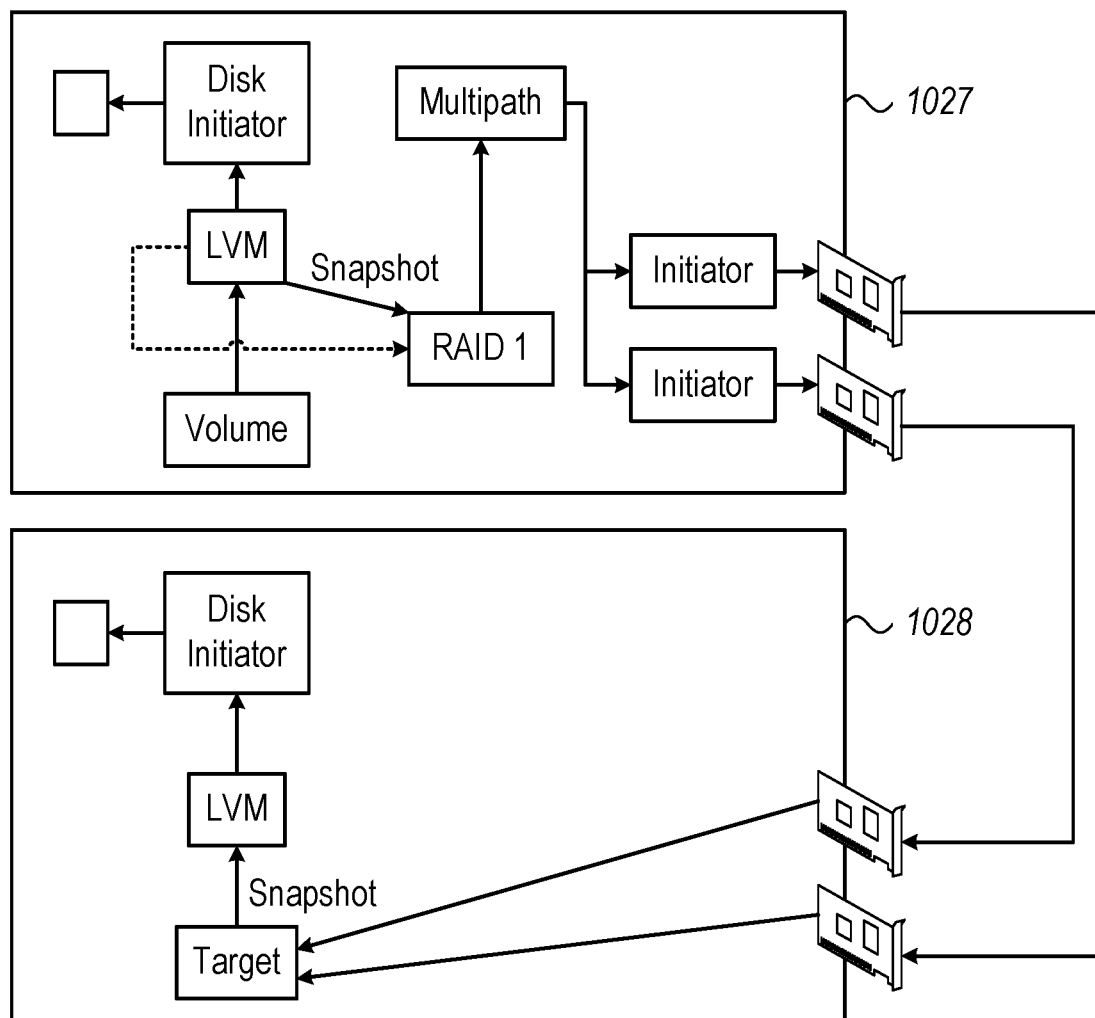
FIG. 41 constitutes a schematical illustration of a Asynchronous Replication using LVM Snapshot and RAID 1, according to some embodiments of the invention.
Figure 42:
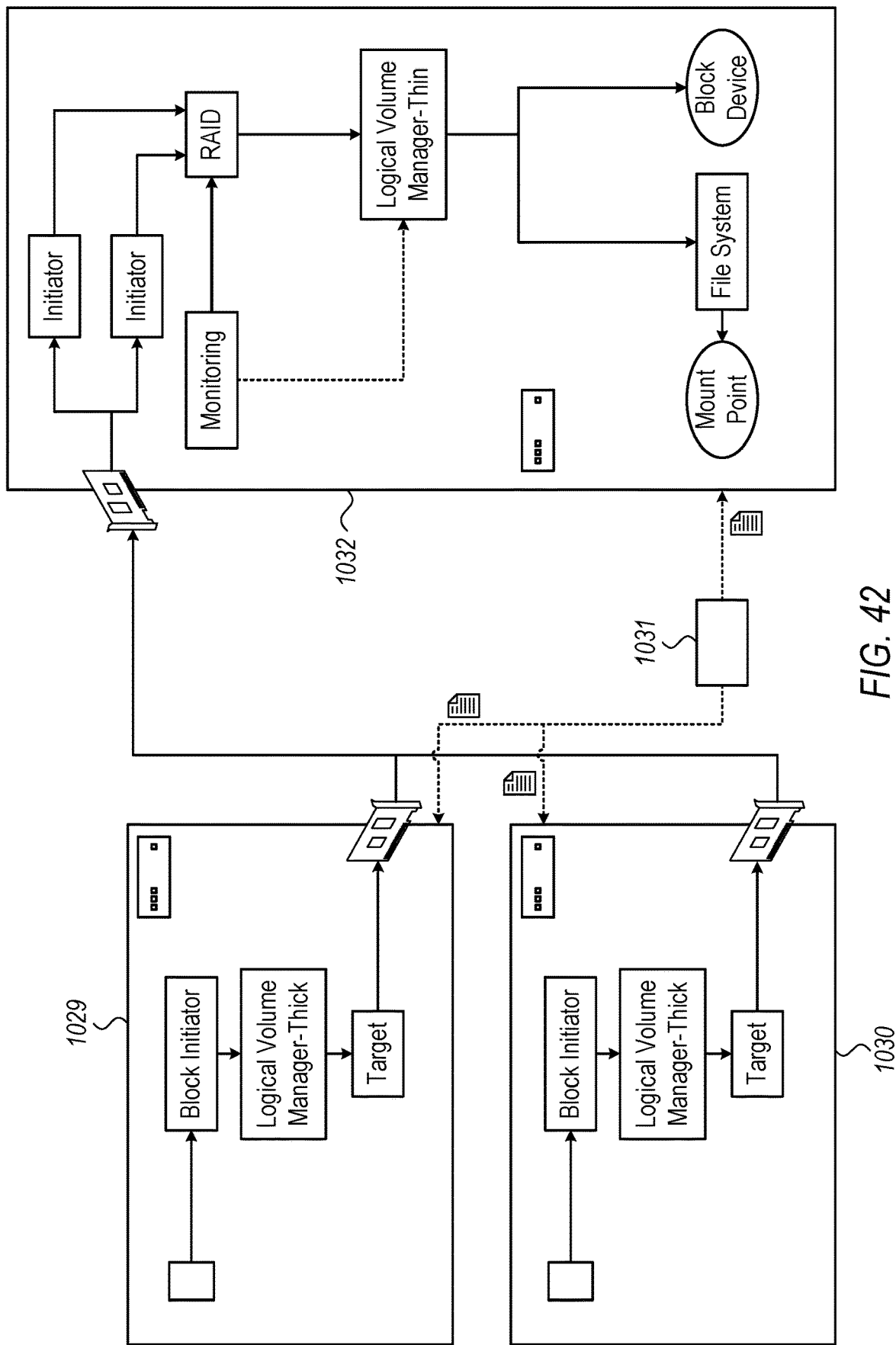
FIG. 42 constitutes a schematical illustration of a data storage system, according to some embodiments of the invention.

Reference is now made to FIG. 41 which schematically illustrates an Asynchronous Replication procedure between servers 1027 and 1028 using LVM Snapshot and RAID 1, according to some embodiments of the invention.

According to some embodiments, the storage stack used for asynchronous replication is a RAID 1 component. Logical Volume Manager (LVM) is used for snapshotting. Snapshots are required to sync changes as a group at a certain point in time. According to some embodiments, changes from previous synchronization are tracked either by LVM snapshot difference, or by storage stack tracking layer, for example dm-era in Linux, etc.

According to some embodiments, the changes from previous synchronization are transformed into RAID 1 bitmap and sent into the RAID 1 component.

According to some embodiments, and like in synchronous replication, one leg of the RAID 1 is connected to local LVM snapshot, and the at least another drive is connected to remove an LVM snapshot through storage components as exemplified by the Multipath, Initiator and Target components.

According to some embodiments, as the RAID-1 would attempt to resync, the bitmap information may cause the RAID 1 to read changed data from the local snapshot and write it to the remote snapshot in server 2. If async replication network is disconnected, it can be resumed, as the bitmap is continued to be updated by the RAID 1 component. According to some embodiments, snapshot in the remote site enables rollback of partial replication that did not complete. According to some embodiments, kernel implementation of RAID 1 and LVM components ensure zero copy, high bandwidth, low CPU utilization and no context switch and connecting one local volume snapshot and remote volume snapshot via the network.

According to some embodiments, the asynchronous replication procedure is configured to Track changes from last async replication using LVM snapshot delta metadata or change tracking information. Converting the change list into RAID 1 bitmap and replicate only the changes from last asynchronous operation.

According to another aspect of the invention, the allocation of space in an LVM is configured to be carried out in a progressive manner similar to commonly practiced thin provisioning while thick allocation extent groups are appropriated. Such configuration would enjoy the benefits of low RAM use and low CPU resources commonly attributable to thick allocation while also enjoying the benefits commonly associated with progressive allocation using thin allocation.

According to some embodiments, a two layers' LVM stack is suggested: one with thick allocation situated on top of the physical drive; and another, lower logical volume manager with thin allocation situated below the volume. According to some embodiments, a controller that monitors free space in a n LVM's lower layer is provided thus enabling orchestrator to automatically allocate more extents in the upper layer/s. While commonly cloud LVM allocates data only on thick operation, it would be appreciated that the use of the suggested configuration may be applied also in cloud managed storage thereby enabling payment of only used capacity in the public cloud. Such two layers' LVM stack enables the bottom volume to see all the space, while upper LVM allocates only part of the capacity.

According to another aspect of the invention, using multiple processor cores for RAID parity operation wherein new SSD drives can be utilized to the maximum bandwidth and thereby the relevant RAID can scale across cores without locks or synchronization. According to some embodiments, a core and RAID configuration enables not only to use all the cores in parallel, but the ability to resize the RAID as also standard parity RAID is carried out. A multicore scalable RAID parity also requires special handing of a failed drive, spare replacement and health monitoring, whereas according to some embodiments, such configuration is aggregated across the core instances. According to some embodiments, a parity RAID is provided that scales and runs on multiple cores, without locks. According to some embodiments, a multicore parity RAID is provided that can be resized online.

Figure 43:
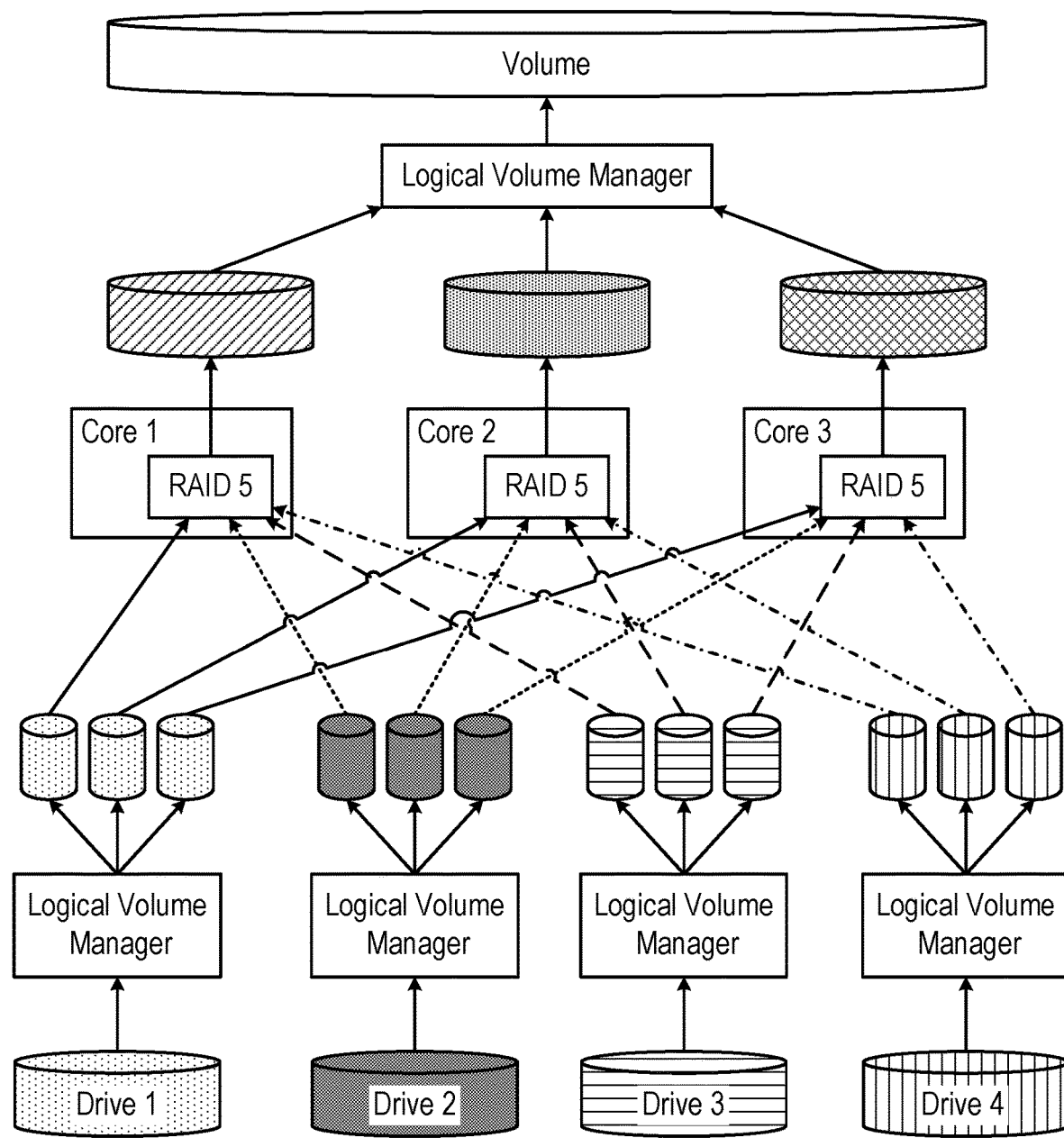
FIG. 43 constitutes a schematical illustration of a multi-core scalable RAID parity.

Making reference to FIG. 43 which illustrates an example for a multicore scalable RAID parity. LVM is used to split each drive to sub drives' volumes. Number of sub drives volumes, that each drive is spit to, is the number of cores that will be used in parallel for the RAID logic. As exemplified in FIG. 43, three cores will be used for RAID, so each drive is split to three logical volumes. Separate parity RAID, either level 5 or 6, is created on each core. As exemplified in FIG. 43, three cores will create 3× separate RAID 5 instances. Whereas each instance runs on sub drive volumes, one from each physical volume. The cores' parity RAIDs are merged into single volume, to be used by the host, using another LVM. Such exemplary design and configuration enables not only to use all the cores in parallel, but also the ability to resize the RAID, similar to standard parity RAID.

To resize the RAID the following steps can be carried out:
LVM lower layer, extend the physical volume.
LVM lower layer, extend each sub drive volume, by the extra size divided by number of cores.
Each core RAID 5 is extended.
LVM upper layer, extend each physical volume of each core.
LVM upper layer, extend the volume size.

According to another aspect of the invention, a set of two servers running standard operating system is set as dual storage controllers, wherein an interconnect forwarding channel is created between the two servers, using standard operating system components. According to some embodiments, priority of the volume serving node is published to the host, using operating system targets. According to some embodiments, a failover is performed from volume service server to volume forwarding server, using operating system NVMe Initiator component components. Operating system storage target component is used in one server, in combination with storage initiator component in another server to create an interconnect. The interconnect is used to forward traffic similar to that carried out in enterprise storage arrays though, according to some embodiments, operating system multipath driver is reused to a different purpose—queuing traffic while failing over to another node. The multipath driver includes a queue that was designed for path failure support.

By way of example, an operating system device mapper "linear" is reused to a different purpose—switching between volume storage stack and interconnect forwarding. Appropriating the "linear" device mapper is advantageous, since stacking component does not enable any change without removing all of them. The "linear" device mapper enables the ability to modify the stack component without modifying the components above it. Failover can happen in case of change of volume serving server or in case of server failure.

Figure 44:
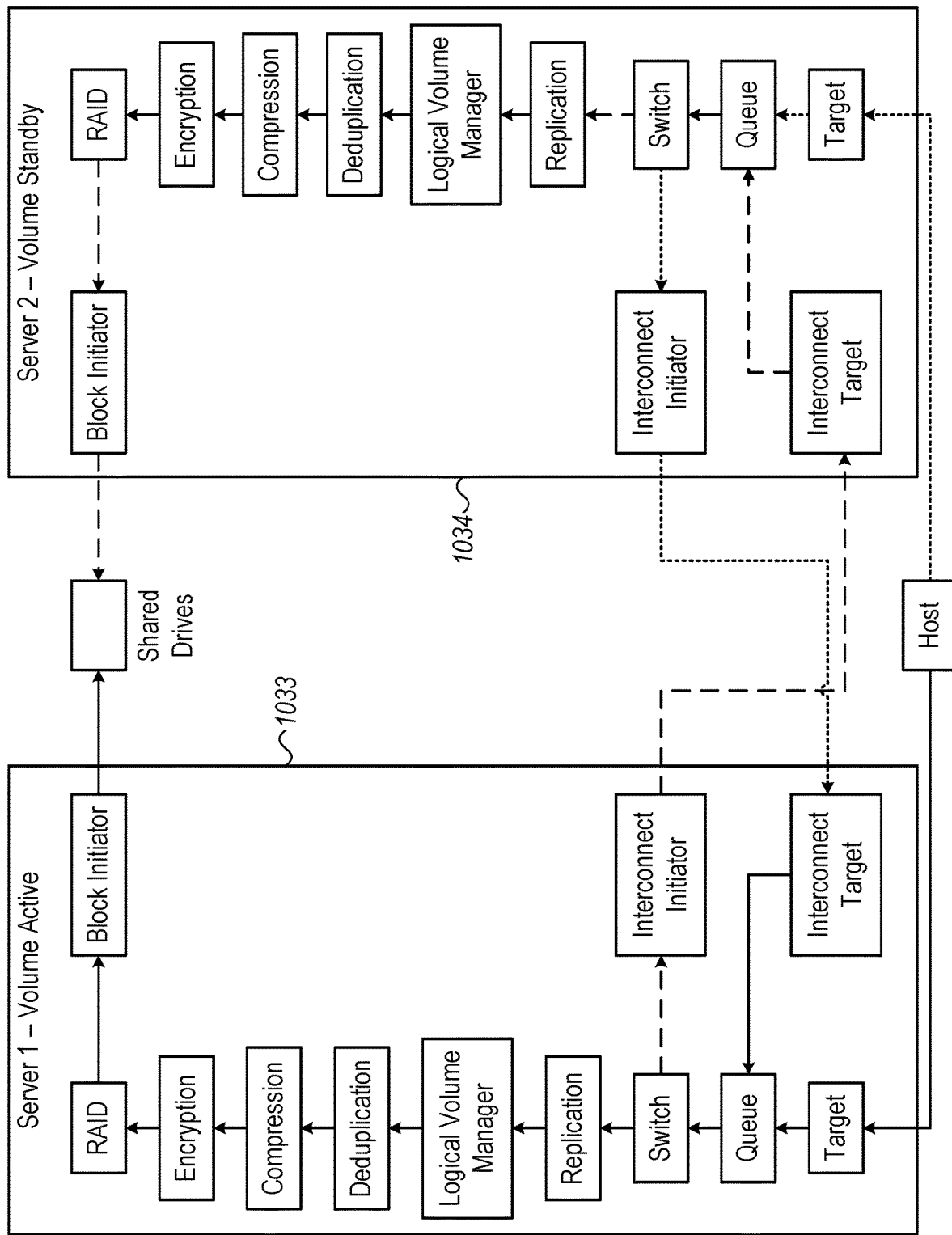
FIG. 44 constitutes a schematical illustration of a failover of volume between servers.

Making reference to FIG. 44 illustrating failover of volume from server1 to server 2 using the following steps:
Queueing up IO in server 1—using a multipath driver;
Queueing up IO in server 2—using a multipath driver;
Remove volume stack from shared drives in server 1;
Create volume stack from shared drive in server 2;
Modify switch in server 1 to perform forwarding over the interconnect—using device mapper linear;
Modify switch in server 2 to perform volume stack—using device mapper linear;
Modify target in server 1 to publish non-preferred path;
Modify target in server 2 to publish preferred path;
Release queue on server 1;

Release queue on server 2.

Although the present invention has been described with reference to specific embodiments, this description is not meant to be construed in a limited sense. Various modifications of the disclosed embodiments, as well as alternative embodiments of the invention will become apparent to persons skilled in the art upon reference to the description of the invention. It is, therefore, contemplated that the appended claims will cover such modifications that fall within the scope of the invention.

The invention claimed is:

1. A data storage system, comprising:
  (i) at least two servers that comprise at least one direct attached storage volume and configured to run an operating system designated to host data accessible and exposable over a data plane (DP) network; and
  (ii) at least one orchestrator configured to interact with each of said servers and designated to control a control plane (CP) of said DP network;
  wherein each server is configured to manage its own DP components;
  wherein the orchestrator is configured to utilize the CP in order to take at least one consistency group snapshot, and further configured to manage an IO suspension and resumption in order to provide a consistent snapshotting of the at least one direct attached storage volume in a particular point in time; and
  wherein the orchestrator is designated to utilize a designated portion of the at least one direct attached storage volume by orchestrating storage stack components and a standard storage stack of the operating system embedded within the at least two servers.

2. The system of claim 1, wherein the orchestrator is configured to back-off from consistency group snapshot process if one of the servers misbehave or timeout.

3. The system of claim 1, wherein the orchestrator is configured to delete a taken constancy group snapshot.

4. The system of claim 1, wherein the orchestrator is configured to roll back a taken consistency group snapshot.

5. The system of claim 1, wherein the orchestrator is configured to schedule consistency group snapshotting.

6. The system of claim 1, wherein the orchestrator is configured to only use parts of at least one media storage within the storage system.

7. The system of claim 1, wherein the orchestrator is configured to allocate new hot spare disk from a storage pool in case of failure.

8. The system of claim 1, wherein the orchestrator is configured to instruct each server to add a selected spare storage media to each storage volume.

9. The system of claim 1, wherein the orchestrator is configured to add a selected spare disk to the at least one direct attached storage volume.

10. The system of claim 1, wherein the orchestrator is configured to instruct each server to dismiss a failed disk in each direct attached shared storage volume and rebuilding a new spare drive chunk with valid data.

11. The system of claim 1, wherein connection between the servers is conducted using a multipath connection.

12. The system of claim 1, wherein the orchestrator is configured to provide alerts and handle failures for remote block device connection between servers.

13. The system of claim 1, wherein multiple initiators are configured to be created per network path to each server.

14. The system of claim 1, wherein coordination between the servers is conducted using a CP orchestrator installed on each server.

15. The system of claim 1, wherein communication between the servers and the orchestrator is done using a designated software component installed on each of said servers.

16. The system of claim 1, wherein the server is configured to utilize a redundant array of independent disks (RAID) storage stack component (SSC) configured to provide data redundancy originated from multiple designated portions of the at least one direct attached storage volume at multiple servers.

17. The system of claim 16, wherein the RAID SSC is configured to provide data redundancy originated from combined multiple initiator paths originated from the designated portion of the at least one direct attached storage volume of at least two servers.

18. The system of claim 17, wherein the servers are located at different locations and wherein the orchestration is allocated across different resiliency domains.

19. The system of claim 18, wherein the orchestration allocated while considering different resiliency domains also considers maintaining system balance.

20. A method for orchestrating and storing data, comprising:
  (i) enabling at least two servers that comprise at least one direct attached storage volume and configured to run an operating system to host data accessible and exposable over a data plane (DP) network; and
  (ii) enabling at least one orchestrator to interact with each of said servers to control a control plane (CP) of said DP network;
  wherein each server is configured to manage its own DP components;
  wherein the orchestrator is configured to utilize the CP in order to take at least one consistency group snapshot, and further configured to manage an IO suspension and resumption in order to provide a consistent snapshotting of the at least one direct attached storage volume in a particular point in time; and
  wherein the orchestrator is designated to utilize a designated portion of the at least one direct attached storage volume by orchestrating storage stack components and standard storage stack of the operating system embedded within the at least two servers.

* * * * *